(12) United States Patent
Larimer et al.

(10) Patent No.: US 11,168,276 B2
(45) Date of Patent: Nov. 9, 2021

(54) REINFORCED COMPOSITES WITH REPELLENT AND SLIPPERY PROPERTIES

(71) Applicant: Battelle Memorial Institute, Richland, WA (US)

(72) Inventors: Curtis J. Larimer, Richland, WA (US); Raymond S. Addleman, Richland, WA (US)

(73) Assignee: Battelle Memorial Institute, Richland, WA (US)

(*) Notice: Subject to any disclaimer, the term of this patent is extended or adjusted under 35 U.S.C. 154(b) by 717 days.

(21) Appl. No.: 15/829,636

(22) Filed: Dec. 1, 2017

(65) Prior Publication Data

US 2018/0094204 A1 Apr. 5, 2018

Related U.S. Application Data

(63) Continuation-in-part of application No. PCT/US2016/049019, filed on Aug. 26, 2016, and a
(Continued)

(51) Int. Cl.
*C10M 105/76* (2006.01)
*B08B 17/06* (2006.01)
(Continued)

(52) U.S. Cl.
CPC ............ *C10M 105/76* (2013.01); *B05D 5/08* (2013.01); *B08B 17/065* (2013.01); *C09D 5/00* (2013.01); *C09D 5/1681* (2013.01); *C09D 7/40* (2018.01); *C09D 183/04* (2013.01); *C10M 107/38* (2013.01); *C10M 107/50* (2013.01); *A01K 1/015* (2013.01); *A01K 1/02* (2013.01); *B05D 1/02* (2013.01); *B05D 1/28* (2013.01); *B05D 3/0254* (2013.01); *B05D 2350/63* (2013.01); *B05D 2350/65* (2013.01); *B05D 2518/12* (2013.01);
(Continued)

(58) Field of Classification Search
None
See application file for complete search history.

(56) References Cited

U.S. PATENT DOCUMENTS 3,931,428 A    1/1976  Reick
4,224,173 A *  9/1980  Reick .................. C10M 169/00
                                                    508/182
(Continued)

FOREIGN PATENT DOCUMENTS

WO    WO 01/19932     3/2001
WO    WO 2012/003004  1/2012
(Continued)

OTHER PUBLICATIONS

Office Action from United States Patent Office for U.S. Appl. No. 15/410,225, dated Apr. 8, 2019.
(Continued)

*Primary Examiner* — Cachet I Proctor
(74) *Attorney, Agent, or Firm* — Klarquist Sparkman, LLP

(57) ABSTRACT

Compositions and processes are disclosed for forming hydrophobic coatings and lubricant-infused surface coatings. Coatings may be applied to various substrates without prior chemical or temperature treatment of the substrates and over large and irregular surfaces. Coatings are self-healing, antifouling, and have enhanced lifetimes.

20 Claims, 24 Drawing Sheets

Related U.S. Application Data continuation-in-part of application No. 14/839,471, filed on Aug. 28, 2015, now Pat. No. 10,221,321.

(51) Int. Cl.

| | | |
|---|---|---|
| C10M 107/38 | (2006.01) | |
| C10M 107/50 | (2006.01) | |
| C09D 7/40 | (2018.01) | |
| C09D 5/16 | (2006.01) | |
| C09D 5/00 | (2006.01) | |
| C09D 183/04 | (2006.01) | |
| B05D 5/08 | (2006.01) | |
| B63B 59/04 | (2006.01) | |
| A01K 1/015 | (2006.01) | |
| A01K 1/02 | (2006.01) | |
| B05D 1/02 | (2006.01) | |
| B05D 3/02 | (2006.01) | |
| C08K 3/08 | (2006.01) | |
| C08K 3/36 | (2006.01) | |
| C08K 7/26 | (2006.01) | |
| B05D 1/28 | (2006.01) | |
| C10N 30/12 | (2006.01) | |
| C10N 30/16 | (2006.01) | |
| C10N 30/00 | (2006.01) | |
| C10N 40/00 | (2006.01) | |
| C10N 50/00 | (2006.01) | |

(52) U.S. Cl.
CPC .......... B05D 2601/22 (2013.01); B63B 59/04 (2013.01); C08K 3/08 (2013.01); C08K 3/36 (2013.01); C08K 7/26 (2013.01); C10M 2201/105 (2013.01); C10M 2207/021 (2013.01); C10M 2213/003 (2013.01); C10M 2227/003 (2013.01); C10M 2229/041 (2013.01); C10N 2030/12 (2013.01); C10N 2030/16 (2013.01); C10N 2030/26 (2020.05); C10N 2040/50 (2020.05); C10N 2050/14 (2020.05)

(56) References Cited

U.S. PATENT DOCUMENTS

| | | | |
|---|---|---|---|
| 4,913,760 A | 4/1990 | Benson et al. | |
| 4,933,237 A | 6/1990 | Krenceski et al. | |
| 5,976,297 A | 11/1999 | Oka et al. | |
| 6,117,555 A | 9/2000 | Fujimori et al. | |
| 6,326,111 B1 | 12/2001 | Chambers et al. | |
| 6,495,624 B1 | 12/2002 | Brown | |
| 6,800,354 B2 | 10/2004 | Baumann et al. | |
| 7,772,456 B2 | 8/2010 | Zhang et al. | |
| 8,535,779 B1 | 9/2013 | Smith et al. | |
| 8,574,704 B2 | 11/2013 | Smith et al. | |
| 8,580,027 B1* | 11/2013 | Campos | C08K 9/08 106/287.27 |
| 8,614,003 B2 | 12/2013 | Ma et al. | |
| 8,741,432 B1 | 6/2014 | Campos | |
| 8,940,361 B2 | 1/2015 | Smith et al. | |
| 9,121,306 B2 | 9/2015 | Aizenberg et al. | |
| 9,121,307 B2 | 9/2015 | Aizenberg et al. | |
| 9,254,496 B2 | 2/2016 | Dhiman et al. | |
| 2005/0112326 A1 | 5/2005 | Nun et al. | |
| 2005/0118433 A1 | 6/2005 | Oles et al. | |
| 2007/0141305 A1* | 6/2007 | Kasai | C08J 7/0427 428/143 |
| 2008/0229929 A1 | 9/2008 | Marcoon | |
| 2009/0042469 A1 | 2/2009 | Simpson | |
| 2009/0104347 A1* | 4/2009 | Van Benthem | C09D 5/031 427/201 |
| 2009/0136741 A1 | 5/2009 | Zhang et al. | |
| 2009/0214606 A1* | 8/2009 | Bujard | A23G 4/064 424/401 |
| 2010/0004373 A1* | 1/2010 | Zhu | C09D 133/08 524/448 |
| 2010/0035039 A1 | 2/2010 | Jing et al. | |
| 2011/0021698 A1 | 1/2011 | Vyörykkä et al. | |
| 2011/0033663 A1 | 2/2011 | Svec et al. | |
| 2011/0045247 A1 | 2/2011 | Nun et al. | |
| 2012/0052241 A1 | 3/2012 | King et al. | |
| 2012/0058330 A1* | 3/2012 | Smith | C08L 83/04 428/327 |
| 2014/0106127 A1 | 4/2014 | Lyons et al. | |
| 2014/0147627 A1* | 5/2014 | Aizenberg | A61L 33/064 428/141 |
| 2014/0155522 A1* | 6/2014 | Simpson | C09D 127/22 523/400 |
| 2014/0165263 A1 | 6/2014 | Pham et al. | |
| 2014/0290731 A1 | 10/2014 | Aizenberg et al. | |
| 2014/0290732 A1 | 10/2014 | Aizenberg et al. | |
| 2014/0328999 A1 | 11/2014 | Aizenberg et al. | |
| 2015/0005424 A1 | 1/2015 | Jones et al. | |
| 2015/0152270 A1* | 6/2015 | Aizenberg | B08B 17/065 210/500.27 |
| 2015/0175814 A1* | 6/2015 | Aizenberg | C03C 17/001 428/312.8 |
| 2015/0210951 A1 | 7/2015 | Aizenberg et al. | |
| 2016/0032074 A1* | 2/2016 | Aizenberg | C08J 9/365 514/772.4 |
| 2017/0058130 A1 | 3/2017 | Addleman et al. | |
| 2017/0204279 A1 | 7/2017 | Larimer et al. | |
| 2018/0305543 A1 | 10/2018 | Agrawal et al. | |

FOREIGN PATENT DOCUMENTS

| | | |
|---|---|---|
| WO | WO 2012/100100 | 7/2012 |
| WO | WO 2013/115868 | 8/2013 |
| WO | WO 2014/012039 | 1/2014 |
| WO | WO 2014/012080 | 1/2014 |
| WO | WO 2014/019809 | 2/2014 |
| WO | WO 2014/035742 | 5/2014 |
| WO | WO 2014/094042 | 6/2014 |
| WO | WO 2015/012910 | 1/2015 |

OTHER PUBLICATIONS

Anand, S., et al., "Enhanced Condensation on Lubricant-Impregnated Nanotextured Surfaces," *ACS Nano*, 6(11):10122-10129 (Oct. 2012).

Bhadury, P., et al., "Exploitation of Marine Algae: Biogenic Compounds for Potential Antifouling Applications," *Planta*, 219(4):561-578 (Aug. 2004).

Chen, L., et al., "Transparent Slippery Surfaces Made with Sustainable Porous Cellulose Lauroyl Ester Films," *Applied Materials & Interfaces*, 6:6969-6976 (Apr. 2014).

Daniel, D., et al., Lubricant-infused micro/nano-structured surfaces with tunable dynamic omniphobicity at high temperatures, Applied Physics Letters, 2013, 102, p. 231603.

Dickson, M.N., BioFocus: Slippery Liquid-Infused Porous Surface Coating on Steel Resists Biofouling, MRS Bulletin, 2016, 41(1), p. 9.

Epstein, A.K., et al., Liquid-infused Structured Surfaces with Exceptional Anti-biofouling Performance, Proceedings of the National Academy of Sciences, 2012, 109(33), p. 13182-13187.

Dyett, B., et al., "Toward Superhydrophobic and Durable Coatings: Effect of Needle vs. Crater Surface Architecture," *ACS Appl. Mater. Interfaces*, 6:9503-9507 (May 2014).

Girotti et al., "Improved detection of toxic chemicals using bioluminescent bacteria," Analytica Chimica Acta 471 :113-120, 2002.

Godwin, L. S., "Hull Fouling of Maritime Vessels as a Pathway for Marine Species Invasions to the Hawaiian Islands," *Proceedings of a Workshop on Current Issues and Potential Management Strategies*, Honolulu, HI (Feb. 12-13, 2003).

Grinthal, A., et al., Mobile Interfaces: Liquids as a Perfect Structural Material for Multifunctional, Antifouling Surfaces, Chemistry of Materials, 26(1), 2013, 698-708.

(56) References Cited

OTHER PUBLICATIONS

Hoshian, S., et al., "Robust Superhydrophobic Silicon without a Low Surface-Energy Hydrophobic Coating," *ACS Appl. Mater. Interfaces*, 7:941-949 (Dec. 2014).
Hou, X., et al., "Preparation of polypropylene superhydrophobic surface and its blood compatibility," *Colloids and Surfaces B: Biointerfaces*, 80:247-250 (Jun. 2010).
Howell, C., et al., Self-Replenishing Vascularized Fouling-Release Surfaces, ACS Applied Materials & Interfaces, 6(15), 2014, 13299-13307.
Howell, C., et al., Stability of Surface-Immobilized Lubricant Interfaces Under Flow, Chemistry of Materials, 27(5), 2015, 1792-1800.
Huang, X., et al., "Omniphobic Slippery Coatings Based on Lubricant-Infused Porous Polyelectrolyte Multilayers," *ACS Macro Letters*, 2(9):826-829 (Sep. 2013).
International Search Report and Written Opinion for PCT/US2016/049019 (dated Dec. 16, 2016).
International Search Report and Written Opinion for PCT/US2017/014061, 8 pages (dated Apr. 7, 2017).
Karapanagiotis, I., et al., "From Hydrophobic to Superhydrophobic and Superhydrophilic Siloxanes by Thermal Treatment," *Langmuir*, 30:13235-13243 (Oct. 2014).
Kim, P., et al., "Hierarchical or Not? Effect of the Length Scale and Hierarchy of the Surface Roughness on Omniphobicity of Lubricant-Infused Substrates," *Nano Letters*, 13(4):1793-1799 (Mar. 2013).
Kim, P., et al., "Liquid-Infused Nanostructured Surfaces with Extreme Anti-Ice and Anti-Frost Performance," *ACS Nano*, 6(8):6569-6577 (Jun. 2012).
Kondrashov, V., et al., "Microcones and Nanograss: Toward Mechanically Robust Superhydrophobic Surfaces," *Langmuir*, 30:4342-4350 (Mar. 2014).
Luong-Van, E., et al., "Review: Micro- and nanostructured surface engineering for biomedical applications," *J. Mater. Res.*, 28(2):165-174 (Jan. 2013).
Mao, C., et al., "Preparation of lotus-leaf-like polystyrene micro- and nanostructure films and its blood compatibility," *J. Mater. Chem.*, 19:9025-9029 (Oct. 2009).
MacCallum, N., et al., Liquid-Infused Silicone as a Biofouling-Free Medical Material, ACS Biomaterials Science & Engineering, 1(1), 2014, 43-51.
Office Action from United States Patent Office for U.S. Appl. No. 14/839,471, dated Oct. 4, 2017.
Okada, I., et al., "High-Transparency, Self-Standable Gel-SLIPS Fabricated by a Facile Nanoscale Phase Separation," *ACS Applied Materials & Interfaces*, 6(3):1502-1508 (2014).
Park et al., "Potential Impact of Seawater Uranium Extraction on Marine Life," Industrial & Engineering Chemistry Research, 2016.
Parvez et al., "A review on advantages of implementing luminescence inhibition test (Vibrio fischeri) for acute toxicity prediction of chemicals," Environment International 32:265-268, 2006.

Rykaczewski, K., et al., "Mechanism of Frost Formation on Lubricant-Impregnated Surfaces," *Langmuir*, 29(17):5230-5238 (Apr. 2013).
Scardino, A. J., et al., "Mini Review: Biomimetic Models and Bioinspired Surfaces for Fouling Control," *Biofueling*, 27(1):73-86 (Jan. 2011).
Schachter, B., "Slimy Business—The Biotechnology of Biofilms," *Nature Biotechnology*, 21(4):361-365 (May 2003).
Schultz, M. P., et al., "Economic Impact of Biofouling on a Naval Surface Ship," *Biofueling*, 27(1):87-98 (Jan. 2011).
Smith, J. D., et al., "Droplet Mobility on Lubricant-Impregnated Surfaces," *Soft Matters*, 9(6):1772-1780 (2013).
Sun, D., et al., "No Platelet Can Adhere—Largely Improved Blood Compatibility on Nanstructured Superhydrophobic Surfaces," *Small*, 1(10):959-963 (Aug. 2005).
Tesler, A.B., et al., Extremely Durable Biofouling-Resistant Metallic Surfaces Based on Electrodeposited Nanoporous Tungstite Films on Steel, Nature Communications, 6, 2015, 8649.
Tian, et al., Moving superhydrophobic surfaces toward real-world applications, Science, 2016, 352, (6282), pp. 142-143.
Venkatesan, R., et al., "Macrofouling Control in Power Plants," Biofouling and Biofilm Processes Section, Water and Steam Chemistry Division, BARC Facilities, Indira Gandhi Center for Atomic Research Campus, Kalpakkam, 603 102, India, 265-291 (2008).
Vongsetskul, T., et al., "Antimicrobial nitrile gloves coated by electrospun trimethylated chitosan-loaded polyvinyl alcohol ultrafine fibers," *Polym. Bull.*, 72:2285-2296 (Jun. 2015).
Wang, N., et al., Fabrication of superhydrophobic and lyophobic slippery surfaces on steel substrate, Applied Surface Science, 2016, 387, pp. 1219-1224.
Wang, P., et al., Slippery Liquid-Infused Porous Surfaces Fabricated on Aluminum as a Barrier to Corrosion Induced by Sulfate Reducing Bacteria, Corrosion Science, 2015, 93, 159-166.
Wong, T.-S., et al., "Bioinspired Self-Repairing Slippery Surfaces With Pressure-Stable Omniphobicity," *Nature*, 477:443-447 (Sep. 2011).
Xiu, Y., et al., "Mechanically robust superhydrophobicity on hierarchically structured Si surfaces," *Nanotechnology*, 21:155705-155709 (Mar. 2010).
Zhang, P., et al., Anti-adhesion effects of liquid•infused textured surfaces on high temperature stainless steel for soft tissue, Applied Surface Science, 2016, 385, pp. 249-256.
Zhao, Y., et al., "Fabrication of Super-Hydrophobic Surfaces with Long-Term Stability," *Journal of Dispersion Science and Technology*, 32(7):969-974 (Jun. 2011).
Zhu, X., et al., "Robust superhydrophobic surfaces with mechanical durability and easy repairability," *J. Mater. Chem.*, 21:15793-15797 (Sep. 2011).
Zhu, X., et al., "Facile fabrication of a superhydrophobic fabric with mechanical stability and easy-repairability," *Journal of Colloid and Interface Science*, 380:182-186 (May 2012).

* cited by examiner

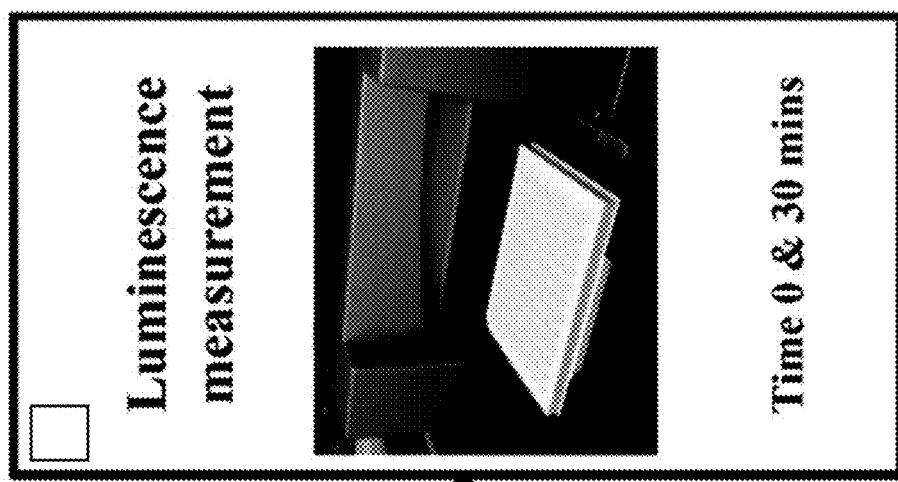
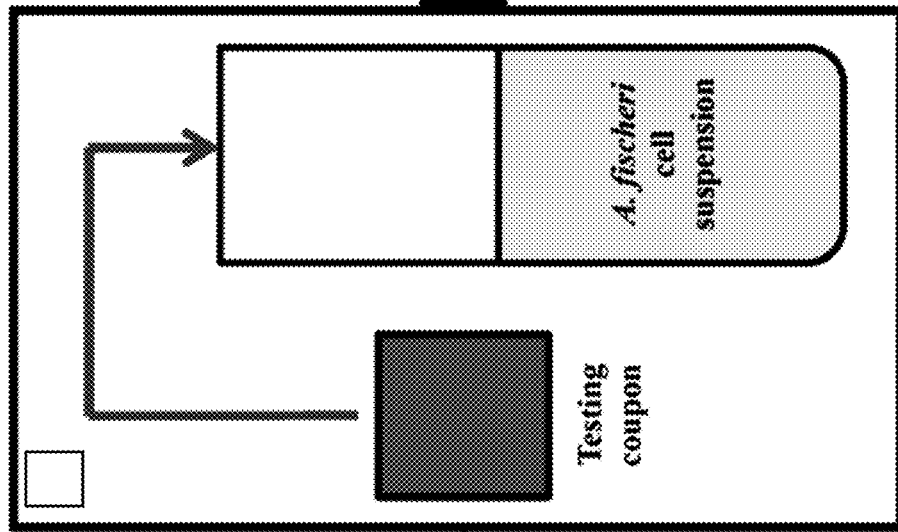
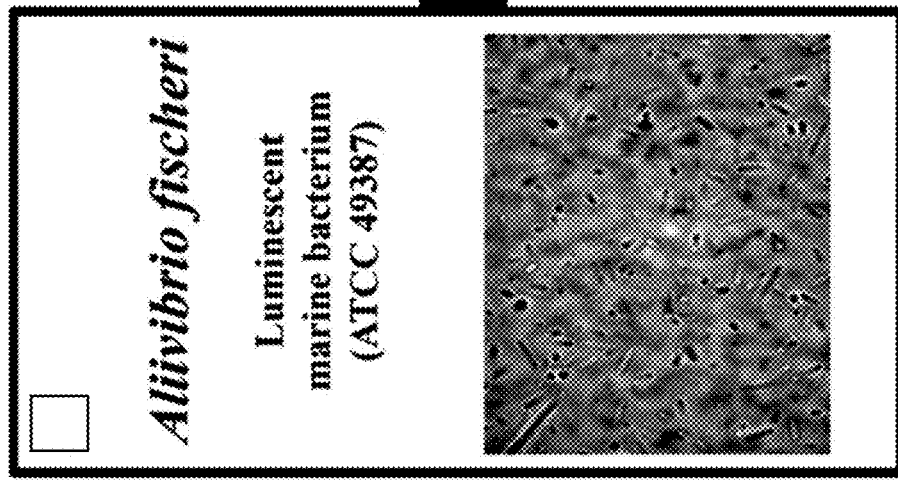

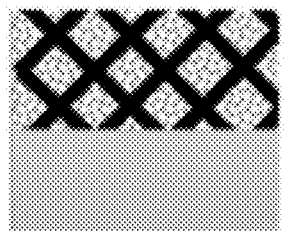
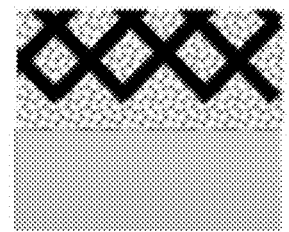
FIG. 20A  FIG. 20B
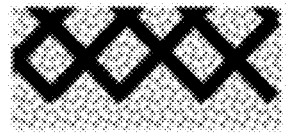
FIG. 20C

REINFORCED COMPOSITES WITH REPELLENT AND SLIPPERY PROPERTIES

CROSS REFERENCE TO RELATED APPLICATION

This application is a continuation-in-part of, and claims priority to U.S. patent application Ser. No. 14/839,471, filed Aug. 28, 2015; and claims priority to International Patent Application No. PCT/US2016/049019, filed Aug. 26, 2016; each of these applications is hereby incorporated by reference in its entirety.

STATEMENT REGARDING RIGHTS TO INVENTION MADE UNDER FEDERALLY-SPONSORED RESEARCH AND DEVELOPMENT

This invention was made with Government support under Contract DE-AC05-76RL01830 awarded by the U.S. Department of Energy. The Government has certain rights in the invention.

BACKGROUND OF THE INVENTION

A significant and growing need exists for materials that coat surfaces and provide enhanced antifouling or modified wetting behavior. Biofouling refers to the buildup of unwanted organic materials on surfaces in the form of biofilms when the surfaces are exposed to natural or man-made liquid environments. Biofouling and biofilms are costly problems that impact ecological and human health, infrastructure, carbon emissions, and machine performance. For example, over 80% of all infections, including 65% of infections originating in hospitals in the developed world, are estimated to be a result of biofilms. In marine environments, biofilms as thin as 50 µm can increase drag on a ship by 22%. Estimates indicate fouling in marine industries may generate costs greater than $6.4 billion (US) per year. Further, an estimated 70 million tons of additional $CO_2$ is produced by the US Navy as a consequence of increased fuel consumption. In power generation systems, biofilms with a thickness of only 250 µm can reduce heat transfer in heat exchangers by as much as 50%. Economic costs associated with fouling of heat exchangers in power stations in the US alone are estimated to be about $50 billion (US) per year. Many viable antifouling coatings deliver a controlled release of a toxic material to control fouling behavior. However, many of these toxic materials are being outlawed or phased out. Antifouling coatings that do not use these toxic materials include artificial hydrophobic coatings available since the 1990s made from commercial hydrophobic materials. These alternative coatings were inspired by water repellent plants such as the lotus plant and pitcher plant. Leaves of the lotus plant, for example, have a textured surface. When wet, the textured surface traps air beneath the water droplets reducing their ability to wet the surface. Artificial hydrophobic surfaces are synthesized by a variety of methods. Unfortunately, most synthetic hydrophobic materials have a limited durability and lose their ability to repel water with even minor damage to the surface from abrasion or wear. And, current fabrication methods typically involve complex procedures that are expensive and do not scale rendering them unsuitable for mass production or widespread application. A more recent class of coatings known as Liquid-Infused Surface (LIS) coatings include a solid substrate or surface with a liquid layer applied over the solid surface. However, many conventional LIS coatings also currently require complex chemical and physical procedures to generate the porosity in the surface needed to support the liquid layer. And, no current process easily applies functionally robust LIS coatings over large or irregular surfaces, or synergistically combines hydrophobic and LIS coatings in a cost-effective manner. Accordingly, new compositions and processes are needed that easily apply hydrophobic and LIS coatings over large or irregular surfaces, are functionally robust, and that synergistically combine hydrophobic and LIS coatings in a cost-effective manner. The present invention addresses these needs.

SUMMARY OF THE INVENTION

The present invention includes a paintable hydrophobic coating composition that forms a hydrophobic coating when applied to surfaces and substrates. The term "paintable" encompasses brush painting, roller painting, spray painting, and dip coating.

The hydrophobic coating composition is scalable permitting coatings to be applied to small and large surfaces and substrates.

The hydrophobic coating composition may include particles comprised of a first material of a first selected size and particles comprised of a second material of a smaller size combined together in a selected polymer. First and second particle materials may be selected from silica, metals, metal oxides, ceramics, polymers, diatomaceous earth, and combinations of these materials.

In some embodiments, first particles are porous particles.

In some embodiments, the hydrophobic coatings are super-hydrophobic coatings.

Hydrophobic coatings of the present invention may include selected surface morphologies that provide the coatings with a selected surface energy. In some embodiments, the hydrophobic coating includes a surface energy below about 20 $mJ/m^2$. In some embodiments, the hydrophobic coating provides a water roll-off angle below about 8 degrees.

The present invention also includes a lubricant-infused surface (LIS) coating. The coating may include a base or underlying hydrophobic coating on a substrate. The lubricant may be applied to the surface of the hydrophobic coating to form the LIS coating.

In some embodiments, the base or underlying coating is a hydrophobic coating. In some embodiments, the base or underlying coating is a super-hydrophobic coating.

Particles in the hydrophobic coating and base coating compositions may include various synthetic or naturally-occurring materials described herein.

In some embodiments, particles in the hydrophobic coating may include added antifouling agents, biocidal particles, or other selected agents detailed herein.

Polymers in the hydrophobic coating compositions form the polymer matrix that binds particles in the coating when the compositions are applied (e.g., painted) on a surface or substrate.

In some embodiments, coating compositions may include an added solvent such as hexane that allows the viscosity of the composition to be tailored for application or delivery to the substrate. Added solvent also delays polymerization of the matrix polymer until coating compositions are applied or delivered to the substrate. Hydrophobic coating compositions may be delivered without a prior chemical or physical treatment of the substrate.

In some embodiments, hydrophobic coating compositions may be delivered to the substrate in a selected solvent, fluid, gas, or combination of these dispensing agents. In some embodiments, hydrophobic coating compositions may be delivered or applied to the substrate in the form of a paint.

In the exemplary embodiment, components of the coating compositions including particles and matrix polymers are non-toxic.

The present invention also includes a process for forming the hydrophobic coating. The process may include delivering the hydrophobic coating composition to a substrate to form a hydrophobic coating. Particles in the coating provide the coating with a selected surface morphology that gives the surface a selected surface morphology, surface energy, or roll-off angle. The surface morphology of the coating may include mounded features comprised of aggregates of the larger porous particles. Mounded features may include selected heights and selected diameters. Larger porous particles in the coating further define the microstructure of the coating. Mounded features may be overlaid with smaller features comprised of the second smaller particles in the coating that overlay (i.e., are on top of) the larger mounded features and give the coating a nanoscale surface texture (nanotexture). The nanoscale surface texture supports and stabilizes lubricants at the surface of the coating when applied or delivered as described further herein.

The present invention also includes a process for forming a lubricant-infused surface (LIS) coating. In some embodiments, the process includes applying a lubricant to the surface of the hydrophobic coating to form the LIS coating. Lubricants may be in the form of oils, greases, and gels.

In some embodiments, the process includes delivering the lubricant to the surface of the hydrophobic coating from an internal reservoir or wicking structure, or from an external lubricant reservoir. Lubricants when applied or delivered to the hydrophobic coating infuse porous particles at the surface and the sub-surface with lubricant.

Lubricants also infuse interstitial spaces positioned between particles in the sub-surface and between nanoscale particles at the surface of the coating with lubricant.

In some embodiments, hydrophobic coatings underlying the LIS coating may also include pore-forming additives or materials that increase porosity of the LIS coating. Porosity provides storage of the lubricant when applied or delivered to the hydrophobic coating and further maintains or provides continuous delivery or replenishment of the lubricant at the surface of the LIS coating. Lubricants reduce the surface friction of the coated surface and provide the LIS coating with selected and enhanced surface properties.

Additionally disclosed herein are reinforced structures that exhibit repellent and slippery properties, and methods of making the reinforced structures. In any of the disclosed embodiments, the reinforced slippery structures may be resistant to abrasion. Some embodiments of reinforced slippery structures comprise an abrasion resistant composite structure. In some embodiments, a structure having a slippery surface comprises an abrasion resistant composite structure comprising a porous reinforcing material and a repellent interfacial material, and a lubricant-infused surface (LIS) coating on an external surface of the composite structure.

In any of the disclosed embodiments, the repellent interfacial material may be coated on and/or embedded within the porous reinforcing material. Examples of the porous reinforcing material include, but are not limited to, stainless steel, copper, aluminum, fiberglass, carbon fiber, fabric, canvas, and any combinations of these materials. In any of the disclosed embodiments, the repellent interfacial material may comprise a polymer, or an organosilicon compound, or a combination of a polymer and an organosilicon compound. Examples of the repellent interfacial material include, but are not limited to, siloxane, silicone, a fluorocarbon polymer, methacrylate, polypropylene, polyethylene, cellulose, and silazane. In any of the disclosed embodiments, the lubricant-infused surface coating may comprise a fluorocarbon polymer, or a silicone oil, or a combination of a fluorocarbon polymer and a silicone oil.

In some embodiments, the composite structure comprises a porous reinforcing material comprising metal or fiberglass, a repellent interfacial material comprising organosilicon, and a LIS coating comprising silicone oil or a fluorocarbon polymer.

Any of the disclosed embodiments of the reinforced structures disclosed herein may be resistant to abrasion. This abrasion resistance can be quantified using various parameters. In some embodiments, an external surface on a reinforced structure comprising a LIS coating has a slippery surface, with a surface energy between 10 and 20 $mJ/m^2$, or a water contact angle between 90 and 125 degrees, or a water roll-off angle between 1 and 25 degrees, or any combination thereof. In exemplary embodiments, the external surfaces have water contact angles between 95 and 110 degrees, and water roll-off angles between 1 and 14 degrees.

Also disclosed herein are optional components of the reinforced and composite structures. In any of the disclosed embodiments, the composite structure may further comprise a pore-forming additive. Examples of a pore-forming additive include, but are not limited to, silica, metal, metal oxide, ceramic, polymer, diatomaceous earth, cellulose or a derivative thereof, sugar, starch, salt, and surfactant. In any of the disclosed embodiments, the reinforced structure may further comprise a biocide, or a corrosion inhibitor, or an antifouling agent, or any combination of a biocide, corrosion inhibitor and an antifouling agent. In any of the disclosed embodiments, the reinforced structures may further comprise an external lubricant reservoir, or a substrate, or an external lubricant reservoir and a substrate.

The reinforced structures disclosed herein that include a substrate can also exhibit repellent and slippery properties. In any of the disclosed embodiments of a reinforced structure having a slippery surface, the reinforced structure may comprise a substrate, a reinforcing material, a repellent material, and a lubricant, wherein an external surface of the reinforced structure may comprise a LIS coating, and wherein the reinforcing material and the repellent material together may form an abrasion resistant interface between the substrate and the lubricant-infused surface coating. In some embodiments, an external surface of the reinforced structure comprising the LIS coating is slippery, with a surface energy between 10 and 20 $mJ/m^2$, or a water contact angle between 90 and 125 degrees, or a water roll-off angle between 1 and 25 degrees, or any combination thereof. Embodiments of the reinforced structure having a slippery surface comprise a substrate chosen from at least one of a floor tile, a wall tile, and a component of an animal enclosure having a surface that contacts an animal, and the reinforced structure further comprises a biocide. In some embodiments, a substrate is chosen from at least one of a marine vessel, buoy, and pier having a surface that contacts a marine environment, and the reinforced structure further comprises an antifouling agent, or a corrosion inhibitor, or both.

In any of the disclosed embodiments of the reinforced structures having a slippery surface, the structure may comprise a reinforcing material comprising metal or fiberglass, a repellent material comprising silicon, and a LIS coating comprising silicone oil or a fluorocarbon polymer. Some embodiments may further comprise a pore-forming additive.

Additionally, processes for forming slippery durable structures are disclosed. In any of the disclosed embodiments, the process may comprise combining a repellent material with a reinforcing material to form an abrasion resistant composite structure, delivering a lubricant to the composite structure, and forming a lubricant-infused surface coating on an external surface of the composite structure to provide a slippery surface. Any of the disclosed embodiments of these processes may comprise a lubricant that is delivered to the composite structure through a capillary device in fluid contact with an external lubricant reservoir. Slippery durable structures formed by these processes are also disclosed.

The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIGS. 14A-14C show an overview of the Microtox test procedure as follows: 14(A) luminescent marine bacterium *Aliivibrio fischeri* (ATCC 49387) was used for the test; 14(B) a testing coupon was exposed to *A. fischeri* cell suspension for 30 minutes; and 14(C) cell suspension samples were collected at Time 0 and 30 minutes of incubation with a testing coupon to measure the luminescence using a microplate reader.

FIG. 18A is a reinforcing material having an average pore diameter of 60 microns, and FIG. 18B is a reinforcing material having an average pore diameter of 10 microns; the scale bar shown in each image represents 200 µm.

FIG. 19A shows a cross-sectional view of a composite structure on a metal substrate where the surface of the polymeric interfacial material extends above the height of reinforcing material; FIG. 19B shows a cross-sectional view of a composite structure on a metal substrate where the surface of the polymeric interfacial material is the same height as the surface of the reinforcing material.

FIGS. 20A-20C are diagrams illustrating composite structures having a reinforcing material bonded to a substrate (20A); a polymeric interfacial material bonded to a substrate (20B); and a polymeric interfacial material and a reinforcing material in the absence of a substrate (20C).

DETAILED DESCRIPTION

The present invention includes compositions and processes for fabricating hydrophobic coatings and LIS coatings and other coatings with enhanced properties described herein that address needs not previously met in the art. In the following description, embodiments of the present invention are shown and described for carrying out the invention. It will be apparent that various modifications and alternative constructions may be made to the present invention. The present invention is intended to cover all such modifications, alternative constructions, and equivalents falling within the scope of the invention as defined in the claims. Therefore the description should be seen as illustrative and not limiting.

Figure 1:
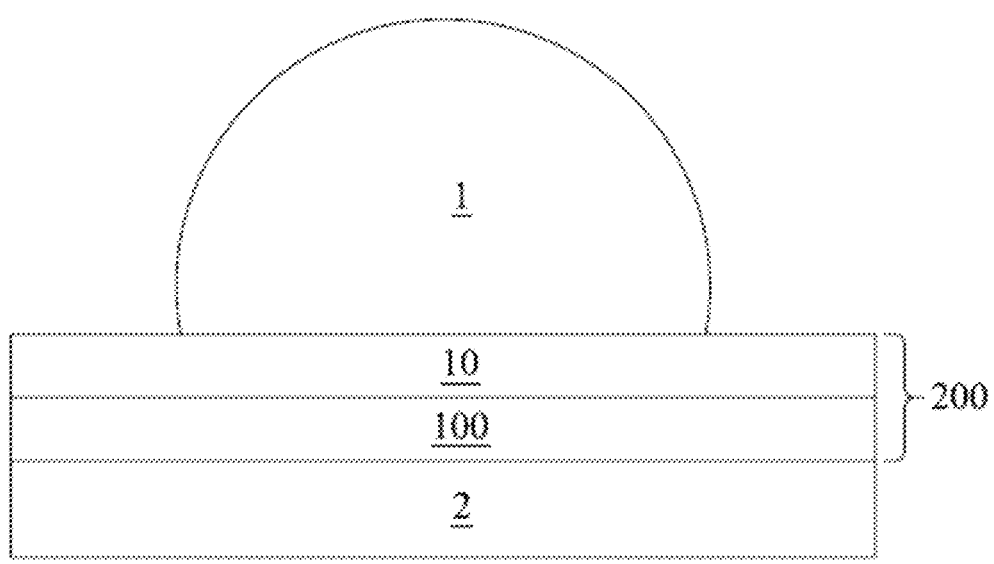
FIG. 1 illustrates an exemplary hydrophobic coating and a LIS coating of the present invention applied to an exemplary substrate.

FIG. 1 illustrates an exemplary process for forming hydrophobic coatings 100 and lubricant-infused surface (LIS) coatings 200 of the present invention. The term "hydrophobic" used herein means the coating provides a contact angle measured between a water droplet and the surface of the coating greater than or equal to about 135 degrees. The term "super-hydrophobic" means the coating provides a contact angle greater than or equal to about 150 degrees. The term "lubricant-infused surface" used herein refers to a coating formed when a lubricant is applied to an underlying coating or first layer on a selected substrate or surface. In different embodiments, the underlying coating may be a hydrophobic coating or a super-hydrophobic coating. The term "lubricant" used herein encompasses both lubricants and slippery liquids. The process may include applying or dispensing a hydrophobic coating composition to a substrate 2 to form the hydrophobic coating 100 on the substrate. The term "substrate" used herein encompasses all substrates, supports, and surfaces onto which coating compositions and coatings of the present invention described herein may be delivered, applied, or introduced. Substrates suitable for use include various supports and surfaces including, but not limited to, for example, textiles such as cotton and canvas; composite materials such as fiberglass; polymer materials; flexible materials such as latex and nitrile rubber; wicking materials such as fiberglass weaves and porous membranes; glass; steel; painted surfaces; coated surfaces, other selected materials, including combinations of these surfaces, materials, and substrates. For example, coating compositions of the present invention may be applied to substantially any surface or substrate to form uniform textured thin films. No limitations are intended.

Coating compositions may be dispensed or applied to a surface or substrate in selected solvents and gases. Solvents may include, but are not limited to, hydrocarbons including, e.g., hexanes and octanes, propanes, butanes, like solvents, and combinations of these solvents. Solvents lower the viscosity of the composition mixture such that it can be dispensed or painted, for example, by spraying. Dispensing gases include, but are not limited to, compressed gases such as compressed air, $CO_2$, compressed hydrocarbons (e.g., propanes and butanes), and other gases. No limitations are intended. Coating compositions may be applied in a single step without chemical or temperature pretreatment of the receiving surface or substrate enabling easy and rapid application. Coating compositions may be scaled to permit application to small and large coverage areas, and to smooth or uneven surfaces. Particulates in the coating compositions are secured and dispersed within the polymer binder as the polymer cures (e.g., dried) on the surface of the substrate. When cured, the polymer polymerizes and solidifies forming the coating on the surface or substrate. Curing times are not limited.

In some embodiments, hydrophobic coatings may be applied (e.g., painted) to substrates and used alone independent of any other coating.

In some embodiments, hydrophobic coatings may be applied over a tie (or base) coating.

In some embodiments, LIS coatings may be formed by coating a substrate with an underlying (base) hydrophobic coating and then infusing the coating with a lubricant.

Hydrophobic coating compositions of the present invention may include particles of a first material of a first selected size, and particles of a second material of a second smaller size combined in selected matrix polymers. First and second particles may be porous or non-porous. Polymers suitable for use in hydrophobic coating compositions and coatings of the present invention include, but are not limited to, siloxane polymers, silicone elastomers, fluoropolymers, fluorinated silicones, methacrylates; polypropylene; polyethylene; cellulose compounds (i.e., acetate); and combinations of these various polymers. Siloxane polymers may include, but are not limited to, hexamethylcyclotrisiloxane, octamethyltrisiloxane, octamethylcyclotetrasiloxane, decamethyltetrasiloxane, decamethylcyclopentasiloxane, dodecamethylpentasiloxane, dodecamethylcyclohexasiloxane, tetradecamethylhexasiloxane, and dimethylsiloxane.

In some embodiments, the polymer may be a polydimethylsiloxane (PDMS) polymer.

In the exemplary embodiment, quantity of the PDMS matrix polymer may be between about 10% and about 20% by weight. Remainder of the initial composition may be made up of a selected dispensing solvent.

Polymers are preferred that provide a low surface energy to the coating.

The hydrophobic composition may include pore-forming additives (porogens) that enhance pore formation in the polymer matrix of the hydrophobic coating when applied to a surface or substrate. Pore-forming additives are selected that maintain the chemical and mechanical stability of the hydrophobic coating. Pore-forming additives may be mixed into the hydrophobic coating composition prior to application to the substrate before curing or drying. Pore-forming additives suitable for use include, but are not limited to, block co-polymers, carboxymethylcellulose (CTAB), sugars, starches, salts, surfactants, micelle-forming surfactants, sodium dodecyl sulfate (SDS), and combinations of these materials. In some embodiments, the pore-forming additive may be a sugar, a starch, or a salt. Sugars, starches, and salts are not limited. Increase in porosity within the matrix polymer of the coating is a function of the quantity of the pore-former added to the coating composition. Pore size is defined and controlled by the size (diameter) of the particles used, for example, from angstroms to microns (μm). Added pores enhance the porosity present in the hierarchical structure of the hydrophobic coating. Sugars, starches, and salts, for example, are available in a wide range of particle sizes from coarse (e.g., millimeters) to fine (e.g., angstroms). Exemplary particle sizes for sugars include: powdered (~70 μm to 250 μm); granulated (~400 μm to 500 μm); coarse (~1000 μm to 1100 μm), or very coarse (~1500 μm to 1800 μm). No limitations are intended.

In some embodiments, pore-forming additives may be surfactants that include R-groups including, e.g., fluorophilic groups, lipophilic groups, and/or water-soluble groups that enable dispersion in the polymer.

Porosity added within the coating structure can provide beneficial properties including increased storage capacity for lubricant infused into the coating. Pores also improve the flow of lubricant through the system of interconnected open pores enabling transfer of lubricant to the surface of the coating. Increasing the capacity and transfer of lubricants in the LIS coating increases the lifetime, performance, and self-healing properties of the LIS coatings. Porosity within the polymer matrix of the coating may be scaled up or down for specific applications by controlling the quantity of pore former added to the hydrophobic coating composition.

Pore-forming additives added to the coating compositions can be removed from the resulting hydrophobic coating to enhance the number of open pores (i.e., porosity) in the coating available for infusion by lubricants. Pore-forming additives may be removed from the coating after curing or drying the coating. In various embodiments, pore-forming additives may be removed from the coating, for example, by thermal extraction, by liquid extraction (e.g., with water and other solvents), with selected surfactants, and other reactive chemicals. No limitations are intended.

Applying or delivering a lubricant 10 to the surface of the hydrophobic (e.g., a superhydrophobic) coating 100 forms the LIS coating 200.

In some embodiments, the underlying hydrophobic coating 100 may include a wicking material 24 described further herein (see FIG. 9A) positioned in contact with the substrate 2 that delivers a lubricant 10 from an internal or external lubricant reservoir (see FIG. 9B) to the surface of the hydrophobic coating forming the LIS coating 200.

In various embodiments, coating compositions and lubricants may be applied or dispensed to substrates with methods including, but not limited to, painting, brushing, brush painting, brush-coating, roller painting, spray-coating, spray painting, air-brushing, dip coating, including combinations of these various application methods. All scalable surface painting and coating approaches that yield the textured surface morphology of the hydrophobic coatings described herein may be used without limitation.

Coatings of the present invention are functionally robust and can synergistically combine hydrophobic and LIS properties. Coatings may be used alone without further chemical treatment or as a component of the LIS coating described further herein.

In some embodiments, substrates may be pretreated to improve binding of the coating composition to the substrate or surface. Pretreatment of the surface or substrate may include methods such as cleaning, sanding, or air drying. Pretreatment may also include coating the surface or substrate with a primer or tie coat that maximizes adhesion of the coating composition on surfaces or substrates that may not have an optimum chemical compatibility. Tie coats include, but are not limited to, polyurethanes and silicone elastomers that provide a transition from an undercoat or primer coat to a finish coat suitable for application of the hydrophobic coating and the LIS coating. However, the invention is not intended to be limited to applications that involve or require pretreatment. No limitations are intended.

Figure 2A:
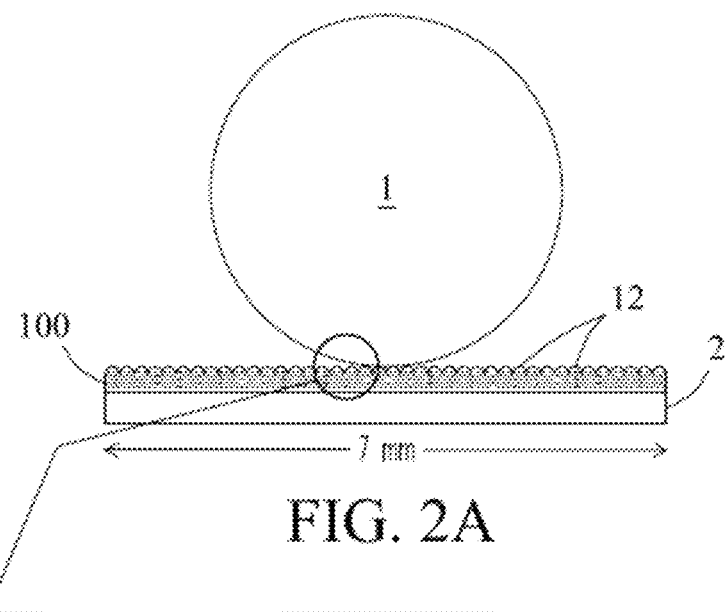
FIGS. 2A-2C illustrate different views of an exemplary hydrophobic coating of the present invention.

FIG. 2A illustrates a cross-sectional view of an exemplary hydrophobic coating 100 of the present invention. The hydrophobic coating includes protruding (mounded) surface features 12 comprised of a first porous particulate material described further in reference to FIG. 2B. Porous surface features 12 in the hydrophobic coating are overlaid with a textured surface comprised of a second particulate material description hereafter in reference to FIG. 2C that supports water and other liquids in the form of droplets 1 above the surface of the coating and prevents the liquids from wetting the underlying surface. The hydrophobic coating is also designed to support and stabilize a Lubricant detailed further herein when dispensed or applied to the hydrophobic coating.

Figure 2B:
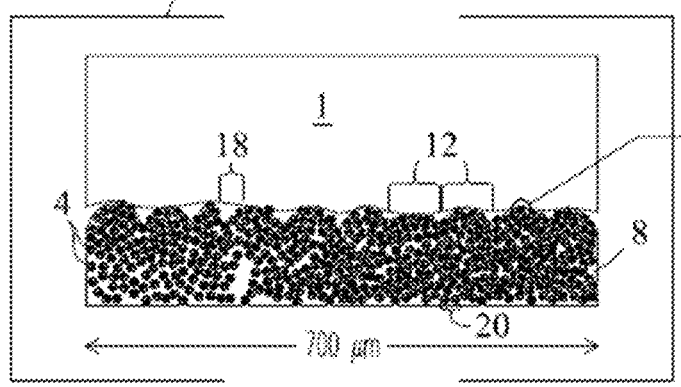

FIG. 2B is an expanded view of the hydrophobic coating 100 of FIG. 2A showing the sub-surface microstructure of the coating. Microstructure of the coating stems from the first particulate material (particles) 4 in the coating. First particulate materials may include synthetic or naturally-occurring materials including, but not limited to, silica, diatomaceous earth, metals, metal oxides (e.g., alumina and titania), ceramics, porous carbons, polymers, and combinations of these various particulate materials. Particles 4 may be porous (e.g., mesoporous and/or nanoporous particles) and/or non-porous. In some embodiments, the first particulate material may include mesoporous silica particles such as MCM-41® and/or nanoporous silica particles. Particles 4 also provide the coating with a selected surface morphology. For example, in the exemplary embodiment, mound features 12 at the surface of the coating are composed of aggregates of the first particulate material 4. In the figure, particles 4 in the hydrophobic coating may be fixed in a polymer matrix 8 comprised of selected polymers described herein.

Hydrophobic coating 100 may also include interstitial spaces 18 positioned between mound (i.e., particle aggregate) features 12 at the surface of the coating. Interstitial spaces 20 may also be located between adjacent particles 4 in the sub-surface of the coating. As shown in the figure, polymer 8 that forms the matrix of the coating fills interstitial spaces 18 and 20. Interstitial spaces may vary widely in size depending on whether the space is between the mound features or between particles. Interstitial spaces 18 between features 12 may be of a size up to about 250 um. Interstitial spaces 20 between particles may be about the same size as the particles between about 1 um to about 100 um. However, no limitations are intended.

Quantities of the first particles in the hydrophobic coating are not limited. In some embodiments, the hydrophobic coating composition may include a quantity of mesoporous silica particles between about 5% and about 25% by weight prior to dilution in the dispensing solvent (e.g., hexane), but compositions are not intended to be limited thereto.

In one exemplary embodiment, the hydrophobic coating composition prior to dilution in a delivery solvent may include percentages of the following major components: 64% PDMS (polymer), 12% MCM-41® (first particulate material), and 24% CAB-O-SIL® H-5 (second particulate material) by weight.

In another exemplary embodiment, the hydrophobic coating composition may include a sprayable or paintable form prepared in a dispensing solvent (e.g., hexane) with percentages of major components including: 90.9% hexane, 5.8% PDMS (polymer), 1.1% MOM-41® (first particulate material), and 2.2% CAB-O-SIL® H-5 (second particulate material) by weight.

In another exemplary embodiment, the hydrophobic coating composition may include a sprayable or paintable form prepared in a dispensing solvent with quantities of major components including: 25 g hexane, 1.6 g PDMS (polymer), 0.3 g MCM-41® (first particulate material), and 0.6 g CAB-O-SIL® H-5 (second particulate material). However, quantities of first and second particulate materials in the hydrophobic coating are not intended to be limited.

In some embodiments, first particles may include a larger size (diameter) from about 0.01 μm to about 40 μm.

In a preferred embodiment, first particles may include a size up to about 5 μm. In some embodiments, first particles may include a size between about 0.01 μm to about 5 μm.

In embodiments requiring optical transparency, particles may include a size below about 0.4 μm. In some embodiments, particles may include a size between about 0.1 μm to about 0.4 μm.

Figure 2C:
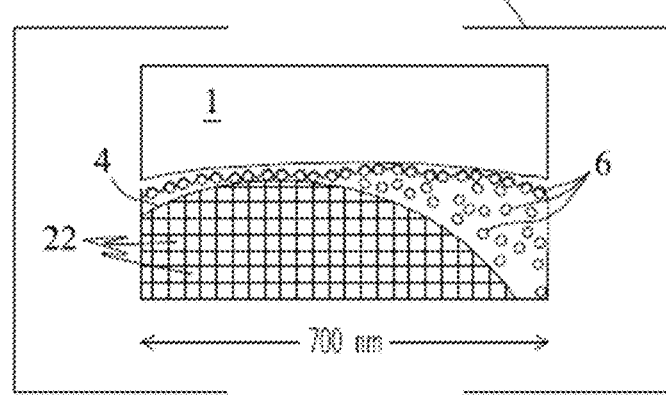

Lubricants described hereafter in reference to FIG. 2C when applied or delivered to the surface of the hydrophobic coating 100 wick into interstitial spaces 20 positioned between mesoporous and nanoporous (first material) particles 4 within the polymer matrix 8, into pores within the polymer matrix, and into internal pores 22 within these particles.

FIG. 2C is an expanded view of the hydrophobic coating 100 of FIG. 2A showing the nanostructure of the coating below the surface. Nanostructure of the coating stems from smaller (second) particles 6 in the coating. Particles 6 may be composed of synthetic or naturally-occurring materials described previously. Particles 6 may also be porous or non-porous. Smaller particles 6 in the coating overlay (i.e., are atop of) the mounded features 12 at the surface of the coating providing the surface with a nanotexture that supports lubricants at the coating interface when the lubricants are applied, delivered, or otherwise introduced to the hydrophobic coating. The term "supports" refers to the ability of particles located at the surface of the coatings to hold or retain lubricants when applied or delivered at or above the surface of the coating. The term also means particles within the coating can be infused by low-energy lubricants when the lubricants are applied or delivered to the surface of the coating.

Mounded features 12 at the surface of the hydrophobic coating are comprised of aggregates of larger (first) particles 4 described previously. Larger particles 4 may be porous particles that include internal pores 22 of various sizes (e.g., mesopores and/or nanopores) that provide capacity (i.e., lubricant reservoirs) for storage of lubricants when lubricants are applied, delivered, or introduced at the surface of the hydrophobic coating. Internal pores and other porous features within the underlying hydrophobic coating also serve to stabilize lubricants on the surface of the coating. The term "stabilizes" as used herein refers to the ability of particles in the hydrophobic coatings described herein to retain lubricants when applied or delivered to the surface of the coatings such that the lubricants are not easily or readily removed from the surface of the coatings.

Porous particles used in the hydrophobic coating compositions and coatings help stabilize (i.e., retain) the lubricant on the surface of the hydrophobic coating when applied or delivered. Porous particles may include selected pore sizes. Pore sizes are preferred that are sufficiently large to wick lubricants into the pores and sufficiently small to prevent lubricants from easily leaching out of the pores. Porosity of the coating may be tailored by selection of particle size, pore size, pore volume, and pore density of the particulate materials and the quantity of other porous features introduced in the polymer matrix, for example, by addition of pore-forming materials described herein. In some embodiments, porosity may be selected up to about 83% by volume. However, no limitations are intended.

In some embodiments, pore size may be selected between about 1 nm to about 1 μm. In some embodiments, pore size for stabilization of lubricants may be selected between about 1 nm to about 200 nm. In some embodiments, pore size may be selected between about 3 nm to about 30 nm. In some embodiments, pore size may be selected between about 3 nm to about 500 nm. In some embodiments, pore size may be selected between about 5 nm to about 50 nm. In one embodiment, pore size may be about 9 nm. Pore sizes are exemplary only and not intended to be limiting.

Smaller (second) particles may be composed of synthetic or naturally-occurring materials including, but not limited to, silica, metals, metal oxides such as alumina and titania, diatomaceous earth, ceramics, polymers, and other particulates, including combinations of various materials. Exemplary materials described herein are not intended to be limiting. In some embodiments, the smaller particles may be composed of non-porous fumed silica particles or nanofibers such as CAB-O-SIL® H-5, which is composed of fiber-like chains or nanoparticles of silica. In some embodiments, smaller particles may include a size (diameter) up to about 40 nm. In some embodiments, smaller particles may include a size between about 7 nm to about 20 nm. In some embodiments, smaller particles may include a size between about 1 nm and about 50 nm. In some embodiments, smaller particles may include a size between about 1 nm to about 100 nm. In some embodiments, smaller particles may include a size selected between about 30 nm to about 100 nm. In some embodiments, smaller particulate fibers may include a length up to about 500 nm. Again, particle sizes are exemplary and not intended to be limiting.

First and second particulate materials may be modified to include selected surface chemistries that aid dispersion in the polymer matrix, improve bonding with the polymer, reduce clumping in the coating, and/or assist stabilization of lubricants when applied or delivered to the surface of the coating.

In some embodiments, porosity within the hydrophobic coating or LIS coating may be infused with liquid biocides that provide the coatings with biocidal and antifouling properties. Biocides suitable for use include, but are not limited to, for example, copper; copper oxides; copper salts; copper bis(1-hydroxy-2(1H)-pyridinethionato-O; zinc ethylenebis; zinc dimethyl dithiocarbamate/ziram; napthenic acids; pyridine-triphenylborane; zinc 2-pyridinethiol-1-oxide/pyrithione zinc; 3-(3,4-Dichlorophenyl)-1,1-dimethyl urea/diuron; pyridine-triphenylborane; 2,3,5,6-Tetrachloro-4-(methylsulphonyl) pyridine; N-(2,4,6-Trichlorophenyl) maleimide; dichloro-N-[(dimethylamino)sulphonyl]; fluoro-N-(p-tolyl)methanesulphenamide/tolylfluanid; N,N-dimethyl-N-phenyl-N-(dichlorofluoromethylthio) sulfamide/dichlofluanid; 2-methylthio-4-tert-butylamino-6-cyclopropyl-amino-striazine; 4,5-dichloro-2-n-octyl-4-isothiazolin-3-one; 2,4,5,6-tetrachloroisophthalonitrile; tetramethylthiuram disulphide, and combinations of these various biocides. Biocides can also be dissolved in LIS lubricants used to infuse the open porosity within the hydrophobic coating. In some embodiments, biocides soluble in LIS lubricants may include fluorocarbon functional groups. Biocides with fluorocarbon functional groups soluble in LIS lubricants include fluorocarbon metal chelates such as hexafluoroacetylacetonate copper complexes and hexafluoroacetylacetonate tin complexes. No limitations are intended.

In some embodiments, biocides added to the coating composition may be in the form of biocidal particles. In some embodiments, biocidal particles may be added as structural components of the coating compositions such as, for example, porous biocidal particles used as a first particulate material. Exemplary biocidal particles used as a first particulate material in the coating may include larger porous particles of copper and silver. In some embodiments, smaller biocidal particles may be added as structural components of the coating compositions such as, for example, small or fine (i.e., nanometer-scale) biocidal particles used a second particulate material. Exemplary biocidal particles used as a second particulate material in the coating may include nanoparticles of silver, copper, and stabilized micellular organic biocides all dispersible within the polymer matrix of the coating. No limitations are intended by the disclosure of exemplary materials.

In some embodiments, particles in the hydrophobic composition may include solid particles including porous and non-porous particles containing inorganic or organic biocides, metals (e.g., copper and silver), and other materials that impart antifouling properties to the hydrophobic coating.

Hydrophobic coatings may include selected, non-limiting thicknesses. Minimum thickness is about the radius of the first particulate material in the coating, i.e., about 1 μm. However, no limitations are intended. For example, in some embodiments, thicknesses may be about 50 nm. In some embodiments, thicknesses may range from about 0.2 μm to about 2 mm. In some embodiments, thicknesses may be between about 0.1 μm to greater than 2 mm. In some embodiments, thicknesses may between about 5 μm to about 10 μm.

Properties of the hydrophobic coating include, but are not limited to, a water contact angle exceeding 150°, a low water roll-off angle, and a low surface energy. Properties are attributed to the composition and structure described herein. In some embodiments, the hydrophobic coating provides a water roll-off angle less than about 10 degrees. Surface energies for coated surfaces may be calculated using the Owens-Wendt equation [Owens, D. K.; Wendt, R. C., *J. Appl. Polym. Sci.* 1969, 13 (8), 1741-1747] by measuring contact angles for a polar liquid (e.g., water) and for a non-polar liquid (e.g., diiodomethane) on the surface of the coating. In various embodiments, hydrophobic coatings when applied to substrates provide a surface energy below about 20 mJ/m$^2$. In some embodiments, surface energy is between about ~2 mJ/m$^2$ and about 15 mJ/m$^2$. Hydrophobic coatings of the present invention may also include wicking materials or other fibrous or porous components that aid retention of lubricants when applied to the surface of the hydrophobic coating, described further in reference to FIGS. 9A-9B below.

Figure 3A:
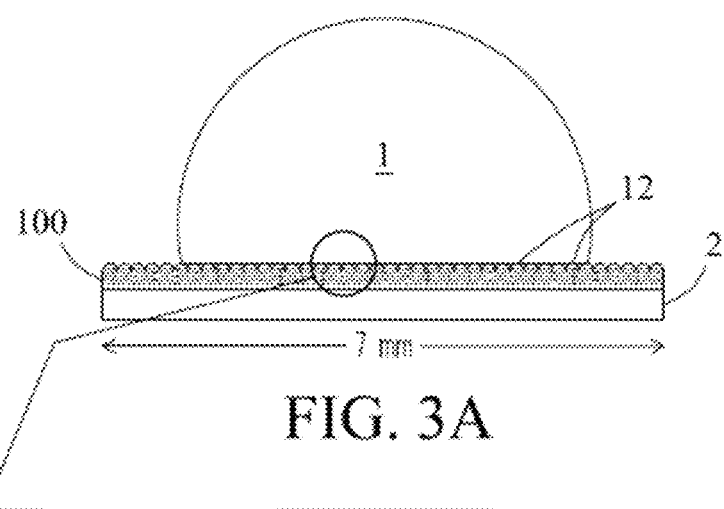
FIGS. 3A-3C illustrate different views of an exemplary LIS coating of the present invention.

FIG. 3A illustrates a cross-sectional view of the surface of an exemplary LIS coating 200 of the present invention. In this embodiment, the LIS coating includes the hydrophobic coating described previously and a lubricant 10 that is applied, delivered, or introduced to the surface of the hydrophobic coating. Lubricants enhance properties of the hydrophobic coated surface and may exhibit properties of both the hydrophobic coating and the lubricant. In the figure, the LIS coating is shown supporting a water droplet 1, which prevents the water droplet from wetting the underlying surface. Mound features 12 at the surface of the hydrophobic coating, with their nano-textured surfaces, support and stabilize the lubricant 10 as a layer on the surface of the hydrophobic coating when the surface is exposed to flowing liquids, water, other media, pressure, or centripetal forces.

In some embodiments, the lubricant may be a fluorocarbon polymer comprised of a fluorine homopolymer of hexafluoropropylene epoxide (e.g., KRYTOX®). Dupont, Wilmington, Del., USA) of the following general formula [1]:

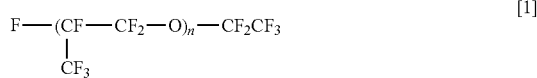

Within any volume of the lubricant, the lubricant polymer may include a number of monomer units (n) from about 10 to about 60. The polymer chain may be saturated so as to contain only the elements of carbon, oxygen, and fluorine, with no hydrogen present. On a weight basis, typical KRYTOX® oils [CAS registry number is (60164-51-4)] contain 21.6% carbon, 9.4% oxygen, and 69.0% fluorine.

In some embodiments, the lubricant may be a fluorocarbon polymer comprised of polyhexafluoropropylene oxide with the general formula [2]:

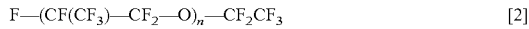

Again, the polymer may include a number (n) of monomer units from about 10 to about 60. KRYTOX® greases may include base oils and thickeners such as polytetrafluoroethylene (PTFE) that form the grease. In some embodiments, the lubricant may contain a fluorocarbon polymer with ether functionality including, but not limited to, perfluoropolyether (PFPE), perfluoroalkylether (PFAE) and perfluoropolyalkylether (PFPAE). In some embodiments, the lubricant may include a homopolymer of hexafluoropropylene epoxide.

In some embodiments, lubricant uptake by the hydrophobic coatings can be accelerated by heating the lubricant to between about 60° C. to about 70° C. to lower the viscosity and/or by heating the hydrophobic coating to promote rapid uptake. No limitations are intended.

In some embodiments, a volatile primer solvent such as an alcohol (e.g., isopropanol) can be applied to the hydrophobic coating before lubricant is applied which wets the hydrophobic coating and removes air pockets which facilitates infusion of the lubricant into the hydrophobic coating and subsurface features that serve as lubricant reservoirs therein.

Lubricant may be dispensed until the textured surface and porous features of the hydrophobic coating are saturated. However, delivery of the lubricant is not intended to be limited to saturation conditions only. Saturation is indicated by non-uniform accumulation (e.g., beading) of the lubricant on the surface of the hydrophobic coating.

Lubricants may include selected forms including, but not limited to, greases, oils, and gels. Lubricants may include selected viscosities that permit the lubricants to be dispensed or applied over regular and irregular surfaces, over a wide range of dimensions, or over large and small surface areas. Viscosities are preferably selected between about 0.02 cm$^2$/s to about 20 cm$^2$/s, but are not intended to be limited.

LIS coatings may include selected thicknesses. Thicknesses of the LIS coating stem primarily from the thickness of the underlying hydrophobic coating with its associated microstructure and nanostructure. Lubricants that form the LIS coating do not add substantially to the thickness of the underlying hydrophobic coating. Addition of the Lubricant increases the hydrophobic coating thickness by less than about 1 μm on average.

LIS coatings of the present invention provide one or more selected properties including, but not limited to, contact angles greater than or equal to about 115°; roll-off angles below about 5°; and surface energies below about 20 mJ/m$^2$. The low surface energy of LIS coatings is provided by the stability of the lubricant layer positioned between the hydrophobic coating and liquids and other fouling media that come in contact with the LIS coating.

LIS coatings of the present invention are also self-healing. Low surface energies of lubricants allow the lubricants to spread easily across the surface of the hydrophobic coating when applied. Ability to spread enables lubricants to fill voids if the LIS coating is damaged or scratched. Lubricants residing within porous features of the underlying hydrophobic coating can also be released to the surface, which restores lubricant lost or depleted from the surface due to abrasion, damage, or immersion in liquids or other fouling media over time. The self-healing property restores superhydrophobic and anti-wetting properties of the surface which extends the useful lifetime of the LIS coating. Properties of the LIS coating revert to those of the underlying hydrophobic coating if the quantity of lubricant at the surface is substantially reduced or temporarily depleted from the surface of the LIS coating.

Figure 3B:
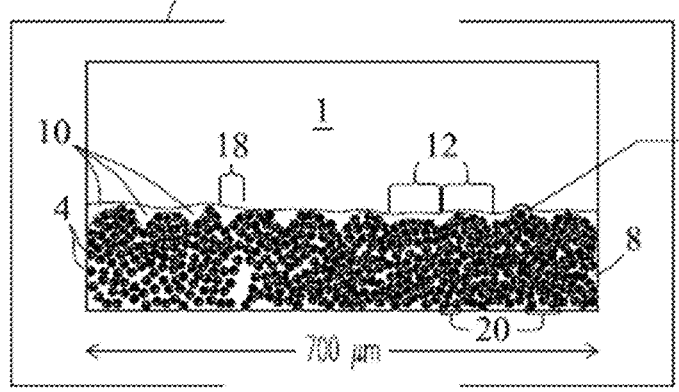

FIG. 3B shows an expanded view of the microstructure of the LIS coating 200. Lubricant 10 fills the microstructure of the hydrophobic coating including interstitial spaces 18 between the surface features 12. In the figure, nanoparticles 6 composed of the second particulate material overlay the porous surface features 12 and yield the texture of the surface features as described previously.

Figure 3C:
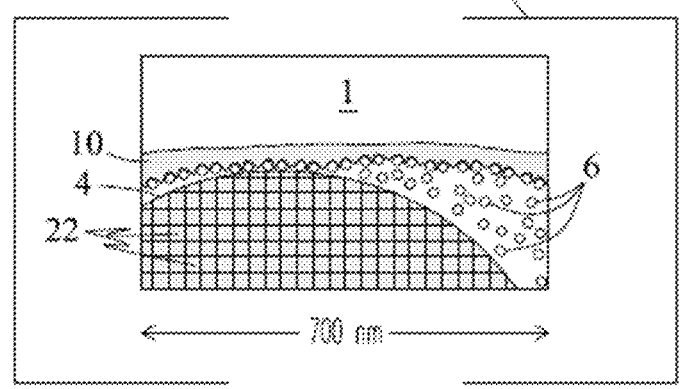

FIG. 3C shows an expanded view of the nanostructure of the LIS coating. In the figure, (first) porous particles 4 in the protruding mounded surface features 12 wick the Lubricant 10 when applied, which infuses internal pores 22 of the porous particles 4, interstitial spaces 18 between the surface features 12, and interstitial spaces 20 between the porous particles 4 that occupy the subsurface in the polymer matrix of the hydrophobic coating. Pores 22 of porous particles 4, and interstitial spaces 20 positioned between the porous particles serve as reservoirs that retain and store the lubricant in the subsurface of the hydrophobic coating. The porous structure of the hydrophobic coating readily infuses with lubricant due to the low surface energy of the lubricant. When filled with lubricant, air pockets positioned around the porous surface features 12 are no longer penetrated by water.

Porosity in the hydrophobic coating may be increased by addition of pore-forming additives to the coating composition described previously. Pore-forming additives increase the pore volume within the polymer matrix of the hydrophobic coating when formed that can then serve as additional lubricant reservoirs when lubricants are applied, delivered, or introduced to the surface of the hydrophobic coating. Lubricant when applied or delivered to the surface of the hydrophobic coating yields the LIS coating.

In some embodiments, porous particles may be infused with lubricant before being introduced into the hydrophobic coating composition prior to being dispensed to a surface or substrate. Lubricant-infused particles may serve as lubricant reservoirs to replenish lubricant when the lubricant is depleted or removed from the LIS coating surface. Lubricants may also be reapplied to the surface of the hydrophobic coating when depleted to restore the hydrophobic and anti-wetting properties of the LIS coating. However, the present invention is not limited to physical reapplication of lubricants. For example, in some embodiments, lubricants depleted or lost from the LIS coating surface may be re-applied from lubricant-infused pores in the underlying hydrophobic coating by dissolving a layer or portion of the polymer matrix, which releases the lubricant and restores LIS properties of the LIS coating. Dissolution of a layer or portion of the polymer matrix may occur as part of a self-polishing mechanism that occurs slowly throughout the life cycle of the coating.

Figure 9A:
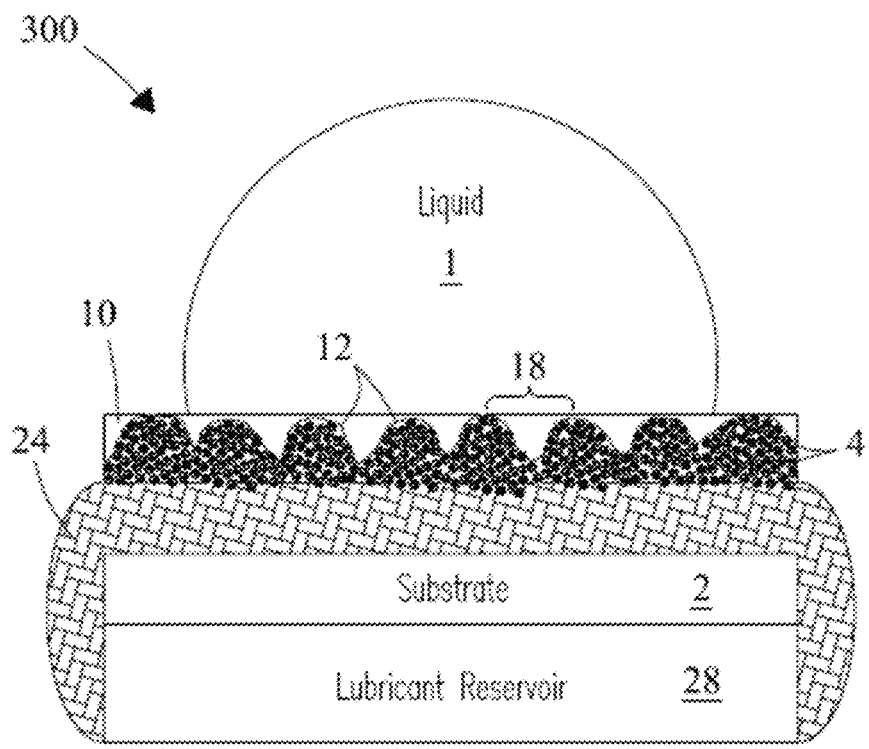
FIGS. 9A-9B illustrate exemplary composite structures incorporating wicking materials according to different embodiments of the present invention.
Figure 9B:
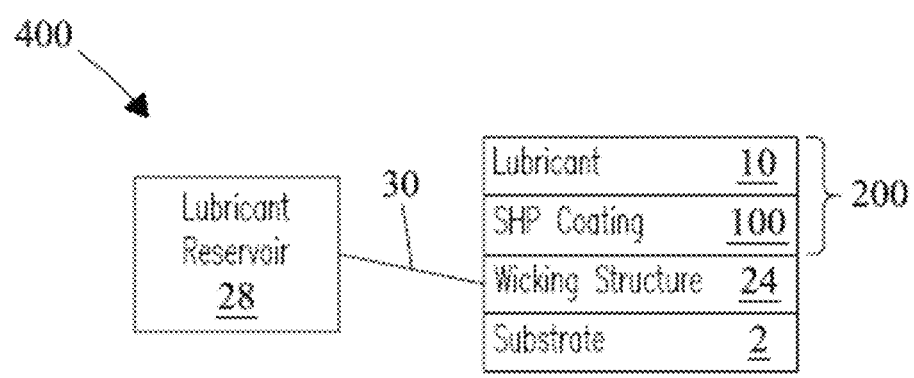

Hydrophobic coatings and LIS coatings of the present invention may be configured with wicking materials that aid retention of lubricants at the surface, as described further in reference to FIGS. 9A-9B.

Hydrophobic coatings and LIS coatings of the present invention can be customized for selected and diverse applications. For example, hydrophobic compositions may be configured to have a higher or lower percentage of hard silica embedded in the soft polymer matrix or to be more porous or less porous as detailed herein. Proportion of silica may be used to control wear, durability, hardness, and stiffness of the resulting coating. Thus, no limitations are intended by description of exemplary structures herein.

Figure 4:
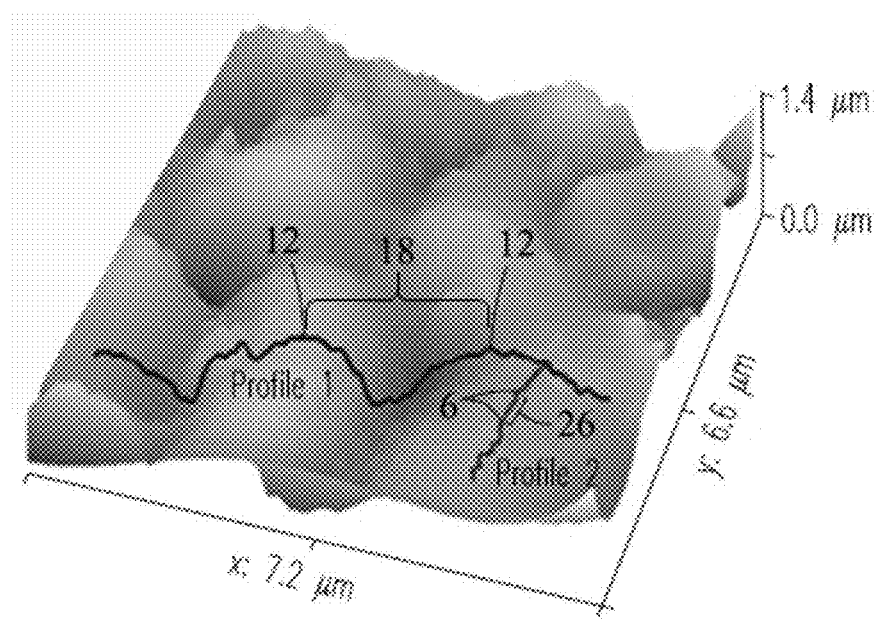
FIG. 4 shows an exemplary surface profile of a hydrophobic coating of the present invention.

FIG. 4 is an atomic force microscopy image showing surface profiles of the exemplary hydrophobic coating of the present invention. The hydrophobic coating includes a hierarchical structure. The first surface profile (profile 1) includes mounded surface features 12 of a micron scale that are composed of the first particulate material (FIG. 2B). In the exemplary embodiment, the first particulate material may be comprised of mesoporous silica particles (e.g., MCM-41®) described previously. Interstitial spaces 18 are shown positioned between the mounded surface features. The second surface profile (profile 2) includes surface features 6 of a nanoscale composed of the second particulate material described previously. In the exemplary embodiment, the second particulate material may be comprised of nanoparticles of fumed silica (e.g., CAB-O-SIL® H-5, Boston, Mass., USA) that overlay the larger mounded features within the hydrophobic coating and give the hydrophobic coating a nanoscale surface texture. The nanoparticles in the hydrophobic coating stabilize the lubricant when applied to the surface of the hydrophobic coating.

Figure 5A:
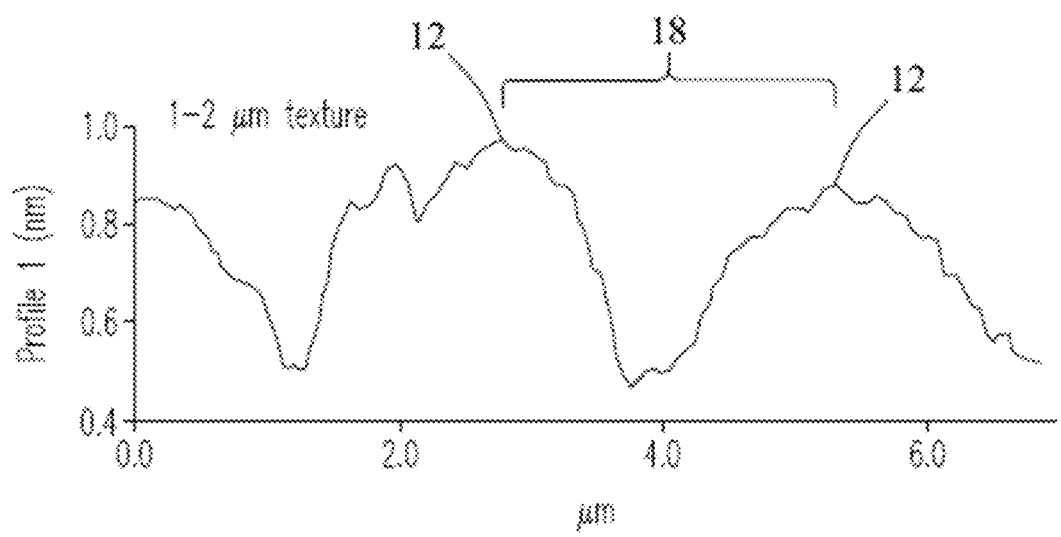
FIGS. 5A-5B show typical dimensions of microscale and nanoscale surface features of the hydrophobic coating of FIG. 4.

FIG. 5A shows exemplary dimensions of the porous (mounded) surface features 12 in the first surface profile described previously in reference to FIG. 4. The mound features include a height and a diameter of about 2 μm. In some embodiments, surface features 12 (mounds) in the hydrophobic coating may have a dimension in both height and diameter between about 1 μm to about 15 μm. However, dimensions are not intended to be limited. Porous surface features deliver desired hydrophobic properties to the hydrophobic coating and serve as reservoirs for retention of lubricants when applied to the surface of the hydrophobic coating.

Figure 5B:
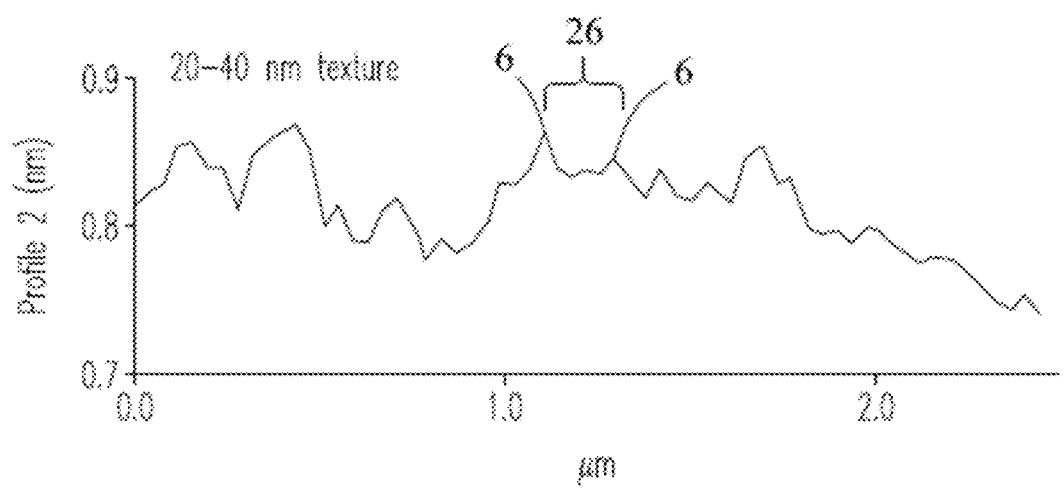

FIG. 5B shows exemplary dimensions of the nano-textured surface features 6 in the second surface profile described previously in reference to FIG. 4. In the exemplary embodiment, the nano-texture may have a dimension in both height and diameter between about 20 nm to about 40 nm that stabilizes lubricants when delivered to the surface of the hydrophobic coating. However, dimensions are not intended to be limited.

Water contact angles are a comparative measure of hydrophobicity of a surface coating. Higher contact angles indicate a more hydrophobic surface which typically exhibits better antifouling properties.

Figure 6A:
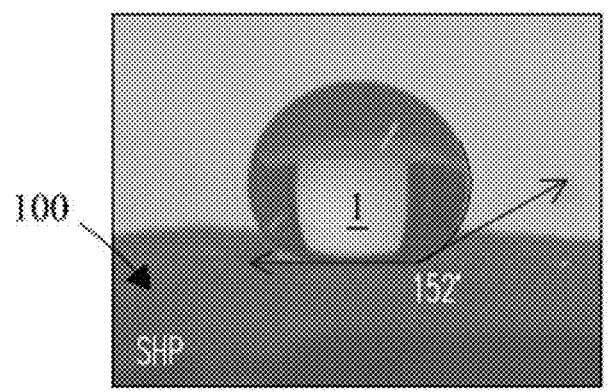
FIGS. 6A-6C present different views of an exemplary hydrophobic surface coating of the present invention.
Figure 6B:
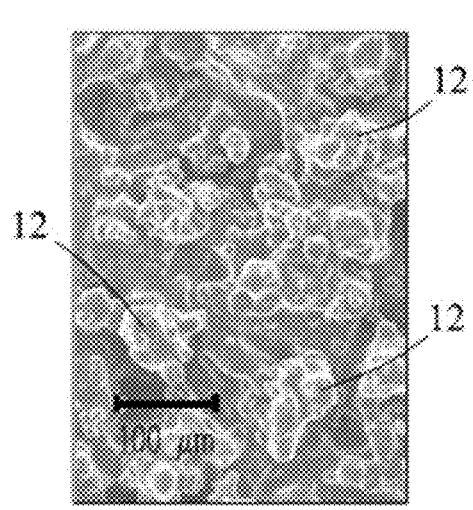
Figure 6C:
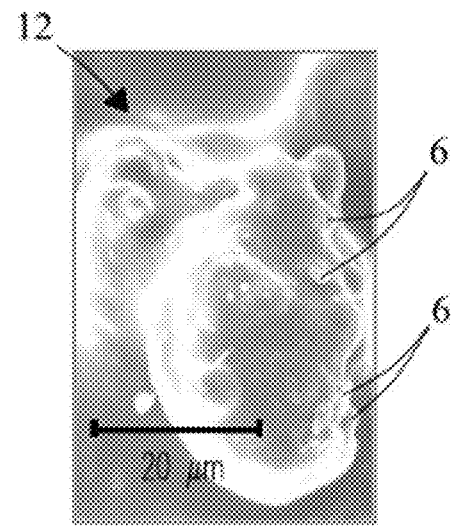

FIG. 6A is a photograph showing a hydrophobic surface coating 100 of the present invention on which a single drop of water 1 is positioned. In the instant embodiment, the coating is a super-hydrophobic coating with a contact angle measured at the surface of 152.4°, which delivers an anti-wetting property. FIG. 6B and FIG. 6C are scanning electron micrographs (SEMs) showing the microstructure of the hydrophobic coating at two resolutions, i.e., 20 μm and 100 μm, respectively. In the figures, the microstructure is characterized by porous (mounded) surface features 12 composed of agglomerates (clusters) of mesoporous particles (e.g., mesoporous silica) (not shown). In various embodiments, the porous (mounded) surface features include a size between about 2 μm and about 100 μm. The porous (mounded) surface features 12 further include small protrusions (~2 μm) 6 that give the hydrophobic coating a nano-textured surface. The nano-textured surface features 6 stem from fumed silica in the hydrophobic coating described previously in reference to FIG. 3B.

Figure 7A:
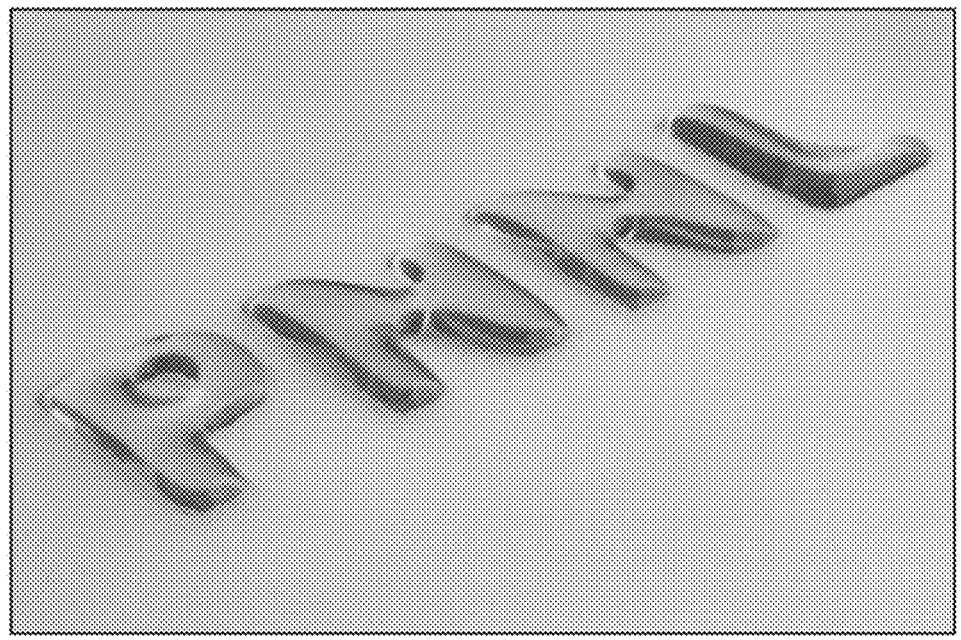
FIGS. 7A-7B are photographs showing positive and negative mask coated surfaces prepared in accordance with the present invention, respectively.
Figure 7B:
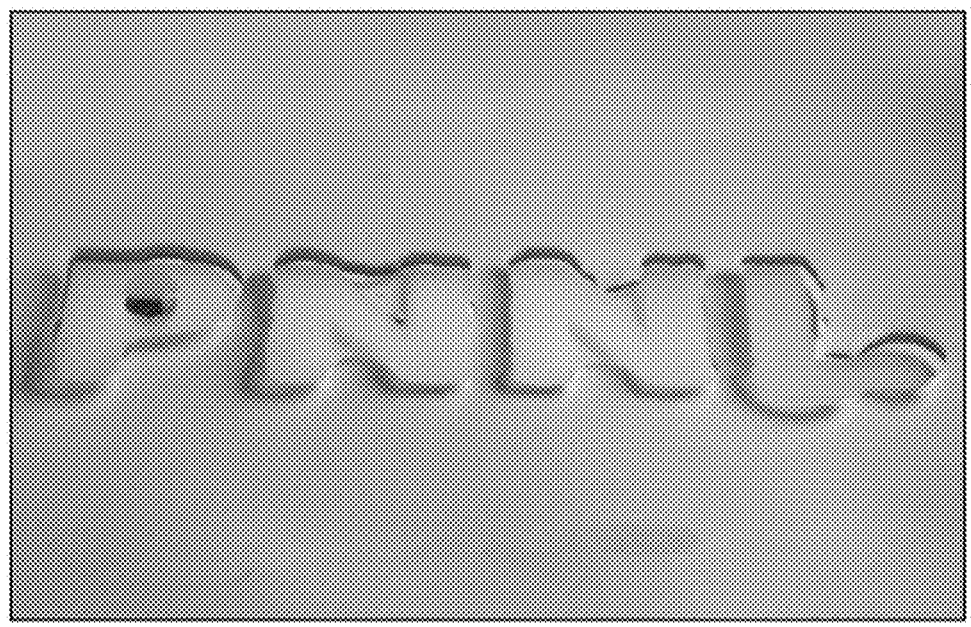

FIG. 7A is a photograph showing a hydrophobic coating painted onto a surface. Letters were stenciled onto the surface from a negative mask and left unpainted (uncoated). Water droplets move to the uncoated surface demonstrating that the hydrophobic coated surface exhibits a strong anti-wetting property. FIG. 7B is another photograph showing a hydrophobic coating in which letters were stenciled onto the surface from a positive mask. Only the letters were painted with the hydrophobic coating. Results show the hydrophobic coating exhibits a strong anti-wetting property.

Figure 8A:
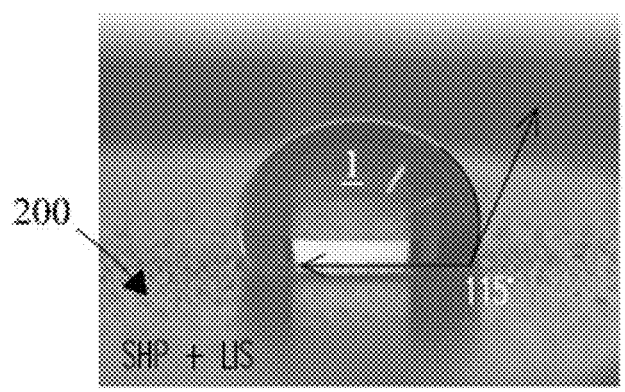
FIGS. 8A-8C present different views of a LIS coating of the present invention.

FIG. 8A is a photograph of an exemplary LIS coating 200 of the present invention. Application of the lubricant (e.g., KRYTOX®) to the hydrophobic coating forms the LIS coating. LIS coatings exhibit a surface energy above that of the underlying hydrophobic coating providing superior anti-fouling properties. In the figure, a single water droplet 1 is shown positioned on the surface of the coating that is at least partially supported by the lubricant (not shown) in the LIS coating. Lubricant is in turn supported by underlying surface features of the hydrophobic coating (not shown). The LIS coating prevents the water droplet from wetting the surface, demonstrating the anti-wetting property of the coating. In the figure, contact angle measured at the surface of the LIS coating is 115 degrees (114.5 degrees), slightly lower than that observed for the hydrophobic coating described previously (FIG. 6A). Results are attributed to partial filling by the lubricant of the underlying surface texture of the hydrophobic coating. Typical water contact angles for LIS coatings are between about 110 degrees to about 120 degrees on average.

Figure 8B:
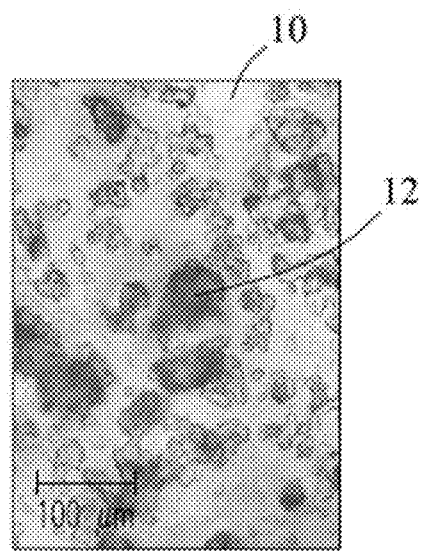
Figure 8C:
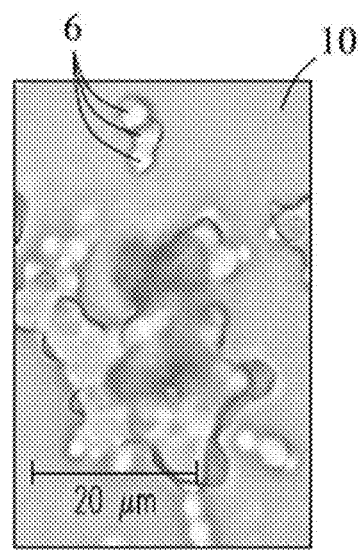

FIG. 8B and FIG. 8C are optical micrographs showing the surface texture of LIS coating at two resolutions, i.e., 20 μm and 100 μm, respectively. Nanoparticles 6 (described previously in reference to FIG. 2C) are shown embedded in the polymer matrix of the underlying hydrophobic coating positioned atop porous surface features (not shown), and infused with the Lubricant 10.

LIS coatings of the present invention resist wetting by various liquids. Antifouling properties are due in part to low surface energy and low surface friction values of these coatings. LIS coatings have surface energies close to those of the applied lubricants (e.g., KRYTOX®) and slightly higher than the underlying hydrophobic coating. The low surface energies permit the lubricant to completely cover the underlying hydrophobic coated substrate. LIS coatings also have a surface energy significantly lower than the surface tension of water (72 mJ/m$^2$) such that water and water-containing liquids readily release from the LIS coating or form liquid droplets if not removed from the sample surface. In some embodiments, LIS coatings of the present invention may include a surface energy value (e.g., 12.5 mJ/m$^2$) lower than the matrix polymer (e.g., PDMS) in the underlying hydrophobic coating (e.g., 15 mJ/m$^2$). In some embodiments, LIS coatings include a surface energy below about 20 mJ/m$^2$. In some embodiments, LIS coatings include a surface energy between about 15 mJ/m$^2$ and about 20 mJ/m$^2$. In some embodiments, LIS coatings include a surface energy between about 12 mJ/m$^2$ and 22 mJ/m$^2$. LIS coatings easily shed liquids with low tilt angles or roll-off angles of less than about 10 degrees or light agitation which is lower than that observed for the hydrophobic coating. In some embodiments, roll-off angle may be less than about 5 degrees. LIS coatings readily repel water despite a small drop in hydrophobicity compared to the hydrophobic coating. LIS coatings also resist fouling by reducing the surface area available for attachment of the fouling material or liquid in concert with the lubricant spread over the surface of the LIS coating. TABLE 1 compares properties of hydrophobic coatings and LIS coatings of the present invention against various conventional coatings known in the art.

TABLE 1

| Material | Water contact angle (degrees) | Surface energy (mJ/m$^2$) | Roll-off angle (degrees) |
|---|---|---|---|
| Embodiments of the Present Invention | | | |
| PDMS[#] | 112 | 14.8 | 75 |
| PDMS + Porous Silica Particles[#] | 130 | 13.6 | 25 |
| SHP Coating[#] (PDMS + Porous particles + Fine Particles) | 151 | 3.1 | 8.0 |
| LIS Coating[#] (PDMS + Porous particles + Fine Particles + Lubricant) | 114 | 13.8 | 4.6 |
| Reference Materials | | | |
| Fiberglass | 48 | 51.7 | >90 |
| Steel | 39 | 50.5 | 29 |
| Glass | 51 | 48.6 | 34 |
| Copper | 40 | 41 | 30 |
| Plastics | 70-100 | 30-40 | >90 |
| TEFLON ® | 97 | 24.1 | 15 |
| INTERSLEEK ® Anti-Fouling paint | 68 | 34.5 | 25 |
| Pitcher plant Natural LIS surface | 71 | 38 | N/A |
| Lotus Leaf Natural SHP surface | 163 | 0.6 | 9.0 |

[#]Values are averages from five samples. PDMS and silica are exemplary materials and not meant to be constraining.

The hierarchical microstructure and nanostructure (nanotexture) of the surface coatings are water repellent and provide antifouling properties. Data show that incorporating nanoporous silica (first particulate material) with PDMS in the hydrophobic coating increases the water contact angle. Nanotexture at the surface of the coating stemming from the addition of fine silica (second particulate material) decreases the surface area of the coating in contact with liquids, which decreases the surface energy of the resulting coating. Hydrophobic coating compositions and coatings of the present invention are inexpensive and are formed of non-toxic components that can be easily deposited on a wide range of surfaces and materials. Data further show that infusion of the hydrophobic coating with lubricant yields a LIS coating with a lower contact angle and a higher surface energy than the underlying hydrophobic coating. The lubricant can surround microstructures at the surface of the coating that reduces surface roughness or texture. However, while contact angle and surface energy may be reduced, droplet mobility is not reduced. Roll-off angle for the LIS coating is lower than for other tested materials, which renders the LIS coating highly water repellent.

Hydrophobic coatings of the present invention also include a composition and structure that support and retain lubricants when applied that provide a separate functional modality as lubricant infused surfaces (LIS) coatings. LIS coatings of the present invention are self-healing and thus robust. The low surface energy of LIS coatings permits lubricants to flow into damaged or abraded areas on the surface extending the useful lifetime. Hydrophobic coatings and LIS coatings may be separately applied or delivered in a single step. And, unlike conventional advanced materials, both the hydrophobic coating composition and lubricants are scalable permitting easy application to small, large, uneven, or irregular surfaces and substrates such as those of ship hulls. For example, low friction hydrophobic coatings and LIS coatings of the present invention when applied to ships and other cargo-bearing vessels operating in water environments may demonstrate improved fuel efficiency due to a reduced drag and a reduced accumulation of fouling organisms (e.g., bacteria, diatoms, algae, barnacles, and like organisms) coatings. All applications as will be envisioned by those of skill in the art in view of the disclosure are within the scope of the present invention.

Hydrophobic coatings and LIS coatings also have extended lifetimes owing to the porous structure of the hydrophobic coating that aids retention of the lubricant. In addition, hydrophobic coatings and LIS coatings of the present invention may be used independently or may be combined to provide enhanced and advantageous properties. The hydrophobic coating and lubricants work synergistically and independently. For example, when combined, hydrophobic coatings and LIS coatings of the present invention synergistically combine hydrophobic and LIS properties. For example, particulate materials in the hydrophobic coating maximize storage and delivery of lubricants to the surface. And, retention of lubricants by the hydrophobic coating does not hinder performance of the lubricants. Further, nanotextured features arising from the smaller particles in the underlying hydrophobic coating serve to support and retain lubricants when applied or delivered to the hydrophobic coating. LIS coatings of the present invention also include antifouling properties suitable for use in fouling environments and applications such as, for example, ship coatings and antibacterial surfaces for medical, biological, and other industrial applications. The underlying hydrophobic coating can also repel water and other fouling substances independently should the lubricant be removed. And, lubricants may be easily reapplied or replaced as described herein to restore antifouling and low-friction properties. In addition, hydrophobic coatings and LIS coatings of the present invention provide higher contact angles and lower surface energy values on average than conventional non-stick materials such as TEFLON®. Coatings of the present invention also provide advantageous structural features. For example, the coatings are flexible and have enhanced strength. The hydrophobic composition includes inorganic components that also reduce costs of preparing the compositions. Coating compositions are also adjustable, meaning components may be modified to include various materials that allow properties to be tailored. Coating compositions may also be applied in a single application step.

Composite (Wicking) Structures

The present invention includes composite structures that include various wicking materials as components of the composite structure. Retention of lubricant in a lubricant-infused surface (LIS) coating may not be permanent when LIS coated surfaces are exposed to high flows of liquids for extended periods of time. Desirable and advantageous LIS properties of LIS coatings may be lost if lubricant is removed from the surface. Functional lifetimes of LIS coatings can be extended in concert with an embedded reservoir that retains lubricant within the LIS coating. Extending the available volume of the lubricant reservoir that allows the reservoir to automatically and continuously replenish lost lubricant on demand can significantly improve the performance of the coating in various applications. Using a lubricant wicking structure to replenish the lubricant in the LIS coating enables a much longer operational lifetime. FIG. 9A illustrates an exemplary composite LIS coated surface system (structure) 300 according to one embodiment of the present invention. The composite structure includes a selected wicking structure 24 or material in contact with substrate 2 with a LIS coating 200 positioned on the surface of the wicking material. Wicking structure 24 is in fluid contact with an integrated lubricant-filled reservoir 28, container, or device that supplies a lubricant 10 through the wicking structure 24 to the surface of the LIS coating. Wicking structure 24 continuously infuses the surface of the LIS coating 200 with lubricant 10 that replenishes the lubricant.

Wicking materials suitable for use include, but are not limited to, textured materials, fibrous materials, and porous materials such as, textiles, fabrics, fiberglass, weaves of these various materials, porous membranes, self-polishing co-polymers, porous textured substrates, and other fibrous and porous materials that form fibrous or porous networks within the wicking materials. In some embodiments, the wicking structure 24 may serve as its own support rendering the substrate 2 unnecessary. No limitations are intended.

Lubricants delivered to the surface may fill interstitial spaces 18 positioned between porous (mounded) surface features 12 with their aggregates of porous (first) particles 4. Lubricants may further fill smaller interstitial spaces 26 positioned between nanoporous (second) particles 6 which overlay porous surface features 12 of the composite structure. Smaller interstitial spaces 26 may include a size of between about 5 nm to about 50 nm. Nanoporous particles 6 form the surface texture at the surface of the composite structure. Wicking materials or structures in the composite structure stabilize Lubricants at the surface of the LIS coating so that they are not easily leached or removed. Wicking materials and structures also serve to replenish lubricants when depleted, which regenerates surface properties of the LIS coating.

FIG. 9B illustrates another exemplary composite LIS coated surface system (structure) 400 of the present invention. The composite structure includes a wicking structure 24 or material in contact with a substrate 2 or other support. In the figure, a hydrophobic coating 100 is positioned on the surface of the wicking structure 24. A lubricant 10 when applied to the surface of the hydrophobic coating 100 forms the LIS coating 200 on the surface of the composite structure. In the instant embodiment, lubricant 10 may be delivered to the surface of the LIS coating from an external lubricant reservoir 28 that couples to the wicking structure 24, for example, via a fluid delivery device 30 such as a capillary. The fluid delivery device supplies lubricant to the wicking structure that continuously replenishes lubricant to the surface of the LIS coating. All composite structures as will be envisioned by those of skill in the art in view of the disclosure are incorporated herein.

Applications

Hydrophobic coatings and LIS coatings of the present invention find use in various industrial and commercial applications including, e.g., aerospace, automotive applications, optics, healthcare applications, de-icing applications (e.g., on aircraft), anti-fogging, self-cleaning, anti-wetting, anti-corrosion applications (e.g., anti-corrosion products), antifouling applications (e.g., antifouling paints), anti-microbial applications, drag reduction applications, low friction applications, non-stick coatings, and like uses and applications.

EXAMPLES

The following examples provide a further understanding of various aspects of the present invention.

Example 1. Sprayable Hydrophobic Coating

An exemplary hydrophobic coating composition was prepared. The composition included: mesoporous silica (MCM-41, Sigma Aldrich, USA), fumed silica (e.g., CAB-O-SIL® H-5, Cabot Corp., Boston, Mass., USA), polydimethylsiloxane (PDMS) polymer (e.g., Sylgard 184, Dow Corning, USA) mixed in hexane solvent (Sigma-Aldrich, USA). Mesoporous silica particles were ball milled to a diameter ranging from about 1 µm to about 3 µm, rinsed with isopropanol, and dried. CAB-O-SIL® H-5 particles were of a size between about 20 nm to about 30 nm that form chain-like aggregates with an approximate length of 100 nm to 300 nm. Hexane lowers viscosity of the composition and delays polymerization of the PDMS until the hydrophobic coating composition is applied to the receiving surface.

In an exemplary composition, 0.3 g mesoporous silica (first particulate material), 0.6 g fumed silica (second particulate material), 1.6 g PDMS (matrix polymer), and 25 g of hexane (dispensing solvent) were mixed. Mixed components were sonicated for about 30 minutes to thoroughly mix. The batch was sufficient to coat 10 square sample coupons (3-inches by 3-inches). The coating composition is scalable for coating larger surfaces. Curing of the hydrophobic coating composition after application or delivery to a surface forms the hydrophobic coating on the surface or substrate. In some embodiments, curing at room temperature may take between about 24 hours to about 48 hours. In some embodiments, curing at temperatures up to about 100° C. may take about 3 hours. Other hydrophobic coatings containing other material compositions may be formed with the process.

Example 2. Formation of LIS Coatings by Application of Lubricants

Various lubricants were applied to hydrophobic coatings of EXAMPLE 1 and to other hydrophobic coatings of similar composition to form LIS coatings. Viscosity of the lubricants was modified as needed to allow spraying, painting, or air-brushing of the lubricants. In some applications, lubricants were mixed with suitable or volatile organic solvents such as isopropanol or perfluorohexane solvent in a 1:10 weight ratio to provide a selected or preferred viscosity for application. In some applications, lubricant viscosities were also selected by heating the lubricant, for example, to temperatures between about 60° C. to about 70° C. prior to application. Lubricant was dispensed to the textured surface of the hydrophobic coating and allowed to infuse (permeate) the hydrophobic coating. The coating became more transparent following infusion with lubricant. Infusion of the hydrophobic coated surface was achieved in a typical time between about 1 minute to about 60 minutes depending on the size of the area being coated and the viscosity of the lubricant.

In one exemplary application, lubricant was applied by spraying the lubricant.

In another exemplary application, lubricant was applied to the surface of the hydrophobic coating by air-brushing. The air-brushing mixture may be prepared by mixing the lubricant with perfluorohexane solvent in a 1:10 weight ratio prior to delivery.

In another exemplary application, lubricant viscosity was not modified and lubricant was applied to the surface of the hydrophobic coating by brush coating the coated substrate or surface.

In another exemplary application, infusion of the hydrophobic coating by the lubricant was enhanced and accelerated by applying alcohol (e.g., isopropyl alcohol) to wet the surface of the hydrophobic coating and to fill the surface porosity of the hydrophobic coating to enhance infusion of the lubricant. Lubricant had a lower surface energy than the alcohol so readily displaced the alcohol, which infused the porous structure of the hydrophobic coated surface. Pre-infusion with alcohol or another wetting liquid is not a necessary condition for successful infusion of lubricants. No limitations are intended. Modification of lubricant viscosities may be performed in numerous ways as will be understood by those of ordinary skill in the art.

In some applications, excess lubricant was removed from the porous surface of the hydrophobic coating following infusion using gravitational forces, weak centripetal forces, or forced air. For example, excess lubricant may be removed by simple gravitational forces within a period of 24 hours or less following application without any overt action being required to remove the lubricant. Infusion of the hydrophobic coated surface was achieved in a time typically between about 1 minute to about 60 minutes depending on the size of the area being coated and the viscosity of the lubricant. The frosted appearance of the hydrophobic coating following infusion with lubricant became more transparent depending on the size of the mesoporous particles used in the hydrophobic coating.

Properties of LIS coatings listed in TABLE 1 demonstrate that the coatings exhibit relatively high contact angles, low surface energies, and low roll-off angles making them highly water repellent compared to other conventional surface coatings. Surface energies are still low and better than TEFLON®. LIS coatings by comparison are also more hydrophobic than many conventional low-friction polymers including, e.g., PDMS and TEFLON® and antifouling paints such as INTERSLEEK® (AkzoNobel Marine Coatings, Amsterdam, Netherlands).

Figure 10A:
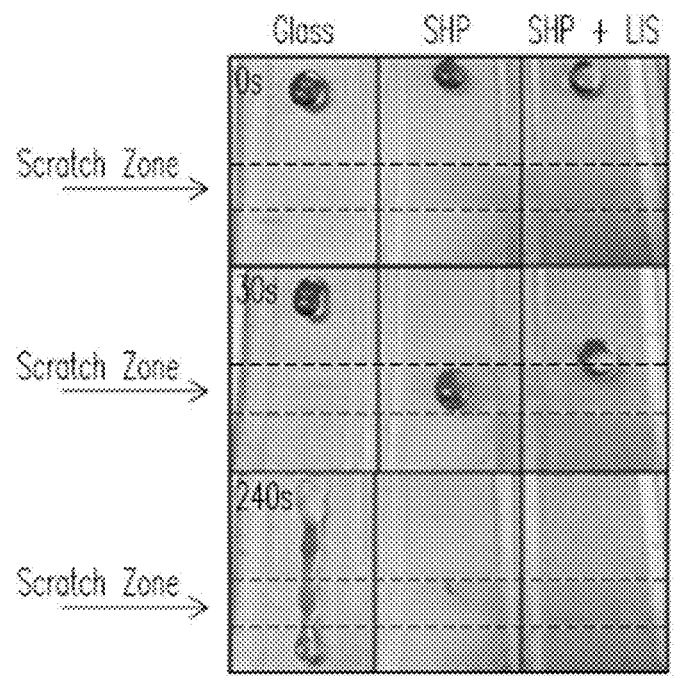
FIGS. 10A-10B show antifouling properties of an exemplary SHP coating and LIS coating of the present invention in contact with two selected sticky materials.
Figure 10B:
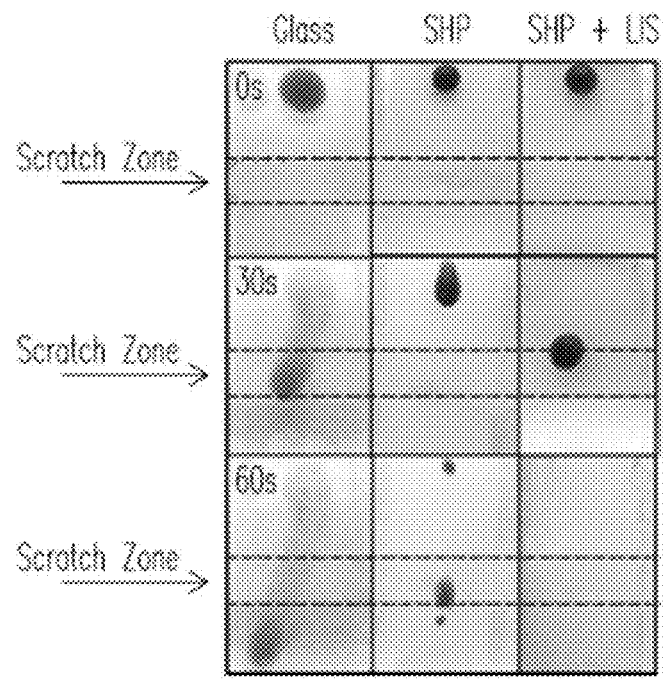

Example 3. Antifouling and Self-Healing Tests of SHP- and LIS-Coated Surfaces with Selected Liquids Hydrophobic (e.g., SHP) and LIS coated surfaces were subjected to multiple adhesive and fouling materials and media including, for example, honey, biomedical bacteria (*Pseudomonas putida*), marine seawater (EXAMPLE 5), and other fouling media. Drops of honey and a stained biomedical bacteria solution were placed in individual tests near the top edge of uncoated (column 1), SHP-coated (column 2), and LIS-coated (column 3) glass slides. Slides were inclined at an angle of ~75 degrees for honey and 15 degrees for bacteria to observe motion of the liquids over each surface. SHP and LIS coated samples each had an uncoated zone and a zone deliberately scratched with a razor blade to assess the self-healing properties of the LIS coating. FIG. 10A shows that honey adhered to and moved slowly over the uncoated glass slide, which had the highest surface energy. In the second column, honey moved rapidly over the low energy SHP coating. However, honey residue remained where the coating was scratched. The last column shows the LIS coating. Honey moved more slowly over this coating than on the SHP, but did not adhere (pin) to the substrate, even where the coating was scratched. After 240 seconds, no honey residue remained on the LIS-coated glass surface. FIG. 10B shows that when a drop of stained bacterial suspension was placed on the uncoated glass slide, the bacteria adhered predictably to the surface and spread over the surface leaving a fouling trail. On the SHP-coated surface, the bacterial suspension initially adhered to the surface and did not descend. When the drop unpinned, it moved quickly over the surface. A small amount of bacterial residue remained where the coating was scratched. On the LIS-coated surface, the bacterial slurry moved steadily and unimpeded, even over the scratch-damaged section showing that the infused lubricant provided self-healing capacity to the scratched section. The low-energy lubricant spreads over the damaged area, filling in the scratches, and preserves continuity of the fluid layer, which prevents honey from sticking to any part of the exposed substrate. After 60 seconds, no visible residue remained on the LIS coated surface. In this example, coatings of the present invention prevented adhesion of an exemplary sticky substance (honey) as well as biomedically-relevant bacteria. The LIS coating provided self-healing and robustness when minor damage was introduced to the coating. Results show the SHP coating was affected more by the scratch damage so may be best suited for environments where water resistance is desirable but abrasive wear is less prominent such as, for example, satellite dishes, and structural coatings. The LIS coating maintains performance when damaged. Results indicate that LIS coatings may be used in selected environments where SHP coatings are not sufficient or suitable.

Example 4. Antifouling Tests of SHP and LIS Coated Surfaces with Dried Bacteria In hospitals, high-risk infectious material can be difficult to remove, especially if dried on surfaces. An informal tape test was performed with drops of a biomedical bacterial culture (*Pseudomonas putida*). ~75 µL of the bacterial culture was placed on a SHP coating and a LIS coating and allowed to dry for 24 hours. Adhesive tape was smoothed over the surface of the fouled spot on each coating surface and peeled back. Fouling spots were photographed before and after tape was applied. Images were converted into 3-D profiles using color intensity as a measure of the quantity of remaining residues. The SHP coating retained approximately 30% of the color intensity of the original biofouling spot. No color was observed for the LIS coating indicating the coating did not retain residues after the tape test of the original biofouling spot. Results show hydrophobic coatings and LIS coatings of the present invention are self-cleaning and configured to minimize fouling by liquid foulants. Properties of these coatings determine how easily or completely fouling can be removed. LIS coatings have a liquid interface so dried foulants and residues do not adhere strongly to the LIS surface and may be easily removed. Results indicate that LIS coatings of the present invention may find application in hospitals and other industrial environments where fouling is likely but where regular cleaning can mitigate risks of infection or other deleterious effects.

Example 5. Antifouling Tests of SHP and LIS Coated Surfaces Under Marine Flow Antifouling properties of exemplary hydrophobic and LIS coated surfaces of the present invention were tested by exposing coated surfaces to filtered and natural seawater (Sequim Bay, Wash.). In a first test, filtered seawater was pumped through a sample chamber containing LIS coated slides to determine if the coatings were stable and effective under flow conditions. Mass of the underlying hydrophobic coated samples were measured before infusion with the lubricant, before exposure to the seawater (2.3 m/s for 60 hours), and after exposure to the seawater to determine the mass of lubricant retained by the coating. LIS coated surfaces retained lubricant and LIS functionality for the duration of the test. Surface energy, hydrophobicity, and roll off angles were unchanged after the flow tests (similar to values given in TABLE 1), demonstrating the effectiveness and durability of the LIS coatings under flow conditions. As will be appreciated by those of ordinary skill in the art, performance can change as a function of the coating composition and flow rates. However, in general, results demonstrate that painted LIS coatings retain functionality under flow conditions and relatively high flow rates (8.3 km/hr).

In a second test, 3-inch×3-inch FR4 fiberglass coupons were coated with SHP and LIS coatings and placed in a tank that circulated a flow of natural seawater for a period of 6 weeks. The experiment continued until fouling was observed on both the SHP and LIS coated samples. Fouling on both the hydrophobic and LIS coated samples was assessed qualitatively against uncoated coupons and other standard materials. Results showed that SHP coated samples resisted fouling as long as the surfaces retained their water repellent properties, approximately 3 days at these test conditions. LIS coated surfaces that retained lubricant showed no signs of fouling and continued to be hydrophobic. LIS coated coupons showed no marine fouling for over a month, which was approximately 10 times longer than the SHP coating and longer than other reference materials listed in TABLE 1 including fiberglass, PDMS, steel, and TEFLON®. These reference materials fouled in from 1 day to 10 days.

In a third test, 3-inch×3-inch FR4 fiberglass coupons were coated with SHP and LIS coatings and placed in tank containing natural seawater with no circulating flow. Results showed that SHP coated samples resisted fouling as long the samples retained their water repellent properties (~1 to 3 weeks on average). LIS coated coupons resisted marine fouling much longer than other conventional materials including fiberglass, glass, TEFLON®, Polyether ether ketone (PEEK), poly-vinyl chloride (PVC), steel, and marine antifouling paints. Under static and low-flow conditions, while fouling did occur on LIS-coated surfaces over time, results showed that the fouling was not strongly attached and was easily removed with gentle agitation or under an increased water flow rate. Results indicate that SHP coatings and LIS coatings resist fouling in both static and flow conditions in marine environments. While the coatings can foul over time, the coatings readily release the fouling materials.

Example 6. Lubricant Wicking into Coating and Replenishment of Lubricant

Figure 11:
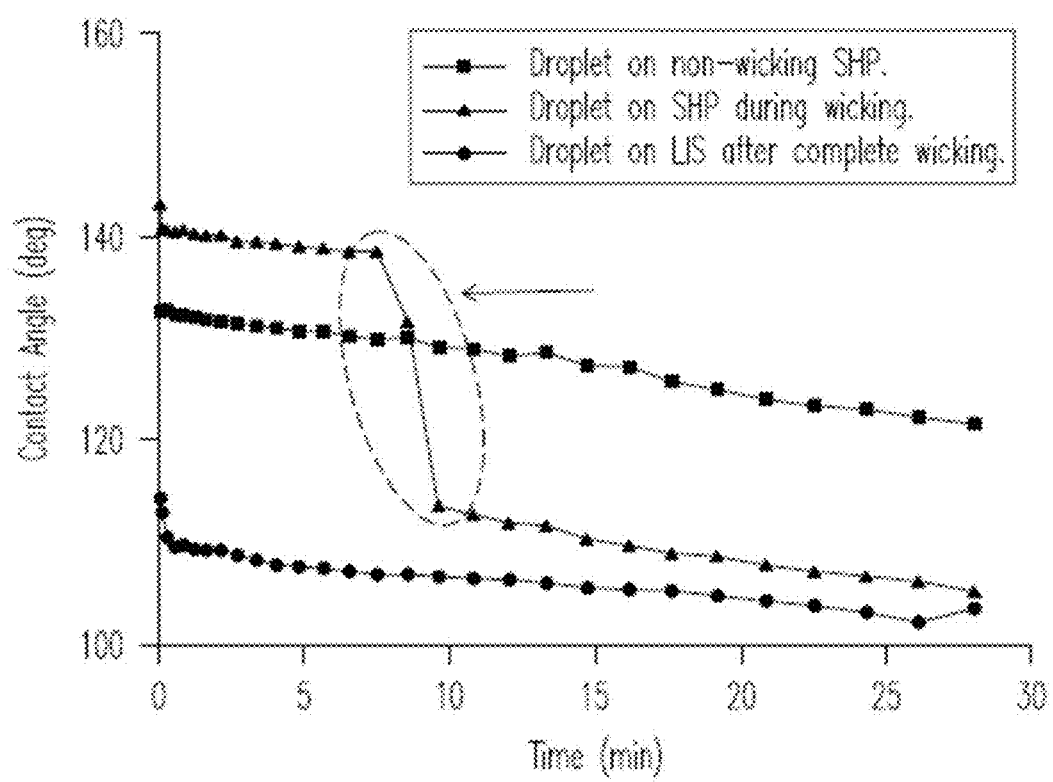
FIG. 11 plots the change in contact angle of a hydrophobic coating as a function of time when contacted by a lubricant delivered through a wicking structure and the change in contact angle of the LIS coating formed by the wicking lubricant.

A lubricant wicking structure and reservoir were formed from a fiberglass weave (~2-inch×2-inch) that was laid over glass microscope slides to achieve a flat surface. The surface was coated by painting with a mixture containing MCM-41® and CAB-O-SIL® H-5 mixed together in PDMS polymer. Samples were cured for ~24 hours to form the SHP coating on the surface of the fiberglass weave. SHP-coated samples remained flexible. In a first experiment, the slide was placed in an elevated position in a petri dish held in place ~3-4 mm from the bottom of the dish. The petri dish was placed onto the stage of a goniometer and leveled. A drop (15 µL) of water was placed on the surface of the SHP-coated fiberglass weave. Contact angle of the water droplet on the surface was measured for approximately 30 minutes and removed. FIG. 11 shows the change in contact angle of the SHP-coated surface that includes the wicking structure as a function of time. Contact angle begins above 130 degrees and slowly and steadily declines. The gradual decline in contact angle over time is attributed to evaporation of the water droplet. Edges of the droplet were pinned in place while the volume of the droplet slowly lowered resulting in the decrease in contact angle.

In a second experiment, a water droplet was placed on the surface of the SHP-coated sample and contact angle was measured as a function of time. A low energy lubricant (KRYTOX®️ liquid) was then added to a petri dish at the base of the SHP-coated fiberglass weave so as to be in contact with the edges of the fiberglass weave. Lubricant was not applied directly to the surface of the SHP-coated weave. During a 30 minute period, lubricant wicked unaided from the base of the fiberglass weave through the weave into the SHP coated surface positioned at the top of the fiberglass weave. FIG. 11 shows results of the wicking by the SHP coating fiberglass weave in fluid contact with the reservoir of liquid lubricant. As shown in the figure, a transition and drop in contact angle is observed at about 8.5 minutes of elapsed time. When the lubricant reached the water droplet positioned at the surface of the SHP-coated weave, contact angle suddenly dropped (~10 seconds) from ~140 degrees (i.e., the SHP coated surface) to a ~115 degrees, characteristic of a LIS coated surface. Contact angles monitored during the wicking process show the SHP coating clearly and rapidly transitions from having SHP properties to having LIS properties. Results show that the SHP-coated surface does not need to be coated with lubricant directly in order to form the LIS coating or to achieve the desired LIS properties. The SHP coating need only be maintained in liquid contact with an internal or external reservoir of lubricant for a sufficient time to allow wicking through the wicking structure to the SHP-coated surface.

In third experiment, a water droplet was placed on the fully infused LIS coated sample. Contact angle was again observed for 30 minutes. FIG. 11 shows that the contact angle of the LIS coating begins at near 115 degrees and declines gradually over time due to partial evaporation of water from the droplet with a corresponding gradual relaxation in contact angle over time.

In a fourth experiment, canvas cloth (a representative flexible fibrous material) was spray-coated with an SHP coating. One edge of the coated cloth was placed in contact with a reservoir containing KRYTOX®️ lubricant. Lubricant wicked unaided through the cloth fully infusing the SHP coating with lubricant forming the LIS coating. Results show the flexible material transforms from the native non-coated state, to a hydrophobic-coated (e.g., SHP coated state) state after spray coating with the hydrophobic composition, and then to a full LIS-coated state after wicking of the lubricant into the hydrophobic-coated material detailed here. Results further demonstrate that LIS coatings of the present invention are self-healing when lubricant is supplied from an external reservoir. The reservoir effectively delivers and maintains the lubricant at the surface of the coating indefinitely. Delivery of lubricant is limited only by the size of the external reservoir. Tests show that lubrication of LIS coatings can be applied indirectly and maintained for extended periods. LIS coatings of the present invention can also be dispensed through irregular porous and textured surfaces (e.g., cloth, fabric) by spray coating. Wicking properties of underlying structures or material layers can be combined advantageously to deliver and maintain lubrication of the coated surface.

Figure 12A:
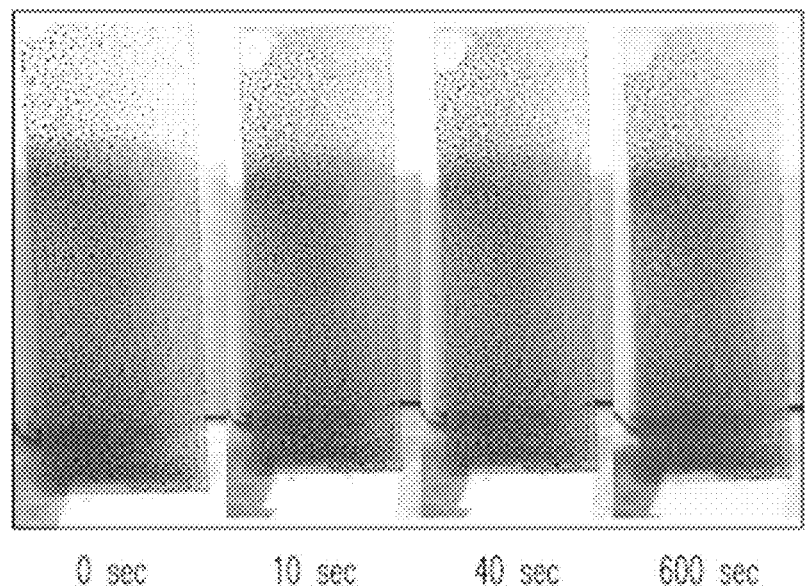
FIGS. 12A-12B show the progression of paint droplets of an exemplary SHP coating and LIS coating of the present invention as a function of time, respectively.
Figure 12B:
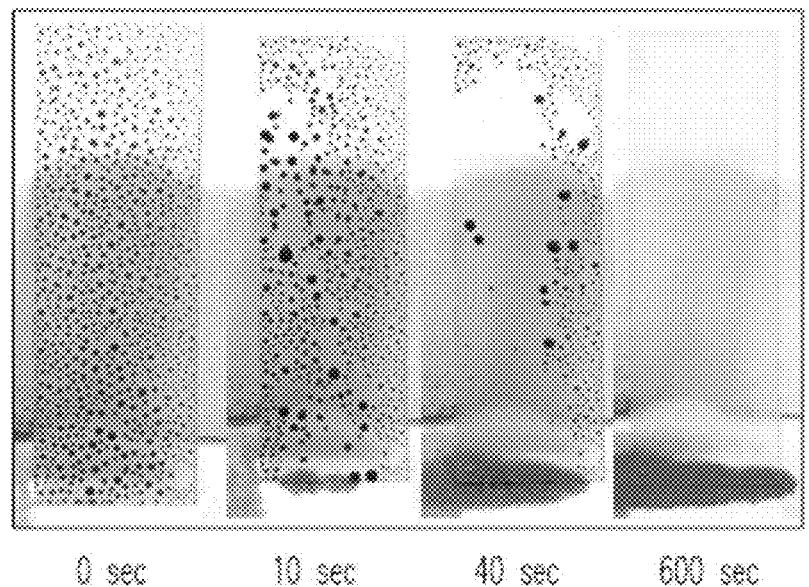

Example 7. SHP-Coated and LIS-Coated Surfaces Resistance to Wetting by Aerosols and Microdroplets Wetting properties of hydrophobic and LIS surfaces of the present invention were tested. Surfaces in general may be fully, partially, or intermittently wetted by submersion in liquids, by exposure to humid environments, or by contact with liquid droplets via splashing, rain, mists, sprays, and aerosols. In one experiment, glass slides [2 inches (5.1 cm) by 1 inch (2.5 cm) coated with an SHP coating, and a LIS coating were laid horizontally and sprayed with a water-based paint using a commercial airbrush delivered as a fine mist or aerosol. On uncoated glass slides, paint droplets spread out and fully wet the surface forming an even coat of paint. On the SHP surface, paint droplets landed on the surface but did not wet the surface; droplets remained individually separated. On the LIS surface, individual and finely separated paint droplets formed initially on the horizontal surface, but remained mobile and aggregated with nearby droplets forming fewer and larger droplets. FIG. 12A shows the progression or movement of paint droplets on the SHP coated surface as a function of time (0 seconds to 600 seconds). Fine microdroplets (~1 µL) remained immobilized on the SHP coating. Droplets were stable for over 600 seconds. FIG. 12B shows progression or movement of paint droplets on the LIS coated surface as a function of time (0 seconds to 600 seconds). When slides were tilted to a near vertical position, microdroplets combined forming larger droplets (~1 µL to 5 µL) that moved quickly down the surface and were readily released from the surface of the LIS coating over time. Even the smallest microdroplets were mobile. After 600 seconds, the LIS coated surface was free of paint microdroplets. Results show LIS coatings are superior in high humidity environments or in environments where liquid microdroplets may interfere with the function of the surface or where liquid microdroplets may have other deleterious effects including fouling and corrosion. Outdoor surfaces that suffer negative effects from rain or humidity can also benefit from the anti-wetting properties of the LIS coating. LIS coatings also have numerous applications in medical applications where ability to shed droplets of biological fluids may be efficacious or improve safety.

Example 8. LIS Coatings with Enhanced LIS Properties

Enhancing Porosity with Pore Forming Additives

LIS coatings with enhanced LIS properties were prepared. Different pore-formers were added to the base coating composition (e.g., silica in PDMS described in EXAMPLE 1) to increase porosity in the base coating. The LIS coating was prepared as in EXAMPLE 2. In various tests, sugar was added as the pore former. Particle sizes are not limited. Increase in porosity in the coating was a function of the amount of sugar added. In one exemplary test, 0.9 g of powdered sugar (~70 µm to 250 µm) was added to a hydrophobic coating composition containing 6 g PDMS, 0.3 g mesoporous silica particles and 0.6 g CAB-O-SIL®️ H-5 particles. Porosity in the coating increased 32%. In other tests, salt (NaCl) was added as the pore former. Particle sizes are not limited. Similar results were achieved. In other tests, solid particles of other materials such as starches can be dissolved from the cured coating to enhance the porosity of the polymer matrix. In other tests, porosity of a base coating comprising, for example, ceramic particles in a matrix polymer was enhanced with a surfactant such as sodium dodecyl sulfate (SDS). The base coating composition (EXAMPLE 1) was mixed 1:1 with a solution of water containing selected concentrations of SDS (e.g., 1% SDS). Porosity within the matrix PDMS polymer of the resulting coating was enhanced by 12%. Increasing or decreasing the ratio of water/SDS solution to PDMS in the composite mixture changes the porosity within the matrix polymer of the coating. For example, when the base coating composition (EXAMPLE 1) was mixed 10:1 with a solution of water and SDS (1% in water by weight), porosity within the matrix polymer of the coating increased by 2% to 3%. Increasing relative amounts of SDS in the coating raised porosity in the polymer binder portion of the coating. Porosity increases greater than 25% may be installed. Pore sizes installed in the PDMS ranged from about 5 µm to about 50 µm depending on the amount or concentration of SDS solution added to the PDMS. Sugar, salt, and SDS installed in the coating can be extracted from the cured coating simply by applying water or other polar solvents that leaves open pores behind in the coating. Ultrasonic vibration can assist with the extraction of pore-forming materials that enhances the coating porosity. Alcohols such as methanol that have good wetting and penetration properties can assist the extraction of the pore-forming materials from the polymer matrix. Once pore-forming materials are extracted, porosity within the coating can be infused with lubricant to form the LIS coating with enhanced LIS properties.

Example 9. Enhanced Antifouling Performance with Addition of Biocidal Materials

Coatings of the present invention may include biocides. Enhancing porosity of these coatings allows biocidal materials to be incorporated as components of the coating compositions that form hydrophobic coatings and LIS coatings. As biocides leach from the coating, the biocides prevent fouling organisms from colonizing on the surface of the coatings thereby improving antifouling properties and performance of the coatings.

Example 10. Lubricant Retention by LIS Coatings

Retention of the lubricant by a lubricant-infused SHP hydrophobic coating, LIS, is a coating performance parameter used to determine a coating's functional lifetime and viable applications of the coating.

Retention of the lubricant was evaluated using three different tests. Retention was evaluated by competitive absorption and under two liquid flow conditions. Competitive absorption was measured by pressing LIS coated samples into an absorbent paper towel (C-fold towels, Kimberly-Clark). A small volume of lubricant oil (25 µl) was applied to LIS coated samples and several control samples (uncoated, glass, unmodified PDMS, and PDMS/fumed silica composite) and left overnight to fully absorb. PDMS and PDMS/fumed silica samples were applied by spraying in manner identical to the LIS coating. Samples were placed face down on clean paper towels and a 20 g weight was placed on each sample for 30 minutes. The samples were weighed dry, with lubricant, and after the paper towel contact. The amount of lubricant retained by each surface was calculated as a percentage of the weight of lubricant remaining after the test.

Lubricant retained by LIS coated samples was also measured in a stirring test with flowing water and compared to the set of control samples listed in the paper towel test. All coatings were applied to 25 by 50 mm glass coverslips (Ted Pella). The samples were weighed dry and after applying 25 µl (45 mg) of lubricant with a pipet. The samples were left to absorb the lubricant overnight and were then fixed to the inside wall of a 1000 ml beaker (FisherBrand) using rubber cement (Elmer's). The adhesive was left to dry overnight. This adhesive was chosen after testing to ensure that it could be easily applied and removed without affecting the weight of the glass coverslips. The beaker was filled with approximately 800 ml of distilled water and placed on a stir plate (Corning PC 220). A 3 cm stir bar spinning at approximately 250 rpm maintained a vortex in the beaker with uniform flow around the walls and across each of the samples. The beaker was covered and left in ambient conditions for one week. Then the samples were removed, excess rubber cement was removed, and the samples were dried thoroughly in a 37° C. oven overnight. The samples were weighed and lubricant retention was calculated. Contact angle on all samples was measured before and after the experiment.

Lubricant retention was also measured for LIS coated samples exposed to flowing seawater at 2.3 m/s (8.3 km/hr) for 60 hours to simulate moderate marine conditions. The weight of each sample was measured before infusion with the lubricant, after infusion, and after exposure to seawater. Percentage of lubricant retained was compared for air-brushed and spin coated samples. Water CA was measured before and after seawater exposure and retention of lubricant was noted in qualitative observations.

Comparative testing showed the LIS coating retained a higher percentage of lubricant than control samples that did not incorporate nanoporous silica. The LIS coating for this example was prepared by mixing PDMS base with curing agent in a 10:1 ratio by weight. Then hexane, PDMS, fine silica, and nanoporous silica were added, in an 80:6:2:1 ratio by weight, respectively. A slightly opaque, colloidally stable suspension was formed following immersion in a sonicating bath for 15 minutes. The final mixture was applied by airbrushing a uniform thin film over the substrates. Curing of the porous SHP coating was achieved by heating to 100° C. for 30 minutes. After curing, application of the low energy lubricant formed the LIS coating. The application was carried out by carefully placing a specific volume of Krytox oil on the center of the sample. Upon application, the capillary forces of the porous network spread and absorbed the liquid. The lubricant spread to cover the whole surface in 24 hrs.

Figure 13:
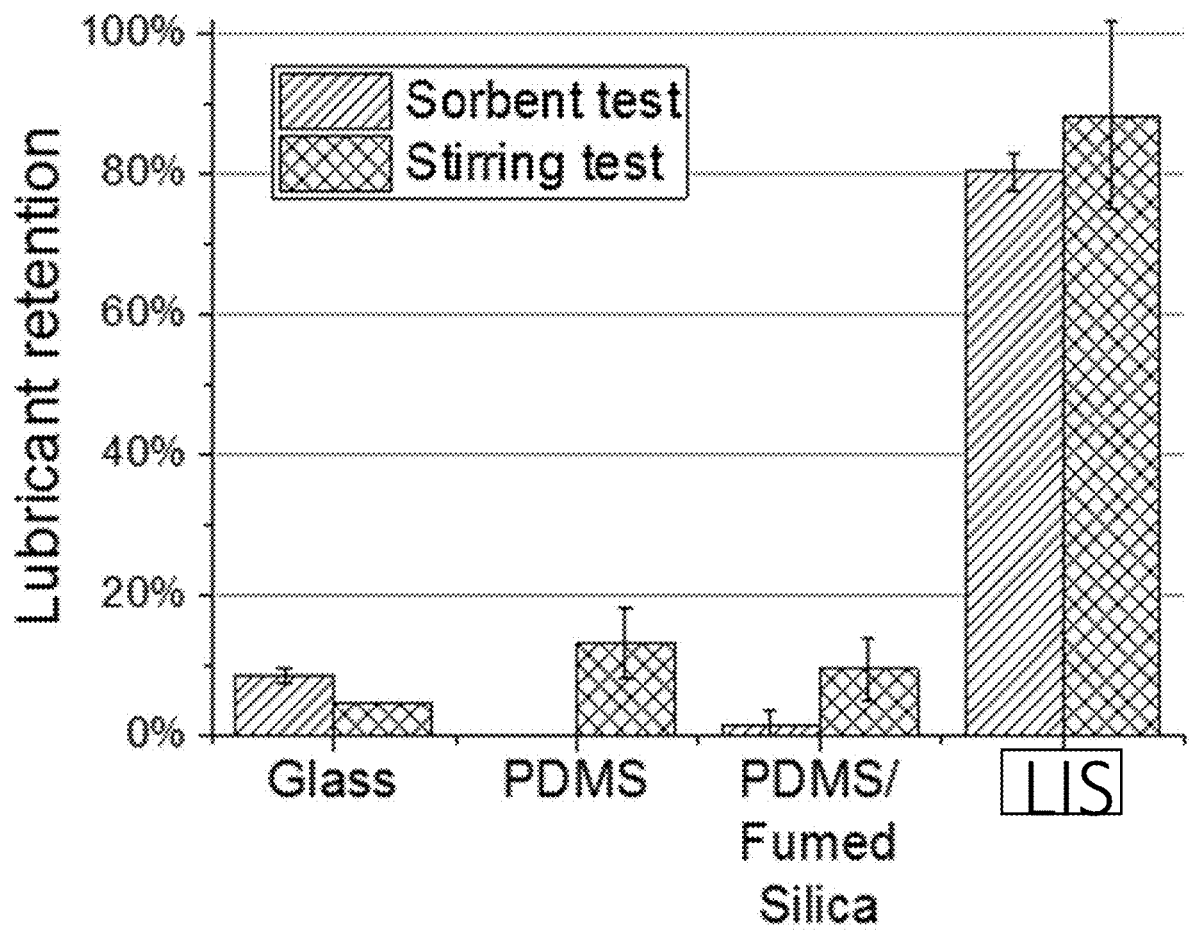
FIG. 13 shows the results of comparative retention testing of lubricated hydrophobic coatings. The tested LIS coating retained a high percentage of applied lubricant when exposed to a competitive sorbent (paper towel) and flowing water (error bars show standard deviation form triplicate samples).

The data shown in FIG. 13 shows that the LIS coating retained greater than 80% of applied lubricant when exposed to a sorbent paper towel and to flowing water in a stirring test. Uncoated glass, PDMS, and a PDMS/fumed silica composite all retained less than 20% of applied lubricant in both tests. As discussed below, the coating also retained lubricant in flowing seawater.

In the stirring test described above, the lubricant was readily removed from infused PDMS, despite being fully absorbed by the polymer prior to the experiment. Small droplets of lubricant were observed on the surface of the PDMS samples after the stirring test. PDMS can swell and absorb water so, without being tied to any particular theories, the inventors note that it is possible that water displaced the lubricant in the polymer over time. The nanoporous silica used in the LIS coating can avoid this problem by providing a more rigid network of porosity that retains lubricant in narrow fixed capillary channels. The higher retention of lubricant also indicates that the amount of applied lubricant (approximately 30 g/m$^2$) was sufficient to fully lubricate the surface with limited excess. No significant change in contact angle after stir testing was noted for any samples except uncoated glass. However, the contact angle of PDMS is itself similar to the contact angle of the lubricant infused surfaces so loss of lubricant would not necessarily result in a change in contact angle, as was observed on the glass samples.

Example 11. Toxicity Testing of Hydrophobic Coatings

Four different hydrophobic coatings (SHP1, SHP2, SHP3, and LIS) were tested for toxicity using a Microtox test. SHP1, SHP2, and SHP3 are replicates of the SHP coating described herein. SHP1 was a spray coat of hexane and PDMS in a 10:1 ratio by weight. SHP2 was a spray coat of hexane, PDMS, and fine silica particles (mixed in a 40:3:1 ratio by weight). SHP3 was prepared as a mixture of hexane, PDMS, fine silica, and nanoporous silica as described in Example 10. LIS was prepared by first making a sample of SHP3 and then infusing Krytox lubricant as described in Example 10. [A Microtox test measures the bioluminescence of the luminescent marine bacterium *Aliivibrio fisheri*. While the test utilizes a marine microorganism, it is considered a general test of toxicity and not limited to toxicity in the marine environment. Luminescence is measured 30 minutes after bacterial cells are exposed to sample materials. If the luminescence from *A. fischeri* is reduced by 50%, sample concentration is set as an effective concentration or $EC_{50}$, and the sample has a toxic effect. This is because luminescence correlates to bacterial metabolism. The Microtox test is a useful tool to evaluate toxicity of various compounds that are in either liquid or solid phase. FIGS. 14A-14C show the overview of the Microtox test procedure.

An *Aliivibrio fischeri* culture (ATCC 49387) was grown overnight in ALNa broth at 22° C. with vigorous shaking. 40 mL of fresh ALNa broth was inoculated with the overnight culture and grown until the optical density at 590 nm (O.D. 590) reached 0.25. 5 minute centrifugation at 4150 rpm done followed by washing with 40 mL of 3% NaCl; pH 7.0. After washing, cells were resuspended in 40 mL of 3% NaCl; pH 7.0 and used for Microtox test.

The decrease in bacterial luminescence (INH %) after 30-minute incubation was calculated. Decreased luminescence by more than 50% (EC50) after cell suspension was exposed to sample represented the toxicity of that specific sample. The luminescence was measured using a Synergy HT microplate reader (Biotek, VT, USA). All Microtox testing was done in triplicate to obtain both average and standard deviation values. Luminescence from blank coupons (no coating) was set as 100% and the luminescence of each test sample was represented as a percentage of the control value. 0.75" square coupons were used for tests.

Figure 15:
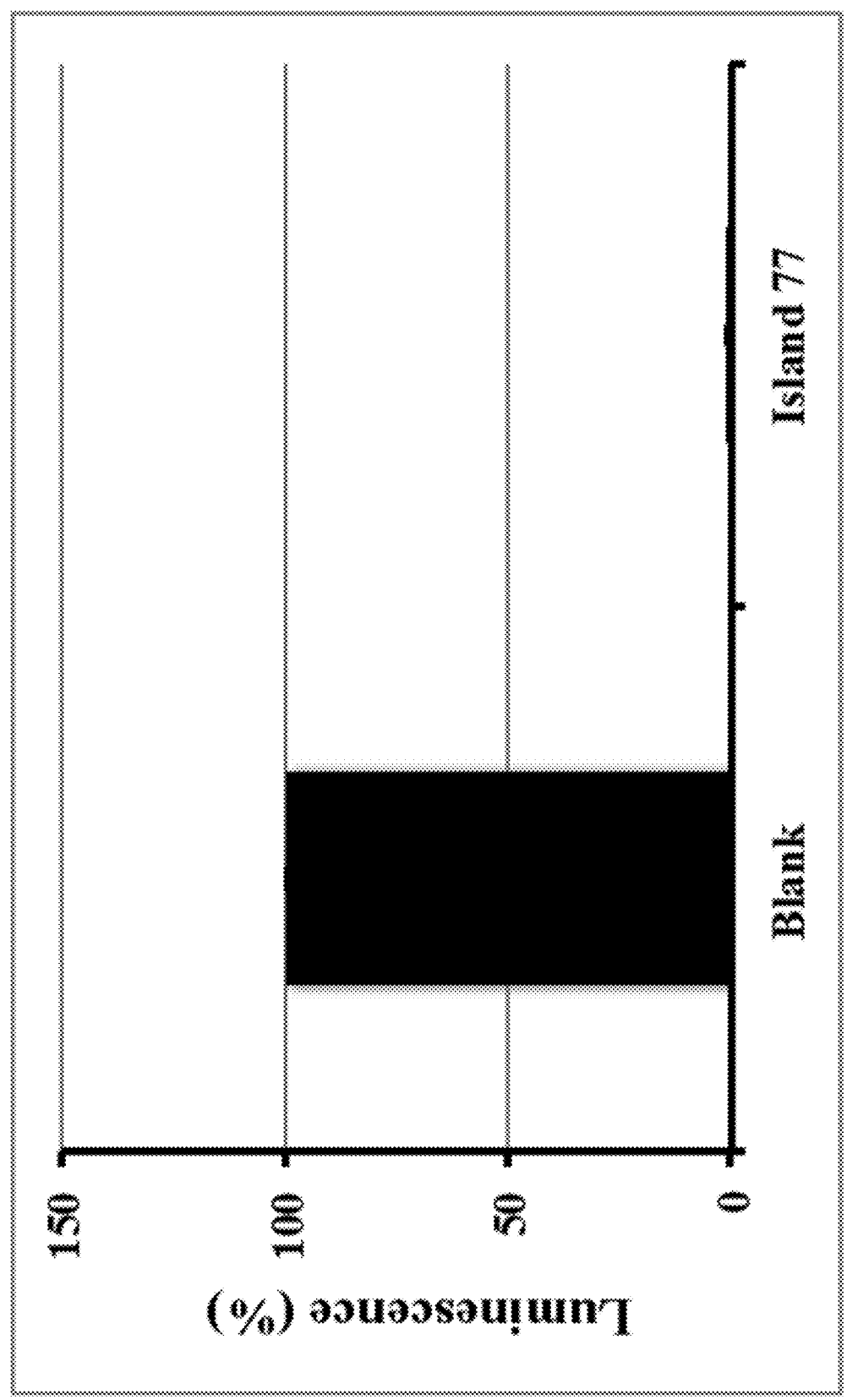
FIG. 15 shows the results of a luminescence toxicity test of a known toxic paint Island 77 Plus™.

To verify that Microtox assay could detect toxicity of test coatings, known toxic paint, Island 77 Plus™ (SeaHawk, Fla., USA), was also tested. Compared to blank coupons (FR4 fiberglass), Island 77 Plus painted coupons showed a decrease in luminescence by more than 99%. Results are shown in Table 2 and FIG. 15.

TABLE 2

| | Luminescence. | | | | |
|---|---|---|---|---|---|
| | Sample 1 | Sample 2 | Sample 3 | Average | STD |
| Blank | 100 | 100 | 100 | 100 | 0 |
| Island 77 Plus ™ | 0.04 | 1.98 | 0.02 | 0.68 | 0.92 |

Figure 16:
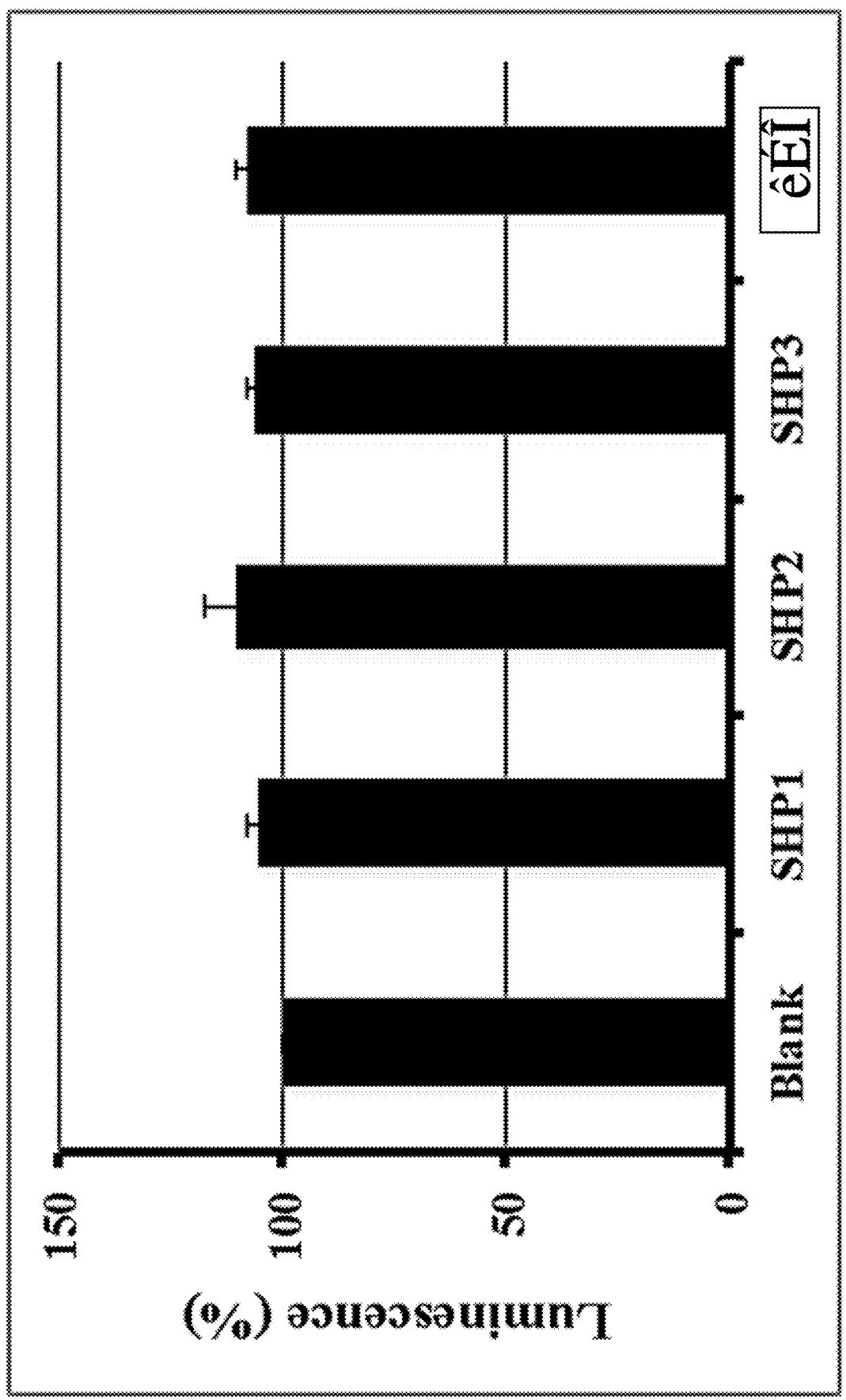
FIG. 16 shows the results of a luminescent toxicity test of embodiments of the disclosed coatings, including SHP and LIS coatings.

Certain embodiments of the tested hydrophobic coatings (i.e., SHP and LIS) as listed below were all found not to be toxic as shown in TABLE 3 and FIG. 16. The results of Table 3 indicate a significant advantage for the coatings of this invention over toxic paints, such as Islands 77, as shown in Table 2. The non-toxic SHP and LIS coatings may have broad applicability in biologically sensitive settings (e.g., biomedical, environmentally protected, industrial, food processing).

TABLE 3

| MicroToxic Assay Results of SHP and LIS coatings. | | | | | |
|---|---|---|---|---|---|
| Material* | Sample 1 | Sample 2 | Sample 3 | Average | STD |
| Blank | 100 | 100 | 100 | 100 | 0 |
| SHP1 | 109 | 104 | 102 | 105 | 3.0 |
| SHP2 | 116 | 114 | 101 | 110 | 6.6 |
| SHP3 | 104 | 108 | 108 | 106 | 1.7 |
| LIS | 105 | 111 | 108 | 108 | 2.7 |

*Blank materials was FR4 fiberglass board. SHP and LIS coating were the as described formulation of PDMS, porous silica and nanosilica particles with Krytox as the slippery liquid.

Reinforced Composites with Repellent and Slippery Properties

Further disclosed are embodiments of materials and processes used to form abrasion-resistant reinforced composite structures that are hydrophobic and slippery.

Explanation of Terms. The following explanations of terms are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

The present disclosure is directed toward all novel and non-obvious features and aspects of the various disclosed embodiments, alone and in various combinations and subcombinations with one another. Any theories of operation are to facilitate explanation, but the disclosed structures, processes and methods are not limited to such theories of operation.

Although the operations of some of the disclosed processes and methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed structures, materials, and processes can be used in conjunction with other structures and processes. Additionally, the description sometimes uses terms like "produce" and "provide" to describe the disclosed processes. These terms are high-level abstractions of the actual operations that are performed. The actual operations that correspond to these terms will vary depending on the particular implementation and are readily discernible by one of ordinary skill in the art.

Examples are described with reference to directions indicated as "above," "below," "upper," "lower," and the like. These terms are used for convenient description, but do not imply any particular spatial orientation.

Unless explained otherwise, all technical and scientific terms used herein have the same meaning as commonly understood to one of ordinary skill in the art to which this disclosure belongs. Although processes and materials similar or equivalent to those described herein can be used in the practice or testing of the present disclosure, suitable processes and materials are described herein. The structures, processes, and examples are illustrative only and not intended to be limiting, unless otherwise indicated. Other features of the disclosure are apparent from the following description and the claims.

Unless otherwise indicated, all numbers expressing quantities of components, properties such as molecular weight, percentages, angles, and so forth, as used in the specification or claims are to be understood as being modified by the term "about." Unless otherwise indicated, implicitly or explicitly, the numerical parameters set forth are approximations that may depend on the desired properties sought, limits of detection under standard test conditions/methods, limitations of the processing method, and/or the nature of the parameter or property as understood by those of ordinary skill in the art. When directly and explicitly distinguishing embodiments from discussed prior art, the embodiment numbers are not approximates unless the word "about" is recited.

To facilitate review of the additional various embodiments of the disclosure, the following further explanations of specific terms are provided.

Abrasion Resistant:

As used herein, "abrasion resistant" refers to a surface that exhibits less than a 25 percent change in water contact angle after exposure to an abrasion cycle made by 50 PSI of surface pressure and having the surface pulled over 1500 grit silicon carbide sandpaper for 60 seconds, as compared to before exposure. In some embodiments, an abrasion resistant surface also maintains its slippery and/or repellent properties after an abrasion cycle, such as maintaining a water roll-off angle below 25 degrees, including below 20 degrees, and/or a water contact angle between 90 and 135 degrees, including between 95 and 110 degrees, as compared to before abrasion. The terms abrasion resistant and durable are used interchangeably herein.

Composite Structure:

The term "composite structure" as used herein refers to a structure that is formed using two or more component materials that are integrated together, meaning that they physically contact each other. For example, a composite structure may be formed using a reinforcing material and a repellent interfacial material. In certain embodiments, a composite structure has characteristics that are different than those of the individual component materials.

Interfacial:

The term "interfacial" as used herein refers to a material that physically contacts two types of materials, thereby connecting them together. For example, an interfacial material may be a layer of material between a substrate or a reinforcing material and a lubricant-infused surface coating. In some embodiments, an interfacial material comprises a reinforcing material and a repellent material. In certain embodiments, an interfacial material comprises a repellent material. In some embodiments, the interfacial material is an adhesive.

Lubricant-Infused Surface (LIS) Coating:

The term "lubricant-infused surface coating" refers to a coating formed when a lubricant is applied to an underlying surface.

Polymer:

A molecule of repeating structural units (e.g., monomers) formed via a chemical reaction, i.e., polymerization.

Pore-Forming Additive:

A pore-forming additive (also referred to as a "porogen") is a material that enhances pore formation when added to a polymer matrix, such as silica, metal, a metal oxide, a ceramic, a polymer, diatomaceous earth, cellulose or a derivative thereof, a sugar, a starch, a salt, or a surfactant.

Reinforcing Material:

A "reinforcing material" refers to a material that is able to significantly increase the structural integrity of a structure. In some embodiments, the reinforcing material comprises a wicking material as disclosed herein, such as metal meshes, fabrics, fiberglass, or weaves of these various materials. The term "reinforced structure" refers to a structure comprising a reinforcing material, including a composite structure.

Repellent:

A "repellent" material or surface refers to the ability of the material or surface to repel water, as determined by its water roll-off angle. A repellent material or surface, as disclosed herein, has a water roll-off angle equal to or less than 25 degrees. A repellent material or surface may also be, but is not necessarily, hydrophobic.

Slippery:

As used herein, a "slippery" surface refers to a surface having a physical property that allows movement over the surface to occur with a low coefficient of kinetic friction, such as below 1.0, or below 0.5. For example, a slippery surface may have a surface energy less than 30 $mJ/m^2$, such as between 1 and 25 $mJ/m^2$ or between 10 and 20 $mJ/m^2$; a water contact angle of at least 90 degrees, such as between 90 and 180 degrees, between 90 and 150 degrees, between 90 and 135 degrees, between 90 and 115 degrees, or between 95 and 110 degrees; a water roll-off angle no greater than 30 degrees, such as between 1 and 25 degrees or between 1 and 15 degrees; or any combination of these properties.

Substrate:

The term "substrate" used herein encompasses all substrates, supports, and surfaces onto which coating compositions and coatings of the present invention described herein may be delivered, applied, or introduced.

Micro- and nanoscale textured surfaces can lack the durability desired for specific practical applications, such as in industrial, medical or marine facilities where reducing biofilm formation and fouling is desired but where abrasive forces are commonplace. Surface adhesion can be minimized in these applications using materials having modified wetting properties that also can withstand abrasive forces such as from high pressure washes, scrubbing and chemical cleaning. A layer of lubricant on a surface can prevent adhesion by forming a smooth coating having low surface energy, which can also reduce friction and surface corrosion. Friction can limit the lifetime of engineered components in myriad industrial systems, leading to significant energy loss within these systems. Although surface lubrication can help alleviate friction, it is generally temporary and can be difficult to maintain on surfaces that experience abrasion. There is a need for stabilized slippery structures that are durable upon exposure to a variety of abrasive environments.

The materials and processes disclosed herein can be used to form reinforced structures having slippery surfaces that can withstand long-term exposure to abrasive forces. Embodiments of these durable, slippery surfaces can exhibit very low surface energy and support LIS coatings that are replenished over time.

Advantages of certain embodiments of the disclosed abrasion resistant, slippery structures include reducing friction between surfaces, reducing adhesion of bacteria and viruses, and/or enhancing the shedding of ice, aerosols, or sticky materials from surfaces. Judicious selection of components used to form the structures can impart useful repellent properties, rendering certain embodiments of the disclosed structures hydrophobic, oleophobic, omniphobic, ice-phobic and/or blood-phobic. A water repellent LIS coating generally also repels ice and/or blood. Certain embodiments of the surfaces of the reinforced structures disclosed herein have improved durability when compared to conventional coatings or structures without the disclosed surfaces. Certain embodiments may also exhibit low friction and/or resistance to corrosion. The reinforced slippery structures may contain an embedded and/or an external lubricant reservoir for replenishing the LIS coating. For example, the durable slippery structures may incorporate porous reinforcing material combined with an interfacial material to form a composite structure, which in turn supports a LIS coating. Slippery surfaces can be applied to, or incorporated within, a range of substrates, and can impart friction, biofilm, fouling, and/or corrosion resistance. For certain applications, the reinforced slippery structures can be made with components having low toxicity.

Certain embodiments of abrasion resistant, slippery structures and surfaces as disclosed herein can be made as described herein, and can include various components that can be assembled in multiple configurations. These components include a porous reinforcing material and interfacial material that together can form a composite structure, and a LIS coating. Additional components may include a substrate, pore-forming additives, and/or an external lubricant reservoir.

Figure 17A:
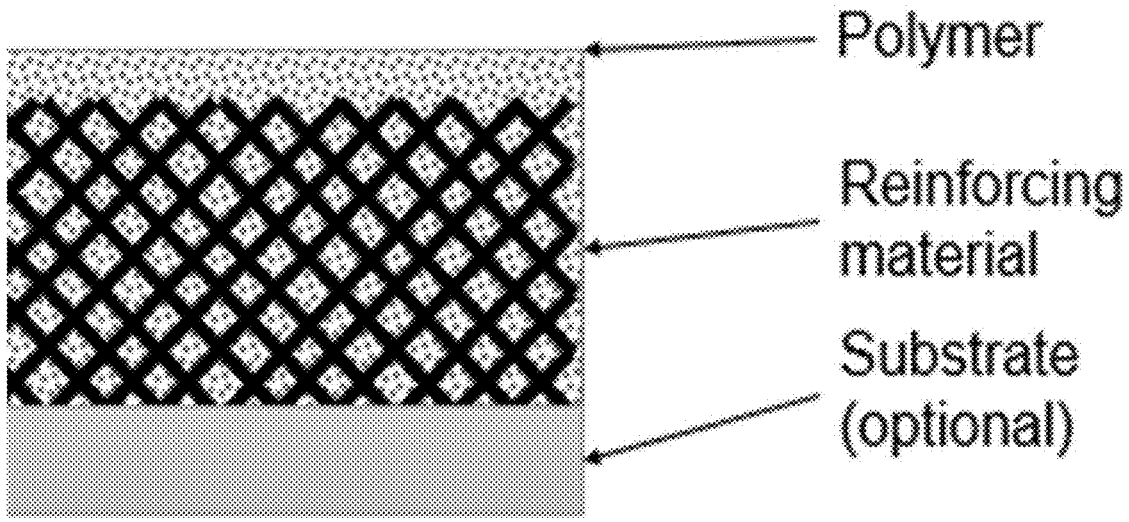
FIGS. 17A-17B are cross-sectional diagrams illustrating embodiments of composite structures disclosed herein, before (17A) and after (17B) addition of lubricant.
Figure 17B:
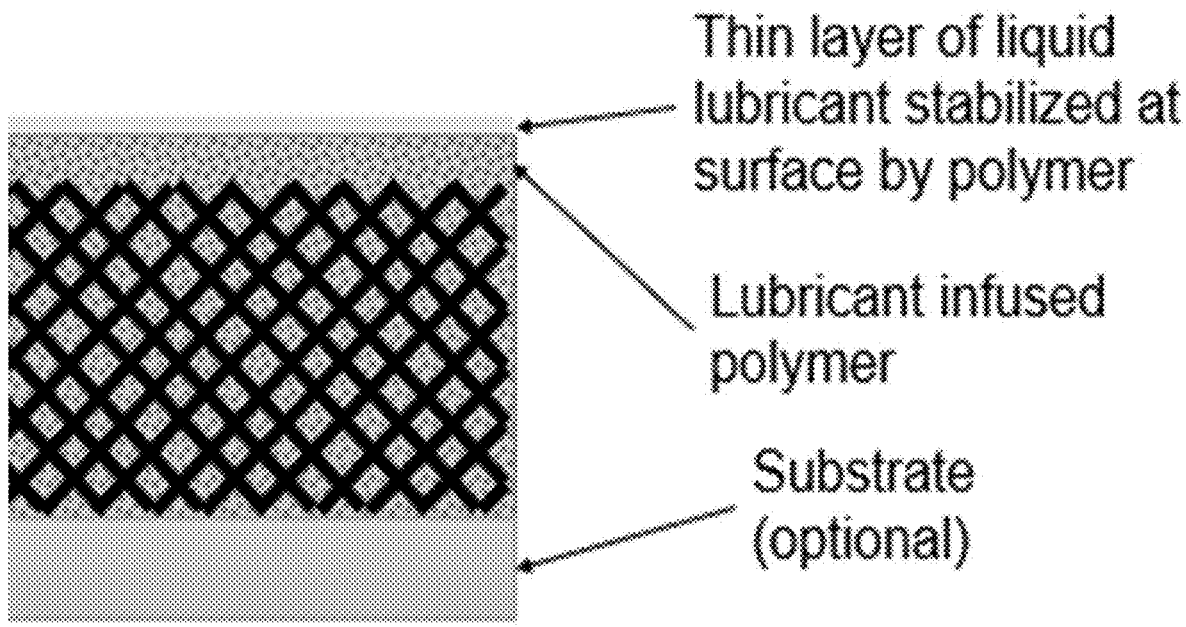

An embodiment of a composite structure is illustrated in FIG. 17A, which shows a continuous porous reinforcing material combined with a polymeric interfacial material to form a composite structure, which is optionally attached to a substrate. FIG. 17B illustrates an embodiment of the structure of FIG. 17A, additionally comprising a LIS coating that is stabilized by the polymeric interfacial material.

Reinforced structures having abrasion resistant slippery surfaces are useful for e.g., preventing biofilms and/or as antifouling surfaces. Durable slippery surfaces can reduce friction in industrial systems, such as those using heavy machinery with bearings, gear boxes or motors, or used in energy production, turbines, or transportation, with conditions involving high loads, rpm or elevated temperatures. The slippery surfaces can be incorporated into a variety of consumer products that provide rain or moisture protection, and/or that provide a stabilized oily surface such as non-stick cookware.

A porous reinforcing material provides a self-supporting three-dimensional porous network for certain embodiments of the disclosed structures, adding structural integrity thereto. The reinforcing material can have porosities between 0.1 and 1000 microns, including between 1 and 100 microns. The thickness of the reinforcing material used in a structure can vary, and can range from 0.05 to 20 mm, such as from 0.1 to 5 mm.

The reinforcing material may, in some embodiments, be flexible. In independent embodiments, the reinforcing material is rigid, meaning that the Young's modulus of the material is greater than 2 GPa. In some embodiments, the reinforcing material is resilient, meaning that the yield strength of the material is at least 45 MPa.

In some embodiments, the porous material is fibrous. A fibrous material contains fibers that are longer than they are wide, and can form an interwoven sheet or weave akin to a fabric. A fibrous material provides additional strength to the reinforcing material that may not be provided by pores alone. In certain embodiments, the fibers have a length between 0.1 and 10000 mm, such as between 1 and 1000 mm, and a width between 0.001 and 1 mm, such as between 0.005 and 0.5 mm. In some embodiments, the fibers are round or oval in cross-section. The fibers may be synthetic or natural.

The reinforcing material may be continuous, or it may be formed by a plurality of sections of continuous material that are periodically placed within a given area to cover a larger surface area. In some embodiments, the reinforcing material is a continuous sheet or layer of material having a thickness between 0.05 and 20 mm, such as between 0.1 and 5 mm, and an average pore diameter between 0.1 and 1000 microns, such as between 1 and 100 microns.

Figure 18A:
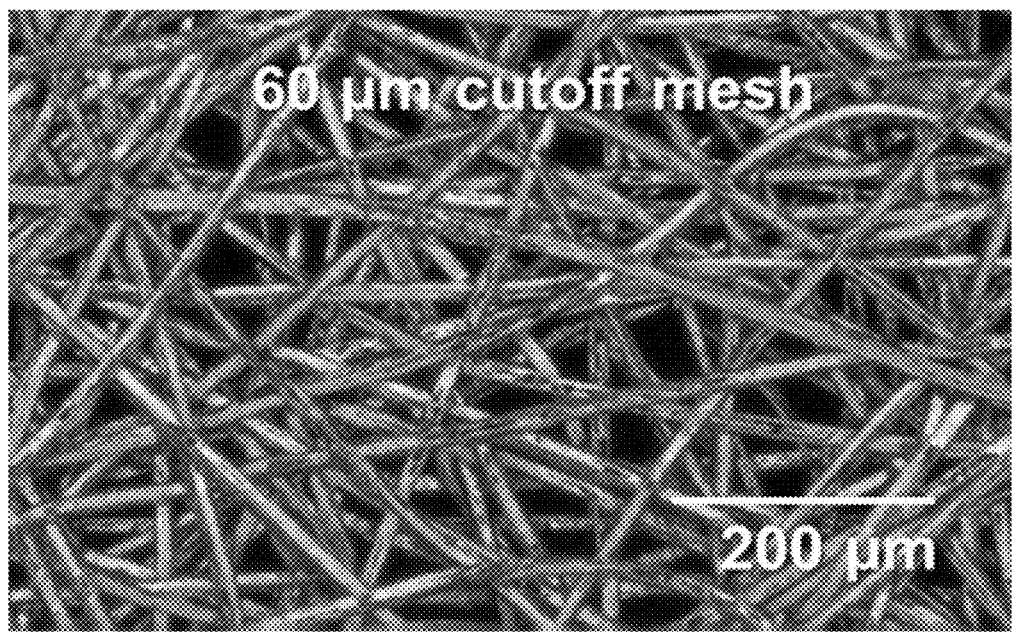
FIGS. 18A-18B are images of exemplary reinforcing materials.
Figure 18B:
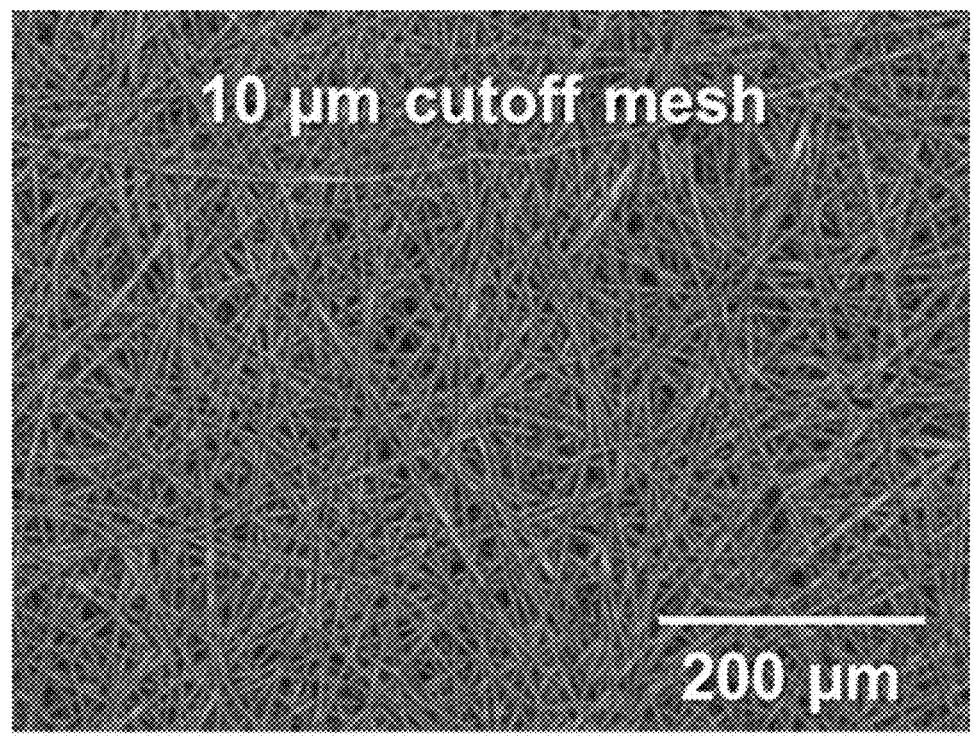

FIGS. 18A and 18B are microscope images of exemplary reinforcing materials. These reinforcing materials are stainless steel meshes made from metal fibers that have been compressed and sintered together to provide a flexible fabric-like material. FIG. 18A is a mesh with an average pore diameter of 60 microns and a thickness of 0.15 mm, with an average fiber diameter of about 15 microns. FIG. 18B is a mesh of with an average pore diameter of 10 microns and a thickness of 0.17 mm, with an average fiber diameter of about 5 microns.

The looser, more coarse weave present in the mesh of FIG. 18A has thicker fibers, which provides a reinforcing material having higher stiffness and abrasion resistance, higher surface roughness, and a network of larger pores as compared to the mesh of FIG. 18B, which has a tighter weave with thinner fibers, providing a reinforcing material having more flexibility, lower surface roughness, and a network of smaller pores. The physical properties of the reinforcing material can be tailored to a desired specific application by varying its porosity, stiffness, flexibility, durability, and/or fiber size. In some embodiments, the reinforcing material is hydrophobic. In some embodiments, the reinforcing material is repellent.

Exemplary reinforcing materials include, but are not limited to, metal, fiberglass, carbon fibers, carbon meshes, natural fibers, polymers, cellulose, paper, ceramics and fabric, or combinations of these materials. Fabrics may be made of materials such as cotton, polyester, canvas, carbon fiber, glass fiber or nylon. Metal reinforcing materials include stainless steel, copper and aluminum meshes. Ceramic reinforcing materials include fiberglass, alumina and titania. Polymeric reinforcing materials include Kevlar and styrene. In some embodiments, the reinforcing material comprises a wicking structure 24 as shown in FIGS. 9A and 9B. In some embodiments, the reinforcing material is integrated into a machined industrial part or component at the time of manufacture.

An interfacial material having a specific surface chemistry can be used to provide desired physical properties to the reinforced structures disclosed herein, such as repellency. For example, the interfacial material may repel adhesion of biological materials such as blood, bacteria or viruses. Structures comprising repellent interfacial materials can have reduced or limited corrosion and ice buildup due to its water repellency.

In certain embodiments, the interfacial material may be hydrophobic, superhydrophobic, hydrophilic, oleophobic, omniphobic, ice-phobic and/or bloodphobic. In certain embodiments, the interfacial material is water repellent. In some embodiments, the interfacial material provides a surface that has a high water roll-off angle, such as between 1 and 20. In an embodiment, the interfacial material comprises a polymer, wax oil, organic acid or organosilicon, or a polymer and organosilicon. For example, the interfacial material may comprise a silicone polymer.

In certain embodiments, the interfacial material comprises at least one of siloxane, silicone, fluoropolymer, methacrylate, polypropylene, polyethylene, cellulose or silazane. The interfacial material can comprise the same polymers described above in reference to hydrophobic coating compositions. Exemplary interfacial materials include, but are not limited to, organosilicon compounds, including siloxane polymers such as hexamethylcyclotrisiloxane, octamethyltrisiloxane, octamethylcyclotetrasiloxane, decamethyltetrasiloxane, decamethylcyclopentasiloxane, dodecamethylpentasiloxane, dodecamethylcyclohexasiloxane, tetradecamethylhexasiloxane, and dimethylsiloxane, polydimethylsiloxane (PDMS), a silazane such as hexamethyldisilazane (HMDS), a siloxane, and silicone elastomers; fluoropolymers such as polytetrafluoroethylene (PTFE), fluorinated silicones, methacrylate, polypropylene, polyethylene, cellulose compounds including acetate, and any combination of these materials.

The interfacial material, in some embodiments, is slippery. Thus, the interfacial material can have properties including, but not limited to, a surface energy between 10 and 20 mJ/m$^2$, no more than 20 mJ/m$^2$, or no more than 10 mJ/m$^2$; a water contact angle between 90 and 135 degrees, between 90 and 115 degrees, between 95 and 110 degrees, at least 90 degrees, or at least 100 degrees; and a water roll-off angle between 1 and 25 degrees, between 1 and 15 degrees, not more than 10 degrees, or not more than 5 degrees. The interfacial material may exhibit one or more of the above properties. In certain embodiments, the interfacial material is repellent, such as PDMS. In some embodiments, the interfacial material has a surface energy between 10 and 20 mJ/m$^2$, a water contact angle between 90 and 125 degrees, and a water roll-off angle between 1 and 25 degrees.

The interfacial material can be coated on, or embedded within, the reinforcing material. In certain embodiments, the interfacial material is coated on and embedded within the reinforcing material. The interfacial material can, in some embodiments, form a molecular monolayer on a surface of the reinforcing material. The interfacial material may partially or completely fill the porous network of the reinforcing material. For example, the interfacial material may fill at least 50% of the pores of the reinforcing material, or at least 60%, 70%, 80%, 90%, or 95% of the pores. In some embodiments, the interfacial material forms a thin film on the reinforcing material. In some embodiments, the interfacial material is a continuous layer of material that completely surrounds the reinforcing material. In some embodiments, the interfacial material will substantially or completely coat the surface of reinforcing material. For example, the interfacial material may coat at least 50% of the surface area of the reinforcing material, or at least 60%, 70%, 80%, 90%, or 95% of the surface area.

The interfacial material can optionally comprise pore-forming additives, i.e., porogens, such as a fugitive phase that is later removed from the material after curing or drying, to increase the porosity of the material, as described above in reference to hydrophobic coating compositions. A fugitive phase refers to a component that is removed from the material after curing or drying, generally by liquid or thermal extraction, leaving behind pores or open spaces. The pore-forming additive or fugitive phase can be mixed into a polymeric interfacial material prior to combining it with a reinforced material and before curing or drying the polymer. Exemplary fugitive phases include sugars, starches, salts, surfactants and any combinations of these components. Exemplary pore-forming additives that are generally not removed from the interfacial material include porous particles as described above, such as first or second particles comprising silica, metal oxides, diatomaceous earth, or ceramics; biocidal particles; antifouling particles; and any combinations of these particles.

The interfacial material may range in porosity from low (that is, a dense solid-like material) to highly porous. The advantages of a porous interfacial material include the advantages described above in reference to hydrophobic coating compositions, such as increased storage capacity for lubricants by acting as an internal lubricant reservoir, and/or improved lubricant transfer properties. The interfacial material may also have an increased storage capacity for additives other than lubricant, such as biocides, antifouling agents, corrosion inhibitors, or any combination of these additives. The interfacial material may absorb such additives to a certain extent by swelling, but can, in certain embodiments, increase its storage capacity for the additives with increased porosity.

A reinforcing material and an interfacial material can be combined to form a composite structure. The composite structure can exhibit enhanced physical properties as compared to either component material alone, such as strength, durability and abrasion resistance. Certain embodiments of the composite structures disclosed herein have at least one smooth external surface.

Figure 19A:
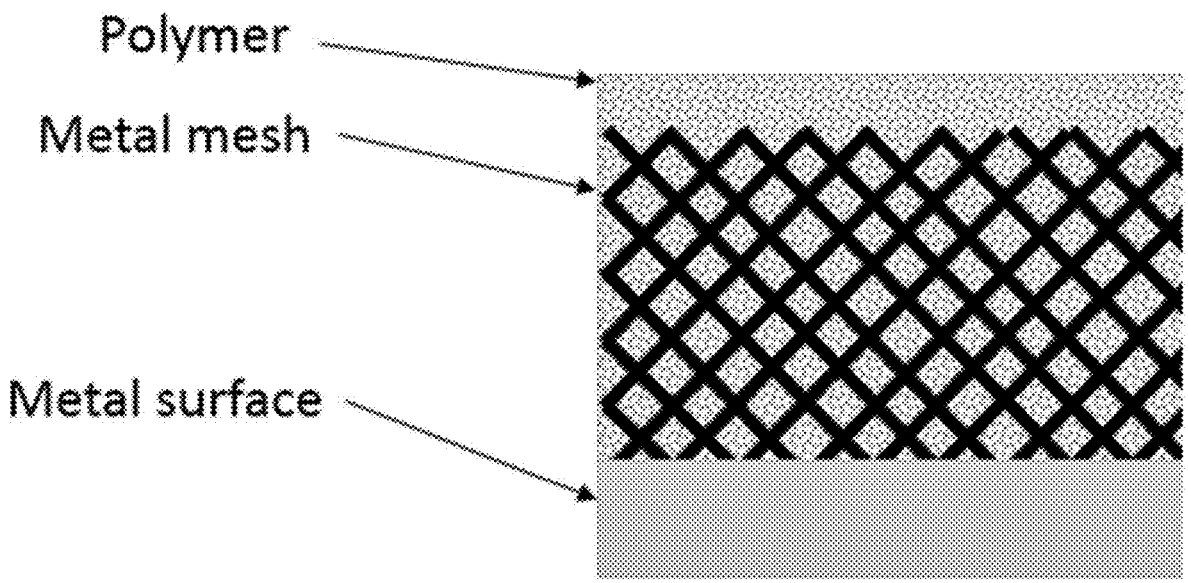
FIGS. 19A-19B are diagrams illustrating embodiments of exemplary component materials and structural arrangements used for the composite structures disclosed herein.
Figure 19B:
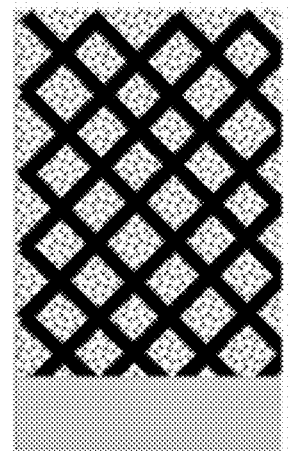

The components of the composite structure can be arranged differently depending on the desired application. For example, FIG. 19A is a cross-sectional illustration of an embodiment of a composite structure having a continuous layer of reinforcing material that is fully embedded within a continuous layer of polymeric interfacial material, attached to a metal substrate. As indicated by the view of the reinforced structure shown in FIG. 19A, the height of polymeric interfacial material may extend above the height of the reinforcing material. The embodiment of a composite structure shown in FIG. 19B has the polymeric interfacial material and the reinforcing material at similar heights. Embodiments of the composite structures illustrated by FIG. 19A may be particularly useful for applications involving low levels of abrasion, whereas those illustrated by FIG. 19B may be useful for applications involving higher abrasion exposure.

The design of the composite structure contributes to its resistance to abrasion. The strength and/or rigidity of the reinforcing material and the surface chemistry of the interfacial material, can each be optimized for the specific environment for which it will be used. For example, selection of flexible reinforcing and interfacial materials can provide a composite structure that can bend to fit closely against, or align closely with, other surfaces, such as an irregular substrate. Other properties that certain embodiments include are durability, heat resistance, and/or lower cost of the reinforcing and/or interfacial material used to form the composite structure. In some embodiments, the composite structure comprises a reinforcing material and a repellent interfacial material. In some embodiments, the composite structure comprises a reinforcing material and a hydrophobic interfacial material. In some embodiments, the composite structure comprises reinforcing and interfacial materials that are both repellent.

Composite structures may vary in dimensions, such as thickness. As described above in reference to the reinforcing material, the surface area encompassed by the structures is not limiting and may comprise a plurality of pieces of reinforcing material placed continuously, or a single continuous sheet of reinforcing material. The amount of interfacial material in the composite structure may also vary, depending in part upon the extent that it fills the porous network of the reinforcing material. Generally, the area encompassed by the composite structures disclosed herein ranges from 0.0001 to 1000 $m^2$, such as from 0.001 to 1 $m^2$. The minimum thickness depends upon the thickness of the reinforcing and interfacial materials used therein, but generally is about 0.1 mm. Composite structures that are useful for supporting and/or stabilizing a LIS coating applied thereto, have a minimum thickness of about 0.1 mm. Maximum thicknesses are not limiting, but generally are about 20 mm.

A composite structure may optionally be attached to a substrate. The substrate can provide additional strength to the composite structure, and/or a route for fluid contact with the composite structure's porous network. In certain embodiments, the substrate can provide a modular reinforced or composite structure, meaning that the structure is easily produced in bulk and/or easy to separate and recombine, such as a floor tile. In certain embodiments, the substrate may be removed from a reinforced or composite structure. In some embodiments, there is no substrate, i.e., the reinforced or composite structure does not comprise, or is not attached to, a substrate.

When present in a reinforced structure, the substrate can comprise the same supports and surfaces described above in reference to hydrophobic and LIS coating compositions, including steel and painted surfaces. In addition, the substrate for the disclosed reinforced structures may comprise any other metal suitable for the application, such as aluminum or copper, or it may comprise wood, plastic, concrete, glass, or a ceramic material. In some embodiments, the substrate is substantially inflexible (i.e., the Young's modulus of the material is greater than 2 GPa). In independent embodiments, the substrate is flexible.

FIG. 20A and FIG. 20B show cross-sectional views of embodiments of a composite structure comprising a reinforcing material and an interfacial material, wherein the reinforcing material is attached to the substrate (20A) and wherein the interfacial material is attached to the substrate (20B). FIG. 20C shows an embodiment of a composite structure comprising a reinforcing material and an interfacial material without a substrate.

The substrate can be attached to a composite or reinforced structure in any appropriate manner, such as by welding or soldering if the substrate and/or reinforced structure is metal, or by an adhesive. In some embodiments, the reinforced material comprises an interfacial material that is also an adhesive, such as a polymer, that attaches the reinforced structure to the substrate. In some embodiments, the composite or reinforced structure can be sequentially sprayed onto, or otherwise built upon, a substrate.

In some embodiments, the substrate comprises a capillary network. Such a capillary network or device can provide fluid contact between, for example, an external lubricant reservoir and a composite structure that is layered upon the substrate. In some embodiments, the substrate comprises a component of an enclosure that contacts an animal, such as a floor tile or a wall tile. In certain embodiments, the substrate comprises a component that contacts a marine environment, such as the hull of a boat or other vessel, buoy or pier.

Embodiments of the reinforced structures disclosed herein can comprise coatings with enhanced properties, such as LIS coatings. As described above in reference to hydrophobic coatings, LIS coatings are formed by applying a liquid layer to a solid surface having a porosity sufficient to support the liquid layer. The LIS coatings disclosed herein can be applied to reinforced structures comprising a composite structure by delivering a lubricant to an exposed surface thereof, rendering the exposed surface slippery and/or repellent. Because the reinforcing and interfacial materials may be flexible, embodiments of composite structures having a LIS coating disclosed herein can comprise nonplanar (i.e., irregular) surfaces. The porosity of the reinforcing material and/or the interfacial material that are used to form the composite structure, can be optimized for the desired application to provide appropriate lubricant retention and/or stabilization properties. Reinforced structures having a LIS coating on an exposed surface, as disclosed herein, can provide a pressure stable, durable, and/or slippery surface in environments exposed to abrasive forces.

Lubricants useful for the LIS coatings on the reinforced structures, and the parameters and properties thereof, are the same as the lubricants described above in reference to hydrophobic coatings. In certain embodiments, the LIS coating comprises a fluorocarbon polymer, a silicone oil, or both a fluorocarbon polymer and a silicone oil. In some embodiments, the LIS coating comprises silicon. In some embodiments, the LIS coating comprises silicone oil. In some embodiments, the lubricant is an organic oil of natural origin, such as olive, vegetable, or palm oil. In some embodiments, the lubricant is hydrophobic. In some embodiments, the lubricant is water repellent.

As noted above, the interfacial material used in a composite structure can modify the surface chemistry of the reinforcing material to help stabilize the LIS coating. Thus, the interfacial material can act as an interface between the reinforcing material used in a composite structure and the LIS coating. The composite structure can chemically stabilize the LIS coating, in addition to physically stabilizing the LIS coating. For example, a composite structure comprising an interfacial material made with a fluoropolymer can chemically stabilize a LIS coating comprising a fluorocarbon polymer. Similarly, a composite structure comprising an interfacial material made with an organosilicon compound can chemically stabilize a LIS coating comprising a silicone oil. In some embodiments, the LIS coating used to create a desired surface chemistry comprises a wax or an oil, which may be hydrocarbon or fluorocarbon based. In some embodiments, the LIS coating comprises an organic acid, such as a phosphorus or carboxylic-based acid.

The exposed surface of the reinforced structures to which the LIS coating is applied, in some embodiments, is smooth. In some embodiments, the coated exposed surfaces can have slippery and/or repellent properties including, but not limited to, a surface energy between 10 and 20 $mJ/m^2$, no more than 20 $mJ/m^2$, or no more than 10 $mJ/m^2$, a water contact angle between 90 and 180 degrees, between 90 and 150 degrees, between 90 and 135 degrees, between 90 and 115 degrees, between 95 and 110 degrees, at least 90 degrees, or at least 100 degrees, and/or a water roll-off angle between 1 and 40 degrees, such as between 1 and 25 degrees, between 1 and 15 degrees, not more than 30 degrees, not more than 20 degrees, not more than 15 degrees, not more than 10 degrees, or not more than 5 degrees. In some embodiments, the water contact angle is less than, or not more than, 135 degrees. In some embodiments, the water contact angle is less than, or not more than, 115 degrees. These coated exposed surfaces may exhibit one or more of the above properties. In certain embodiments, the exposed surface of a composite structure comprising a LIS coating has a surface energy between 10 and 20 mJ/m$^2$, a water contact angle between 90 and 135 degrees, and/or a water roll-off angle between 1 and 25 degrees. The lubricant used for the LIS may also contribute to the abrasion resistance of the composite or reinforced structure by reducing surface friction.

Slippery surfaces have high droplet mobility, reflected in their roll-off angles. LIS coatings can provide a reinforced structure having surfaces that enable very high droplet mobility as reflected in low roll-off angles (ROA). Surfaces with a ROA lower than about 25 degrees can be considered to be hydrophobic even if the contact angle is lower than 135 degrees or between 90 and 135 degrees, such as 95 degrees. Similarly, surfaces with a ROA lower than about 15 degrees can be considered superhydrophobic even if the contact angle is lower than 150 degrees, such as 110 degrees.

The lubricant used for the disclosed reinforced structures comprising a LIS coating may be applied, delivered or introduced to an exposed surface of the structure in the same manner as described above in reference to lubricant delivery to hydrophobic coatings. These LIS coatings, in certain embodiments, are self-healing, i.e., able to replenish itself. The internal lubricant reservoir provided by the porosity of the composite structure can replenish the LIS coating when the lubricant is abraded or otherwise removed from, or reduced on, the surface. Replenishing lubricant extends the functional lifetimes of LIS coatings and improves its performance in various applications, such as those where the LIS coating is exposed to high flows of liquid and/or abrasion.

Figure 21:
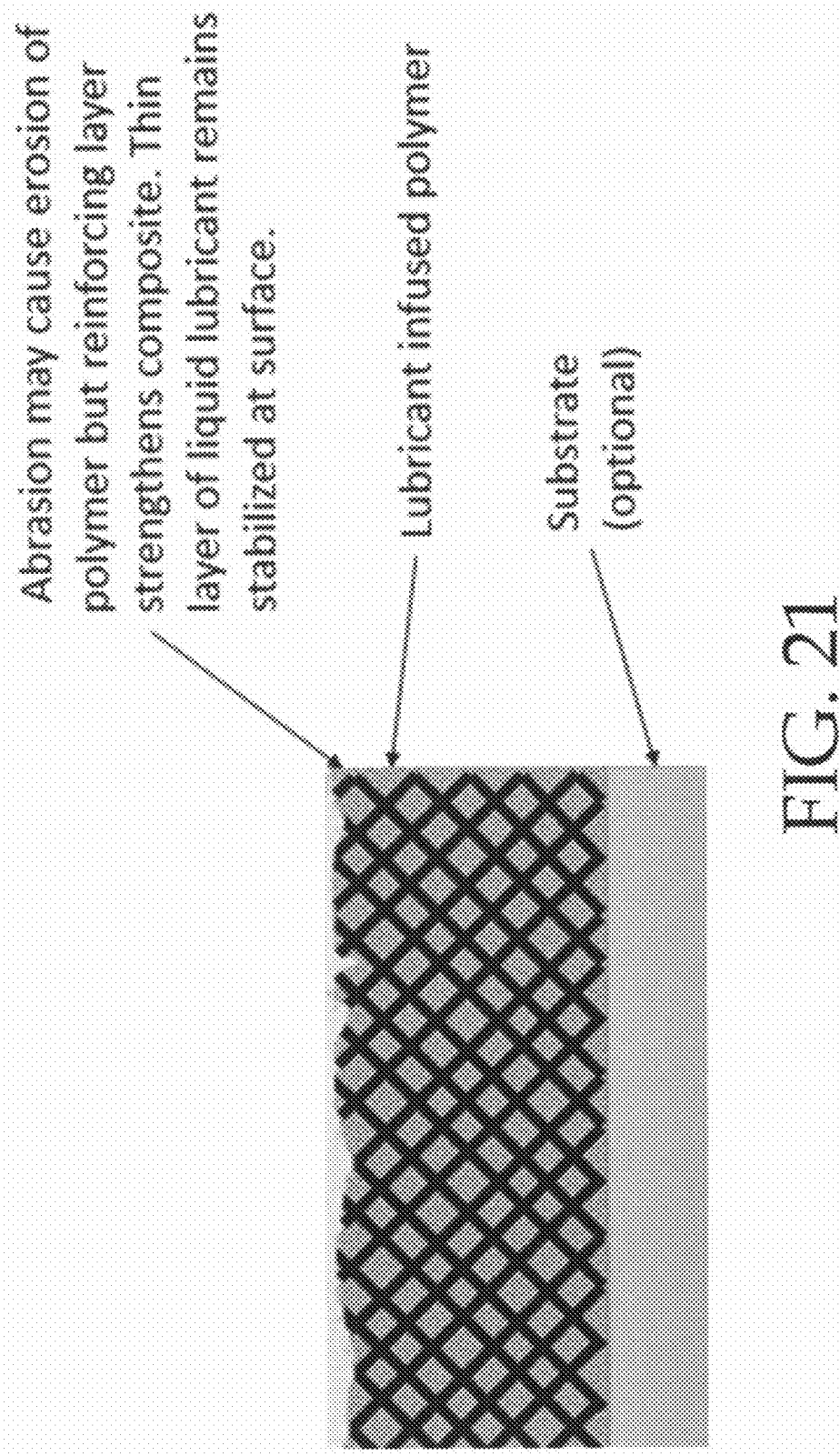
FIG. 21 is a cross-sectional diagram illustrating an exemplary composite structure as disclosed herein, after abrasion.

FIG. 21 is an illustration of a cross-sectional view of an embodiment of a composite structure comprising a lubricant and substrate, after abrasion. The exposed surface of the structure comprising the LIS coating has been exposed to abrasion, as indicated by the irregular pattern at the top of the reinforcing and interfacial material. The layer of reinforcing material provides abrasion resistance to the structure, which increases its structural integrity and allows lubricant residing within the porous network of the composite structure to infuse the abraded surface of the structure, thereby replenishing the LIS coating. Structural integrity may be measured by the load which can be supported by the structure with minimal (i.e., less than 5%) deformation. In certain embodiments, the reinforcing material increases the structural integrity of the structure substantially, such as by increasing the peak tensile strength of the structure by at least 50%, at least 75%, at least 100%, or at least 200%, when compared to the peak tensile strength of a structure not having the reinforcing material.

Figure 22:
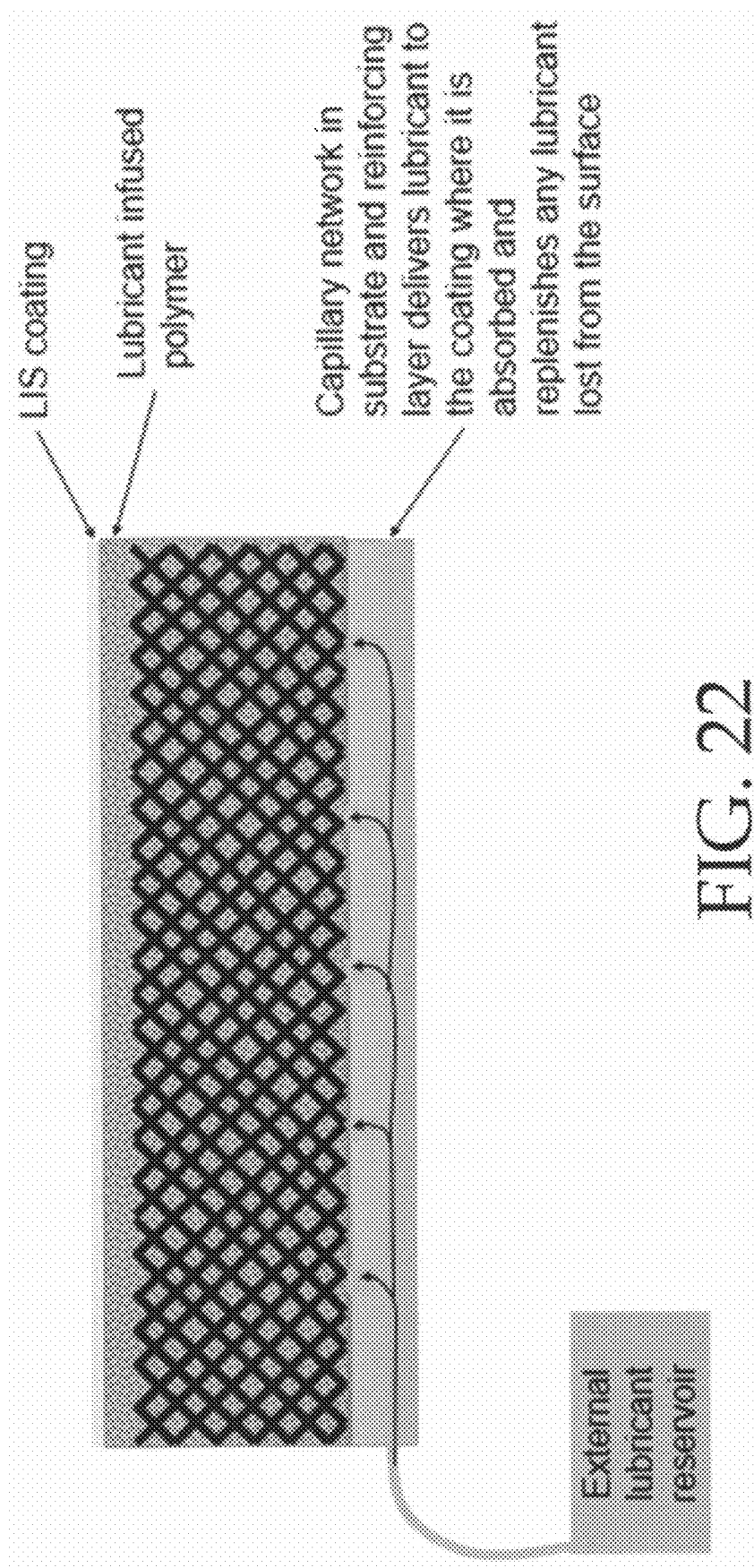
FIG. 22 is a cross-sectional diagram illustrating an exemplary composite structure as disclosed herein, having a LIS coating and an external lubricant reservoir.

Alternatively or additionally, an integrated or embedded lubricant reservoir 28, container or device, such as that shown in the embodiment of the structure illustrated in FIG. 9A, may be in fluid contact with the LIS coating. An external lubricant reservoir may also be used to replenish lubricant to a reinforced structure comprising a LIS coating. FIG. 22 is an illustration of a cross-sectional view of a slippery, durable structure comparing a composite structure and LIS coating, in fluid contact with an external lubricant reservoir. The substrate shown in FIG. 22 comprises a capillary network that delivers lubricant from the external reservoir, through the substrate, and into the composite structure via the porous network.

Maintaining a layer of liquid lubricant at the surface of the LIS coating contributes to the longevity of a slippery structure. Combining the intrinsic wicking effect from a porous composite structure with an engineered wicking structure as described herein, such as a substrate comprising a capillary network, can provide continuous replenishment of lubricant. Generally, in environments having fast fluid flow, the LIS surface is continuously exposed to abrasion and the LIS surface needs to be maintained as long as possible, so a low porosity reinforced structure is desired and an additional lubricant reservoir is beneficial. Under low flow conditions, the structural porosity can be high, with less need for an additional lubricant reservoir.

An additional system that can deliver lubricant from an external reservoir to an external surface is illustrated in FIG. 9B. In the exemplary embodiment illustrated in FIG. 9B, an external lubricant 28 is coupled to the wicking structure 24 via a fluid delivery device 30, such as a capillary. A similar system may be used to replenish lubricant to a LIS coating on an exposed surface of the reinforced structures disclosed herein. The lubricant replenishing may occur passively or actively. For example, lubricant can be delivered to an exposed surface of a composite structure comprising an interfacial material and a reinforcing material through a capillary device in fluid contact with an external lubricant reservoir. The delivery of the lubricant, in some embodiments, is pressurized, such as by a pump.

Disclosed herein are embodiments of processes of making the reinforced composite structures and surfaces having durable, slippery properties as disclosed herein. In certain disclosed embodiments, reinforced composite structures and surfaces having durable, slippery properties can be made by combining an interfacial material with a reinforcing material to form a composite structure that is abrasion resistant. In some embodiments, the interfacial material is a repellent material. A lubricant can be delivered to the composite structure by dispensing, applying, or introducing the lubricant to a surface of the composite structure. In certain embodiments, the lubricant is dispensed until the porous network of the composite structure is substantially or completely saturated. In some embodiments, the composite structure is treated with lubricant until the porous network is at least 50%, at least 75%, at least 90%, or at least 95% saturated. The lubricant can form a LIS coating on an external surface of the reinforced or composite structure. The LIS coating, in some embodiments, provides a slippery surface on the reinforced or composite structure.

Processes of making the disclosed reinforced composite structures and surfaces having durable, slippery properties may optionally include attachment of a reinforced or composite structure to a substrate. In some embodiments, the substrate is removed from the reinforced or composite structure prior to dispensing a lubricant thereto, or is removed from the reinforced or composite structure prior to forming a LIS coating thereon. The attachment of a substrate may comprise attachment of the substrate to a reinforcing material, or it may comprise attachment of the substrate to an interfacial material.

Processes of making the disclosed reinforced composite structures and surfaces having durable, slippery properties may include curing the interfacial material to aid its formation, such as by increasing the rate or amount of polymerization. For example, in certain embodiments, curing may involve ambient or raised temperatures, such as 100° C. The processes described herein are useful for making reinforced composite structures and surfaces having durable, slippery properties. In some embodiments, the processes for making the disclosed reinforced composite structures having durable, slippery properties do not include, or are free from, introducing roughness to an external surface of the structure.

Processes of making the disclosed reinforced composite structures and surfaces having durable, slippery properties may include delivery of a lubricant to a reinforced or composite structure through a capillary device or network that is in fluid contact with a lubricant reservoir. In certain embodiments, the lubricant reservoir is an external reservoir. A substrate may comprise a capillary device or network that is in fluid contact with the reinforced or composite structure.

The reinforced composite structures and surfaces having durable, slippery properties disclosed herein can be formed in various stages and/or locations. Composite structures can be formed at the site of use, or can be prepared in whole or in part in a location remote from the use site. For example, external surfaces of pier pilings may have a reinforcing material attached thereto, then the pilings are transported to a different location for combining with an interfacial material and lubricant. In some embodiments, the reinforced slippery structures disclosed herein are formed from a reinforcing material that is integrated into a machined industrial part or component at the time of manufacture. A wall or floor tile may be manufactured with a continuous metal mesh on an external surface, which is combined with an interfacial material to form a composite structure on the tile. The tiles can be installed in an environment that is exposed to abrasion, such as in an animal pen, prior to delivering a lubricant thereto or forming a slippery surface thereon.

Embodiments of the reinforced composite structures and surfaces having durable, slippery properties disclosed herein can be used in any application where an abrasion resistant, slippery surface is beneficial. Abrasion-resistant slippery structures can reduce friction significantly or completely, prevent adhesion of biofilms, act as antifouling materials, reduce corrosion, reduce drag in commercial and naval shipping, and/or improve fluid and slurry transfer efficiency. Surfaces that are slippery and/or repellent can have reduced levels of corrosion by preventing water from reaching and oxidizing a surface, and can be useful for bridges or other infrastructure components such as power line supports. In some embodiments, the reinforced composite structures and surfaces having durable, slippery properties can be self-replenishing.

In applications where reduction of friction can be particularly useful, stabilized lubricant-infused surfaces can protect against corrosion, wear and/or energy losses. Embodiments of the disclosed reinforced composite structures and surfaces having durable, slippery properties can reduce energy use and extend the lifetime of engineered components and systems. Examples of these applications include reducing friction in heavy machinery use and transport, such as in turbines, gears and motors, and/or to reduce drag in shipping or harbor locations. Surfaces that are exposed to high load, rapid movements and elevated temperatures are particularly favorable candidates for reinforced slippery surfaces, such as in energy production systems including off-shore or hydroelectric systems.

The use of reinforced composite structures and surfaces having durable, slippery properties, as disclosed herein, can allow for precision positioning of heavy equipment with reduced friction, potentially eliminating the need for air pumps by replacement with air bearings. Lowering or minimizing friction at an interface can be useful in the movement of heavy objects in a warehouse or manufacturing facility. Such slippery structures may be useful for fluid transport applications, such as in the oil and gas sector, for water treatment and transport, and/or in fluid-based heat exchangers.

Fouling and corrosion protection in sanitary animal enclosures or for biomedical devices can reduce infection rates and/or improve the longevity of the components used therein. Reinforced composite structures and surfaces having durable, slippery properties may be particularly useful in joint replacement implants. Consumer goods incorporating reinforced composite structures and surfaces having durable, slippery properties, as disclosed herein, can maintain a stable oil layer on an external surface, which may be useful for cookware or utensils, protective barriers or curtains for indoor or outdoor uses, and/or for rain or moisture protection for clothing and umbrellas. Engineered surface structures comprising the reinforced composite structures and surfaces having durable, slippery properties disclosed herein can also include additives that impart other useful properties. Additives to the reinforced composite structures and surfaces having durable, slippery properties disclosed herein can include biocides, antifouling agents, corrosion inhibitors, and any combinations thereof.

Example 12. Repellent Reinforced Composites

Three reinforced composite structures were prepared, including one that was treated with lubricant. The structures' water repellency was evaluated prior to, and after, abrasion testing. Two composite structures were made with stainless steel mesh having 60 micron pores (as shown in FIG. 18A), and one with stainless steel mesh having 10 micron pores (as shown in FIG. 18B). The two 60 micron meshes were of differing thickness: one was "thick" having a thickness of 0.7 mm, and one was "thin" having a thickness of 0.15 mm. The 10 micron mesh had a thickness of 0.17 mm.

The metal meshes were affixed to the center of a 50 mm×50 mm square pieces of aluminum foil having a thickness of 0.016 mm, with the polymeric interfacial material serving as an adhesive to connect the mesh to the foil. The metal meshes were then infused with the polymeric interfacial material, which was a low energy silicone elastomer (polydimethylsiloxane, or "PDMS"). Approximately 10 g of PDMS was divided evenly into thirds, and added to the three metal meshes by placing a drop in the center of the sample. The PDMS was spread over the surface of the sample with a brush, and any excess was removed with the brush. The mesh size was 2 cm×2 cm, and the samples were made in triplicate. The polymer was cured by placing the samples in a 100° C. oven for 30 minutes. Then the polymer/metal mesh composite was soaked overnight in an excess of silicone oil (PDMS having a 10 cSt viscosity; Sigma Aldrich). Silicone oil was chosen for its compatibility with the polymer, so that it would be absorbed into the polymer and cause it to swell. It swells because the PDMS is porous and can absorb some lubricant.

A set of samples prepared as described above was abraded manually with sandpaper to evaluate durability. Test samples were adhered to the bottom of a metal weight having a smooth surface. The weight applied 10-kPa pressure over its surface area to the sample. The sample was placed on a sheet of SiC abrasive sandpaper (400 mesh) and pulled in a smooth motion over a distance of approximately 30 cm at a speed of 3 cm s$^{-1}$ to complete one abrasion cycle. Contact angle and roll-off angle were measured before the first abrasion cycle and after 15 abrasion cycles.

Wettability measurements (CA and ROA) before and after abrasion are shown in Table 4. FIG. 21 illustrates the expected behavior of the material when subjected to abrasion. Although abrasion may result in erosion of unsupported polymer that lies above the reinforcing material, it is believed that the reinforcing material will not be easily removed. Certain physical properties of the three reinforced composites are shown below in Table 4; properties of control materials are shown for comparison. The sprayable SHP and LIS coatings were prepared as described in Examples 1-2 and Table 1.

TABLE 4

Physical Properties.

| Material | Contact Angle (degrees) | Roll-Off Angle (degrees) |
|---|---|---|
| Comparative Control Materials | | |
| Glass | 34 | 34 |
| Stainless steel | 78 | 29 |
| Polypropylene | 87 | >90 |
| Teflon | 89 | 15 |
| PDMS | 100 | 15 |
| Leading AF paint (Intersleek 1100SR) | 106 | 30 |
| Sprayable SHP/LIS Materials | | |
| SHP coating | 151 | 8.0 |
| LIS coating | 109 | 4.6 |
| Exemplary Composite Structures/LIS | | |
| Stainless steel mesh (10 micron average pore diameter) with PDMS/silicone oil | 105.0 ± 2.5 | 2.9 ± 1.2 |
| Thin stainless steel mesh (60 micron average pore diameter) with PDMS/silicone oil | 105.3 ± 1.1 | 13.6 ± 4.4 |
| Thick stainless steel mesh (60 micron average pore diameter) with PDMS/silicone oil Post-Abrasion | 109.2 ± 3.8 | 13.8 ± 5.3 |
| Stainless steel mesh (10 micron average pore diameter) with PDMS/silicone oil Post-Abrasion (after lubricant replenished) | 107.3 ± 4.8 | 9.4 ± 0.3 |
| Stainless steel mesh (10 micron average pore diameter) with PDMS/silicone oil | 97.7 ± 3.1 | 1.7 ± 0.3 |

The results in Table 4 show that all of the samples had repellent surfaces, and indicates that the composite materials disclosed herein retain their repellency upon abrasion. In particular, the reinforced composite structure with 10 micron mesh had a very low roll-off angle (2.9 degrees) and abrasion resulted in a temporary change in wettability of the LIS coating. The abraded structure exhibited a higher contact angle than before abrasion, which may have resulted from the abrasion exposing the infused polymer (PDMS). Abrasion caused a temporary increase in roll-off angle (from 2.9 to 9.4 degrees), but when the surface lubricant was replenished, both contact angle (CA) and roll-off angle (ROA) returned to values that indicate strong slippery and repellent behavior.

Example 13. Additional Repellent Reinforced Structures

A composite structure having a LIS was prepared as described in Example 12 using PDMS, a stainless steel mesh with a 10 micron porosity, silicone oil and an aluminum foil substrate with a thickness of 0.016 mm. A portion of the sample was removed with scissors to provide a strip about 50 mm long and 25 mm wide. The strip was placed in a graduated cylinder and water, and its repellent nature was observed.

Figure 23A:
FIGS. 23A-23B show a photographic image (23A) and an illustration of the photographic image of FIG. 23A (23B) showing an exemplary composite structure on a substrate in a tube partially filled with water. The uncoated left side of the substrate is hydrophilic, and the side with the composite structure repels water, as indicated by the meniscus shape at each solid/water/air interface.
Figure 23B:
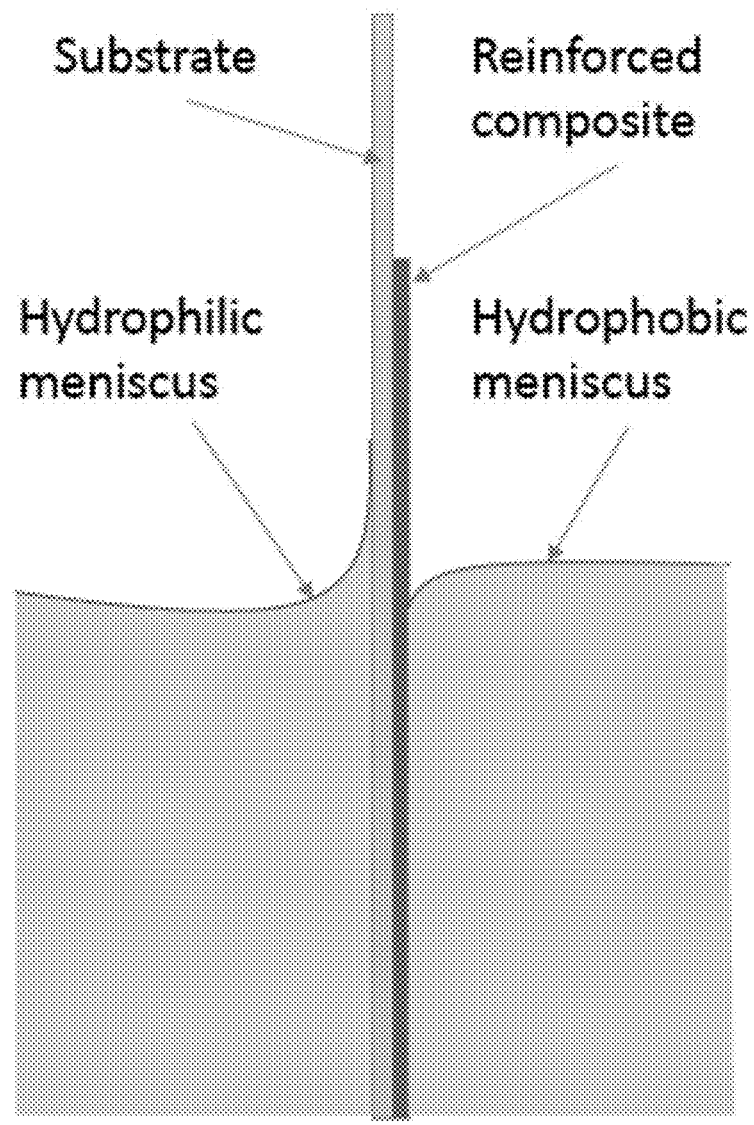

FIG. 23A is a photograph of a sample of a composite structure on a substrate placed vertically in a tube partially filled with water, and FIG. 23B is a simplified diagram of the photograph of FIG. 23A, illustrating the difference in surface wetting. The surface of the structure on the left side of these figures is the uncoated side of the substrate, similar to the bottom of the structure shown in FIG. 17B. This surface is hydrophilic, as indicated by the shape of the meniscus of the water at the substrate/water/air interface. The surface of the structure on the right side of these figures is the coated side of the substrate, having an external surface that is made of a polymeric interfacial material and a LIS coating, similar to the top of the structure shown in FIG. 17B. This surface is water repellent, as indicated by the shape of the meniscus that forms at the composite/water/air interface.

Example 14. Omniphobic Reinforced Structures

Composite structures having a LIS may be prepared generally as described in Example 12 using a stainless steel or fiberglass mesh, a fluorinated polymer such as polytetrafluoroethylene (PTFE), a fluorocarbon polymeric oil such as Krytox, and an aluminum foil substrate with a thickness of 0.016 mm. The resulting reinforced structure would have a surface that is both repellent and oleophobic, therefore omniphobic.

Example 15. Durable Repellent Reinforced Composites

To demonstrate the durability of the composite materials, selected structures were made and tested for their strength. The results indicate that reinforced composites are stronger and more able to resist abrasion than non-reinforced materials. Three reinforced composite structures were prepared, and all were treated with lubricant to form an LIS coating thereon. The structures' strength and durability were evaluated using a mechanical pull test. The pull test measures the peak tensile strength of the materials.

One composite structure was made with stainless steel mesh having 60 micron pores (as shown in FIG. 18A), and one with stainless steel mesh having 10 micron pores (as shown in FIG. 18B), generally following the procedures described in Example 12. A final reinforced structure was made with a fiberglass cloth (S2 glass, 4180 style, 4H satin style, finished CS-272A silane from JPS). All reinforcing materials were coated with PDMS as an interfacial material and had their porous volume filled with PDMS. The samples were cured overnight in a 37° C. oven. The samples were then treated with fluorocarbon oil to create reinforced LIS structures. The thicknesses of the reinforcing materials is shown in Table 5. The three composites, plus one non-reinforced material (PDMS) were tested.

TABLE 5

Thickness of raw reinforcing materials and composites

| Raw materials | Thickness (mm) |
|---|---|
| 10BL3 mesh | 0.17* |
| 60BL3 mesh | 0.15* |
| Al foil | 0.016* |

TABLE 5-continued

Thickness of raw reinforcing materials and composites

| Raw materials | Thickness (mm) |
|---|---|
| Fiberglass | 0.25* |
| PDMS | 0.7 ± 0.1 |
| Composites^ | |
| 10BL3/PDMS | 0.5 ± 0.1 |
| 60BL3/PDMS | 0.5 ± 0.1 |
| Fiberglass/PDMS | 0.4 ± 0.0 |

*reference value from manufacturer
^All composites were infused with fluorocarbon oil.

The pull test was performed using a Mark-10 pull tester and a Nextech DFS 1000 force gauge. The force gauge was set to record peak force in Newtons while pulling a 2 inch long by 1 inch wide sample. Tests were repeated with 3 samples for each condition. The averages of the tests with standard deviation are shown in Table 6. Reinforced composites were compared to non-reinforced coatings (PDMS), raw reinforcing materials, and substrates (aluminiuml foil). A set of samples was made by filling the open porosity of reinforcing materials with PDMS; these samples were freestanding without a substrate. A second set of samples was made by laying the reinforcing material on a sheet of heavy grade aluminum foil. PDMS still filled the open porosity of the reinforcing structures and also adhered the structure to the aluminum substrate. The strength of the material was compared with and without a substrate present in the structure.

TABLE 6

Strength of composites compared to reference materials as measured by peak tensile strength.

| Raw materials | Peak tensile strength (N) | Increase over PDMS alone (%) |
|---|---|---|
| 10 μm steel mesh | 135 ± 4.5 | 366% |
| 60 μm mesh | 134 ± 6.8 | 363% |
| Al foil | 337 ± 1.8 | 915% |
| Fiberglass mesh | 252 ± 18.7 | 684% |
| PDMS | 36.9 ± 6.5 | 100% |
| Mesh Reinforced Composites* | | |
| 10 μm steel mesh + PDMS | 131 ± 9.3 | 355% |
| 60 μm steel mesh + PDMS | 132 ± 10.2 | 357% |
| Fiberglass mesh + PDMS | 429 ± 39.6 | 1163% |
| Reinforced composites on aluminum foil substrate* | | |
| PDMS | 104 ± 14.6 | 282% |
| 10 μm mesh/PDMS | 391 ± 92.2 | 1061% |
| 60 μm mesh/PDMS | 407 ± 54.9 | 1103% |
| Fiberglass/PDMS | 449 ± 37.3 | 1217% |

*All reinforced composited were infused with fluorocarbon oil.

The results in Table 6 indicate certain advantages of reinforced mesh composites. The strength, and subsequently the durability of the material, is significantly increased over a simple PDMS polymeric structure. Generally polymers, including PDMS, have a relatively low tensile strength. Adding reinforcing material to the structure increases strength and durability. Table 6 shows that using 10 μm and 60 μm steel mesh as a reinforcing material increases the tensile strength of the composite. Using fiberglass as a reinforcing material also increases the tensile strength of the composite in a similar way. The fiberglass PDMS composite has a greater tensile strength than either of the separate components. PDMS appears to inhibit the fibers from sliding against each other, which is a mechanism of failure for the raw fiberglass samples.

The results also indicate that the substrate can affect the tensile strength of reinforced composite materials. The aluminum foil that was used as a substrate for these tests was 915% stronger than PDMS. Composites were formed by adhering a reinforcing layer to a thin layer of aluminum by curing the polymer component directly upon the aluminum. Building a reinforced composite on top of a substrate may further increase the tensile strength of the structure. The strongest reinforced material tested was a fiberglass/PDMS composite using aluminum foil as a substrate. The tensile strength of reinforced composites can be tailored or further increased by varying the thickness and composition of the reinforcing material or the substrate (for composites incorporating a substrate).

The introduction of a reinforcing material and a solid metal substrate may reduce the elasticity of the material when compared to PDMS. However, these effects may be mitigated through the judicious selection of reinforcing materials. Fabrics, fibers and meshes that are known to be stretchable and/or flexible may be used as reinforcing materials.

Example 16. Additional Durable Repellent Reinforced Structures

A test was performed to determine the impact of abrasion on water contact angle. The performance of reinforced composites was compared to the performance of non-reinforced materials. Two steel mesh composites made with PDMS were compared to non-reinforced PDMS. All samples were infused with lubricant to created LIS surfaces, and were generally prepared according to Example 12. The contact angle of water on each surface was measured with a goniometer prior to abrasion. The thickness of each sample was also measured with a micrometer caliper. Each sample was abraded with 1500 grit SiC sandpaper with 50 PSI pressure applied. The sandpaper was moved in a back and forth motion over the LIS coated surface of the sample for 60 seconds. After the conclusion of the abrasion, the contact angle and thickness were immediately measured again. The contact angle was measured a final time after allowing the lubricant to replenish and the surface to recover. This was done by placing each sample upright in a bath of lubricant (fluorocarbon oil) such that only one end was submerged. The lubricant replenished the full surface through simple (passive) capillary action. The results are shown in Table 7.

TABLE 7

Effects of abrasion on material thickness and water contact angle.

| | Thickness (mm) | | Contact angle (deg) | | |
|---|---|---|---|---|---|
| Sample | Before* | After^ | Before* | After^ | Replenished+ |
| PDMS/glass | 1.73 | 0.99^β | 111 | 56^γ | 56 |
| 10 μm steel mesh + PDMS + lubricant | 0.57 | 0.37 | 107 | 134 | 103 |
| 60 μm steel mesh + PDMS + lubricant | 0.55 | 0.29 | 107 | 77 | 105 |

*Before abrasion at 50 PSI with 1500 grit sandpaper.
^After abrasion.
+Lubrication replenished by standing samples upright in a bath of fluorocarbon oil such that only one end was submerged. The lubricant was replenished by simple capillary action.
^β Thickness of unmodified glass slide was 0.975 mm.
^γ Contact angle on unmodified glass slide was 56.0 degrees In this example, abrasion for 60 seconds was sufficient to completely remove the non-reinforced polymer from a glass substrate. The thickness of the abraded PDMS sample was similar to an unmodified and uncoated glass slide. The contact angle was dramatically reduced (to the contact angle of unmodified glass) and the LIS coating of the abraded sample could not be replenished because there was no longer a capillary network. In contrast, reinforced structures resisted abrasion, and the steel mesh appeared to prevent the complete destruction of the LIS coating. Both reinforced materials suffered partial removal of the coating (as indicated by a significant reduction in thickness), and a change in contact angle after abrasion. In one case, abrasion resulted in an increase in contact angle. This is believed to be because a textured polymeric surface was revealed after removing the LIS coating. In the other reinforced sample, the contact angle was reduced. This is believed to be because the abrasion revealed the metallic structure. The sample with 10 µm steel mesh was more able to resist abrasion than the sample with 60 µm steel mesh, as indicated by a smaller reduction in thickness. This is believed to be because there was a higher mass fraction of metal reinforcement in the steel mesh that had a finer weave (10 microns). In both cases, the LIS properties of the samples were restored after abrasion as the slippery liquid returned to the surface by passive capillary action. It is believed that the recovery time for slippery surfaces to restore themselves may, in part, be a function of their configuration and composition.

While various preferred embodiments of the invention are shown and described, it is to be distinctly understood that this invention is not limited thereto but may be variously embodied to practice within the scope of the following claims. From the foregoing description, it will be apparent that various changes may be made without departing from the scope of the invention as defined by the following claims. Rather, the scope of the present disclosure is defined by the claims. We therefore claim as our invention all that comes within the scope of these claims.

What is claimed is:

1. A structure having a slippery surface, the structure comprising:
    an abrasion resistant composite structure comprising a porous reinforcing material comprising a three-dimensional mesh and a repellent interfacial material embedded within the porous reinforcing material;
    a lubricant-infused surface coating on an exposed surface of the composite structure; and
    wherein a height of the repellent interfacial material is equal to or greater than a height of the porous reinforcing material.
2. The structure of claim 1, wherein the porous reinforcing material comprises stainless steel, or copper, or aluminum, or fiberglass, or carbon fiber, or canvas, or any combination thereof.
3. The structure of claim 1, wherein the repellent interfacial material comprises a polymer, or an organosilicon compound, or a combination thereof.
4. The structure of claim 1, wherein the repellent interfacial material comprises at least one of siloxane, silicone, fluoropolymer, methacrylate, polypropylene, polyethylene, cellulose, and silazane.
5. The structure of claim 1, wherein the lubricant-infused surface coating comprises a fluorocarbon polymer, or a silicone oil, or a combination thereof.
6. The structure of claim 1, wherein the exposed surface comprising the lubricant-infused surface coating has a surface energy between 10 and 20 mJ/m$^2$, or a water contact angle between 90 and 135 degrees, or a water roll-off angle between 1 and 25 degrees, or any combination thereof.
7. The structure of claim 1, wherein the composite structure further comprises a pore-forming additive.
8. The structure of claim 7, wherein the pore-forming additive comprises at least one of silica, metal, metal oxide, ceramic, polymer, diatomaceous earth, cellulose or a derivative thereof, sugar, starch, salt, and surfactant.
9. The structure of claim 1, wherein the porous reinforcing material comprises metal or fiberglass, the repellent interfacial material comprises organosilicon, and the lubricant-infused surface coating comprises silicone oil or a fluorocarbon polymer.
10. The structure of claim 1, further comprising a biocide, or a corrosion inhibitor, or an antifouling agent, or any combination thereof.
11. The structure of claim 1, further comprising an external lubricant reservoir, or a substrate, or both.
12. A reinforced structure having a slippery surface, the reinforced structure comprising
    a substrate,
    a reinforcing material comprising a fibrous mesh,
    a repellent material embedded within the reinforcing material and comprising a pore-forming additive that is not removed from the repellent material, and
    a lubricant,
    wherein an exposed surface of the reinforced structure comprises a lubricant-infused surface coating, and
    wherein the reinforcing material and the repellent material together form an abrasion resistant interface between the substrate and the lubricant-infused surface coating.
13. The reinforced structure of claim 12, wherein the exposed surface comprising the lubricant-infused surface coating has a surface energy between 10 and 20 mJ/m$^2$, or a water contact angle between 90 and 135 degrees, or a water roll-off angle between 1 and 25 degrees, or any combination thereof.
14. The reinforced structure of claim 12, wherein the substrate is chosen from at least one of a floor tile, a wall tile, and a component of an animal enclosure having a surface that contacts an animal, and the reinforced structure further comprises a biocide; or
    wherein the substrate is chosen from at least one of a marine vessel, buoy, and pier having a surface that contacts a marine environment, and the reinforced structure further comprises an antifouling agent, or a corrosion inhibitor, or both.
15. The reinforced structure of claim 12, wherein the reinforcing material comprises metal or fiberglass, the repellent material comprises silicon, and the lubricant-infused surface coating comprises silicone oil or a fluorocarbon polymer.
16. A process for making a slippery durable structure, comprising
    combining a repellent material with a porous reinforcing material comprising a three-dimensional mesh by embedding the repellent material within the porous reinforcing material to form an abrasion resistant composite structure wherein a height of the repellent material is equal to or greater than a height of three-dimensional mesh,
    delivering a lubricant to the composite structure, and
    forming a lubricant-infused surface coating on an exposed surface of the composite structure to provide a slippery surface.
17. The process of claim 16, wherein the lubricant is delivered to the composite structure through a capillary device in fluid contact with an external lubricant reservoir.

18. A slippery durable structure formed by the process of claim 16.

19. The structure of claim 1, wherein the repellent interfacial material fills at least 50% of the pores of the porous reinforcing material.

20. The structure of claim 1, wherein the interfacial material is a continuous layer of material that completely surrounds the reinforcing material.

* * * * *